(12) United States Patent  
Wakabayashi

(10) Patent No.: US 7,492,410 B2  
(45) Date of Patent: Feb. 17, 2009

(54) ELECTRONIC CAMERA

(75) Inventor: Tsutomu Wakabayashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 1015 days.

(21) Appl. No.: 10/992,508

(22) Filed: Nov. 19, 2004

(65) Prior Publication Data

US 2005/0110897 A1  May 26, 2005

(30) Foreign Application Priority Data

Nov. 25, 2003 (JP) .............................. 2003-394053  
Nov. 26, 2003 (JP) .............................. 2003-395498

(51) Int. Cl.  
 *H04N 5/235* (2006.01)  
 *H04N 5/238* (2006.01)

(52) U.S. Cl. .................. 348/362; 348/367; 396/452

(58) Field of Classification Search ................ 348/362, 348/367, 368; 396/452–470  
See application file for complete search history.

(56) References Cited

U.S. PATENT DOCUMENTS

| | | | | |
|---|---|---|---|---|
| 4,183,646 A | * | 1/1980 | Tsunefuji | 396/466 |
| 4,236,797 A | * | 12/1980 | Noack et al. | 396/357 |
| 4,542,970 A | * | 9/1985 | Suzuki et al. | 396/89 |
| 2004/0223076 A1 | | 11/2004 | Nakano et al. | |
| 2004/0223756 A1 | | 11/2004 | Nakano et al. | |
| 2004/0223757 A1 | | 11/2004 | Nakano et al. | |
| 2004/0223758 A1 | | 11/2004 | Nakano et al. | |

FOREIGN PATENT DOCUMENTS

| | | |
|---|---|---|
| JP | A 11-122542 | 4/1999 |
| JP | A 2001-083574 | 3/2001 |
| JP | A 2001-159777 | 6/2001 |
| JP | A 2004-317589 | 11/2004 |
| JP | A 2004-317590 | 11/2004 |
| JP | A 2004-317665 | 11/2004 |
| JP | A 2004-325673 | 11/2004 |

\* cited by examiner

*Primary Examiner*—Tuan Ho  
*Assistant Examiner*—Chia-Wei A Chen  
(74) *Attorney, Agent, or Firm*—Oliff & Berridge, PLC

(57) ABSTRACT

An electronic camera includes: an image-capturing element that captures an image formed with subject light; a shielding member that allows the subject light to pass through to the image-capturing element or blocks the subject light; a first electromagnetic actuator used for opening/closing drive of the shielding member; a holding member that holds the shielding member at least either an open state in which the shielding member allows the subject light to pass through or a closed state in which the shielding member blocks the subject light; a second electromagnetic actuator used for holding drive and hold release drive of the holding member; and a control device that controls driving of the first electromagnetic actuator and the second electromagnetic actuator.

14 Claims, 32 Drawing Sheets

FIG.5 $T_{exp} < T_{d2} - T_{m2}$

FIG.6 $T_{d2} - T_{m2} \leq T_{exp} < T_{d1} + T_{d2} - T_{m1} - T_{m2}$ TIMING WITH WHICH RELEASE OPERATION FOR NEXT FRAME IS ALLOWED FIG.7 $T_{h1} + T_{d2} - T_{m1} - T_{m2} \leq T_{exp} < T_{lg}$ (1 SEC)

FIG.8 $T_{exp} \geq T_{lg}$ (1 SEC)

ELECTRONIC CAMERA

INCORPORATION BY REFERENCE

The disclosures of the following priority applications are herein incorporated by reference:
Japanese Patent Application No. 2003-394053 filed Nov. 25, 2003
Japanese Patent Application No. 2003-395498 filed Nov. 26, 2003

BACKGROUND OF THE INVENTION

1. Field of the Invention

The present invention relates to an electronic camera that captures a subject image with a solid image-capturing element, and more specifically, it relates to an electronic camera that shields the image-capturing element from light with a shielding member except for during an image-capturing operation.

2. Description of the Related Art

There is a technology known in the related art whereby a focal plane shutter (shielding member) used to open/close a photographic aperture is driven with an electromagnetic actuator (see Japanese Laid Open Patent Publication No. 2001-83574).

In addition, there is a camera known in the related art that can be set in a cleaning operation mode in which a reflecting mirror is held in a raised state and a shielding member is held in an open state when dirt or dust adhering to the image-capturing element and in its vicinity needs to be removed (see Japanese Laid Open Patent Publication No. 2001-159777)

SUMMARY OF THE INVENTION

However, Japanese Laid Open Patent Publication No. 2001-83574 mentioned above does not include any description of the relationship between the shutter speed set for a photographing operation and control implemented on the electromagnetic actuator. For instance, it does not disclose how the electromagnetic actuator should be controlled when the shutter speed is low.

Generally speaking, if the power supply to the coil of an electromagnetic actuator is sustained over a period of time, heat generation occurs and the power consumption increases. Such heat generation and increase in the power consumption tend to be more problematic when the exposure is executed over a longer period of time.

Furthermore, there is a concern that if the shielding member starts to close during a cleaning operation, the shielding member may collide with a cleaning member or the like and may become damaged. Accordingly, the camera disclosed in Japanese Laid Open Patent Publication No. 2001-15977 adopts a structure that allows the cleaning operation mode to be selected only when the camera is connected with an external power supply so as to ensure that the shielding member does not close even if the remaining power in the camera's battery becomes low during the cleaning operation.

However, it is inconvenient that the maintenance (cleaning) operation is not enabled without the power supply from the outside in order to protect the shielding member.

According to the 1st aspect of the invention, an electronic camera comprises: an image-capturing element that captures an image formed with subject light; a shielding member that allows the subject light to pass through to the image-capturing element or blocks the subject light; a first electromagnetic actuator used for opening/closing drive of the shielding member; a holding member that holds the shielding member at least either an open state in which the shielding member allows the subject light to pass through or a closed state in which the shielding member blocks the subject light; a second electromagnetic actuator used for holding drive and hold release drive of the holding member; and a control device that controls driving of the first electromagnetic actuator and the second electromagnetic actuator.

According to the 2nd aspect of the invention, in the electronic camera according to the 1st aspect, it is preferred that the control device (1) outputs an instruction for the first electromagnetic actuator to drive the shielding member in an opening direction after outputting an instruction for the hold release drive to the second electromagnetic actuator, (2) outputs an instruction for the holding drive to the second actuator after the open state has been detected and then outputs an instruction for the first electromagnetic actuator to stop driving in the opening direction, (3) outputs an instruction for the first electromagnetic actuator to drive the shielding member in a closing direction after outputting an instruction for the hold release drive to the second electromagnetic actuator, and (4) outputs an instruction for the holding drive to the second electromagnetic actuator after the closed state has been detected and then outputs an instruction for the first electromagnetic actuator to stop driving in the closing direction.

According to the 3rd aspect of the invention, in the electronic camera according to the 1st aspect, it is preferred that if a preset exposure time is shorter than a first reference time length and is not either at a "valve" setting or at a "time" setting, the control device (1) outputs an instruction for the first electromagnetic actuator to drive the shielding member in an opening direction after outputting an instruction for the hold release drive to the second electromagnetic actuator, (2) outputs an instruction for the first electromagnetic actuator to drive the shielding member in a closing direction after the open state has been detected, and (3) outputs an instruction for the holding drive to the second electromagnetic actuator after the closed state has been detected and then outputs to the first electromagnetic actuator an instruction to stop driving in the closing direction.

According to the 4th aspect of the invention, in the electronic camera according to the 3rd aspect, it is preferred that if the preset exposure time exceeds a second reference time length which is shorter than the first reference time length, the control device (1) outputs an instruction for the first electromagnetic actuator to drive the shielding member in the opening direction after outputting an instruction for the hold release drive to the second electromagnetic actuator, (2) reduces power supplied to the first electromagnetic actuator with specific timing after the open state has been detected, (3) restores the power having been reduced and outputs an instruction for the first electromagnetic actuator to drive the shielding member in the closing direction, and (4) outputs an instruction for the holding drive to the second electromagnetic actuator after the closed state has been detected and then outputs an instruction for the first electromagnetic actuator to stop driving in the closing direction.

According to the 5th aspect of the invention, in the electronic camera according to the 1st aspect, it is preferred that if the shielding member stops while being driven, the control device first outputs an instruction for the hold release drive of the holding member to the second electromagnetic actuator and then outputs an instruction for the first electromagnetic actuator to drive the shielding member in the closing direction.

According to the 6th aspect of the invention, in the electronic camera according to the 1st aspect, it is preferred that prior to the hold release drive, the control device outputs an instruction for the first electromagnetic actuator to drive the shielding member in a direction opposite from a direction in which the shielding member is driven for opening or closing, and then the control device outputs an instruction for the hold release drive to the second electromagnetic actuator.

According to the 7th aspect of the invention, in the electronic camera according to the 1st aspect, it is preferred that: the holding member sustains the open state and the closed state by coming into contact with a drive member that drives the shielding member and thus restricting movement of the drive member; drive operations of the holding member executed to sustain the open state and the closed state are identical; and different areas of the holding member come into contact with the drive member to sustain the open state and to sustain the closed state.

According to the 8th aspect of the invention, in the electronic camera according to the 1st aspect, it is preferred that the control device (1) supplies power from a source inside the electronic camera to the first electromagnetic actuator when executing the opening/closing drive of the shielding member, (2) supplies power from the source to the second electromagnetic actuator when executing the hold drive and the hold release drive of the holding member, and (3) stops supplying the power to the first electromagnetic actuator and the second electromagnetic actuator while the open state or the closed state is sustained by the holding member.

According to the 9th aspect of the invention, in the electronic camera according to claim 1st aspect, it is preferred that in response to a signal constituting an instruction for a maintenance operation start, the control device (1) outputs an instruction for the first electromagnetic actuator to drive the shielding member in an opening direction after outputting an instruction for the hold release drive to the second electromagnetic actuator and (2) outputs an instruction for the holding drive to the second electromagnetic actuator after the open state has been detected and then outputs an instruction for the first electromagnetic actuator to stop the drive in the opening direction, and in response to a signal constituting an instruction for a maintenance operation end, the control device (3) outputs an instruction for the first electromagnetic actuator to drive the shielding member in a closing direction after outputting an instruction for the hold release drive to the second electromagnetic actuator and (4) outputs an instruction for the holding drive to the second electromagnetic actuator after the closed state has been detected and then outputs an instruction for the first electromagnetic actuator to stop the drive in the closing direction.

According to the 10th aspect of the invention, in the electronic camera according to the 9th aspect, it is preferred that power is supplied to the first electronic actuator and the second electronic actuator from a source within the electronic camera.

According to the 11th aspect of the invention, in the electronic camera according to the 1st aspect, it is preferred that the control device drives the first electromagnetic actuator so as to set the shielding member in the open state or in the closed state and drives the second electromagnetic actuator so that after the shielding member enters either the open state or the closed state, the open state or the closed state of the shielding member is sustained by the holding member.

According to the 12th aspect of the invention, in the electronic camera according to the 11th aspect, it is preferred that after the open state or the closed state becomes sustained by the holding member, the control device stops driving of the first electromagnetic actuator.

According to the 13th aspect of the invention, in the electronic camera according to the 1st aspect, it is preferred that in response to a signal constituting an instruction for a maintenance operation start, the control device drives the first electromagnetic actuator so as to set the shielding member in the open state and drives the second electromagnetic actuator so that once the shielding member enters the open state, the open state is sustained by the holding member.

According to the 14th aspect of the invention, in the electronic camera according to the 13th aspect it is preferred that power is supplied to the first electromagnetic actuator and the second electromagnetic actuator from a battery source loaded in the electronic camera.

DESCRIPTION OF THE PREFERRED EMBODIMENTS

First Embodiment

The following is an explanation of the best mode for carrying out the invention, given in reference to the drawings.

Figure 1:
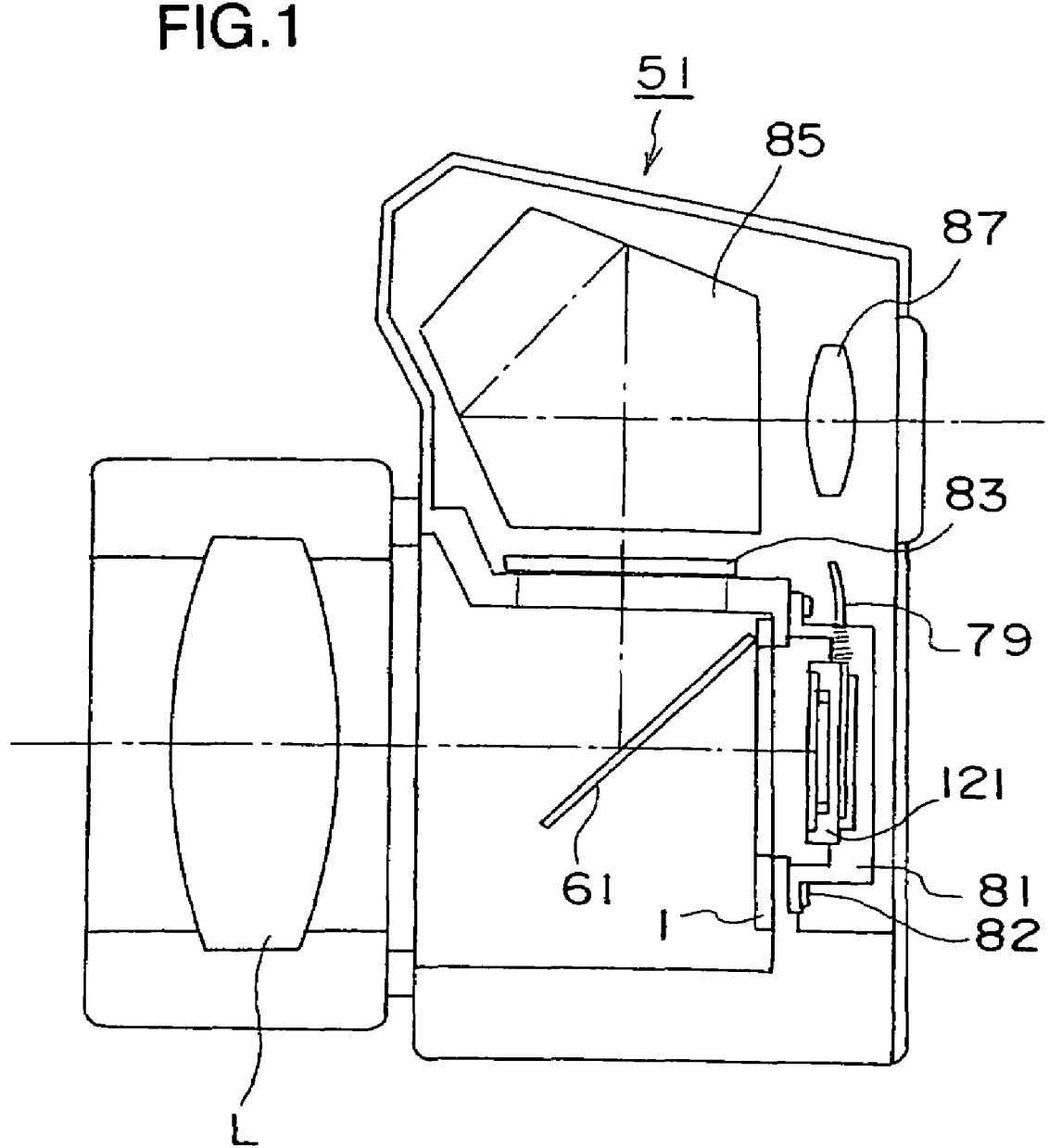
FIG. 1 is a side elevation of a single lens reflex electronic camera achieved in a first embodiment of the present invention.

FIG. 1 is a side view of the single lens reflex electronic camera achieved in the first embodiment of the present invention. FIG. 1 shows that a photographic lens L is mounted at an electronic camera 51. Light from the subject having passed through the photographic lens L is reflected at a mirror 61 and forms an image on a viewfinder screen 83 which is then observed by the photographer through a pentaprism 85 and an eyepiece lens 87, as known in the related art. For a photographing operation, the mirror 61 is made to swing upward so that the subject light forms an image on the image-capturing surface of an image-capturing element 121. The image-capturing element 121 may be constituted with, for instance, a CCD image sensor.

The image-capturing element 121 is locked onto a holder 81, and its photoelectric conversion output is output to an A/D conversion circuit to be detailed later via a flexible printed board 79. The holder 81 is attached to the electronic camera 51 with screws 82. A focal plane shutter 1 is disposed to the front of the image-capturing element 121 (toward the photographic lens L).

The shutter of the electronic camera 51 in the embodiment is a so-called electronic shutter, and the length of time over which electrical charges are stored at the image-capturing element 121 while the subject light is allowed to enter the image-capturing surface of the image-capturing element 121 is equivalent to the shutter speed. The focal plane shutter 1 is included in the camera in order to shield the image-capturing element 121 from the subject light after the electrical charge storage instead of in order to regulate the length of the electrical charge storage time.

Accordingly, only one set of shutter blades is required to shield the image-capturing element from light, and it is not necessary to provide two sets of shutter blades, i.e., a front curtain set and a rear curtain set, and to ensure that their operations are controlled accurately. Since the shutter unit only needs to include a single blade set, its thickness can be reduced compared to that of a focal plane shutter with two sets of blades, and thus, the installation space can be saved.

Figure 2:
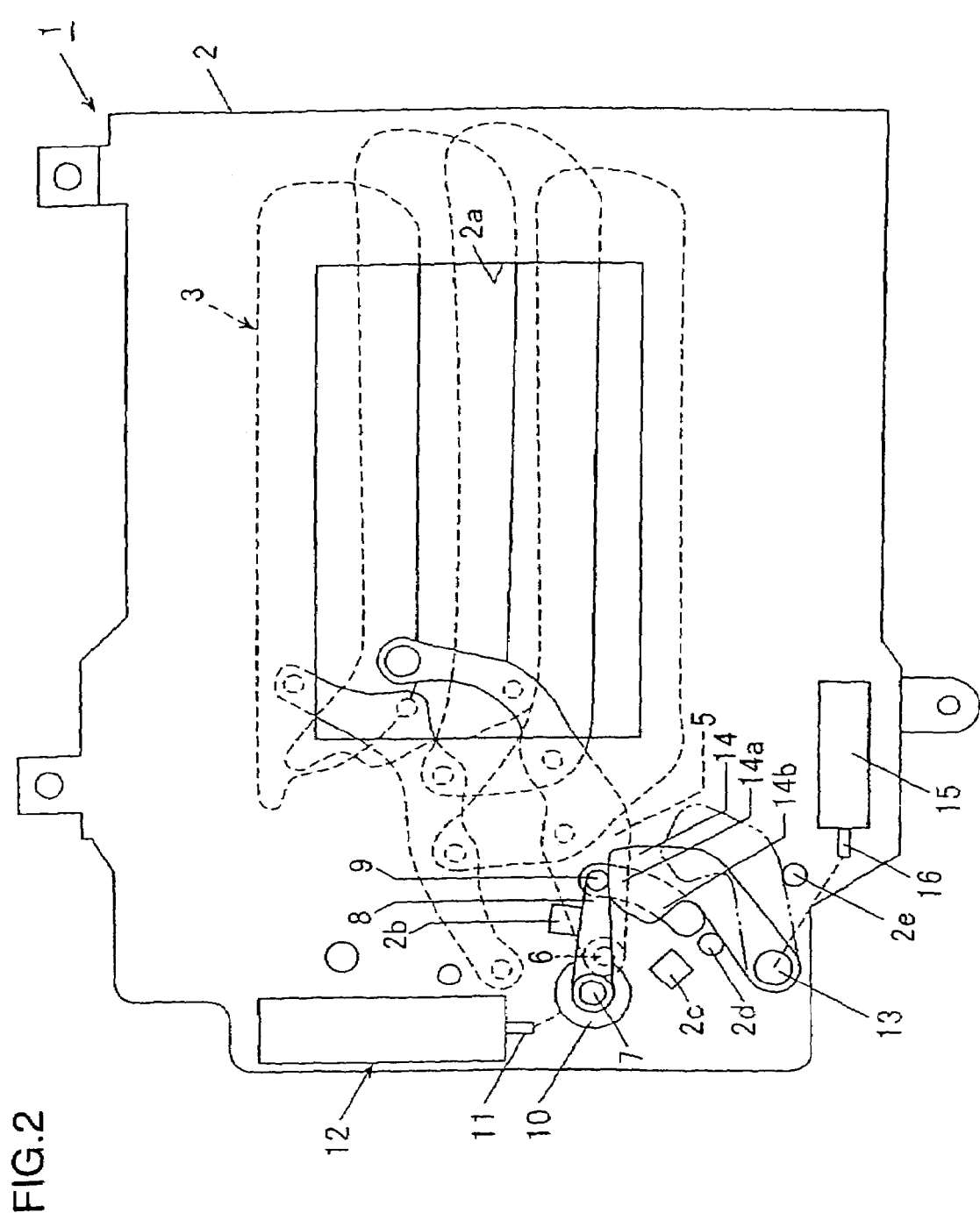
FIG. 2 is a front view of the shutter in a state in which the aperture is closed with the blade set.
Figure 3:
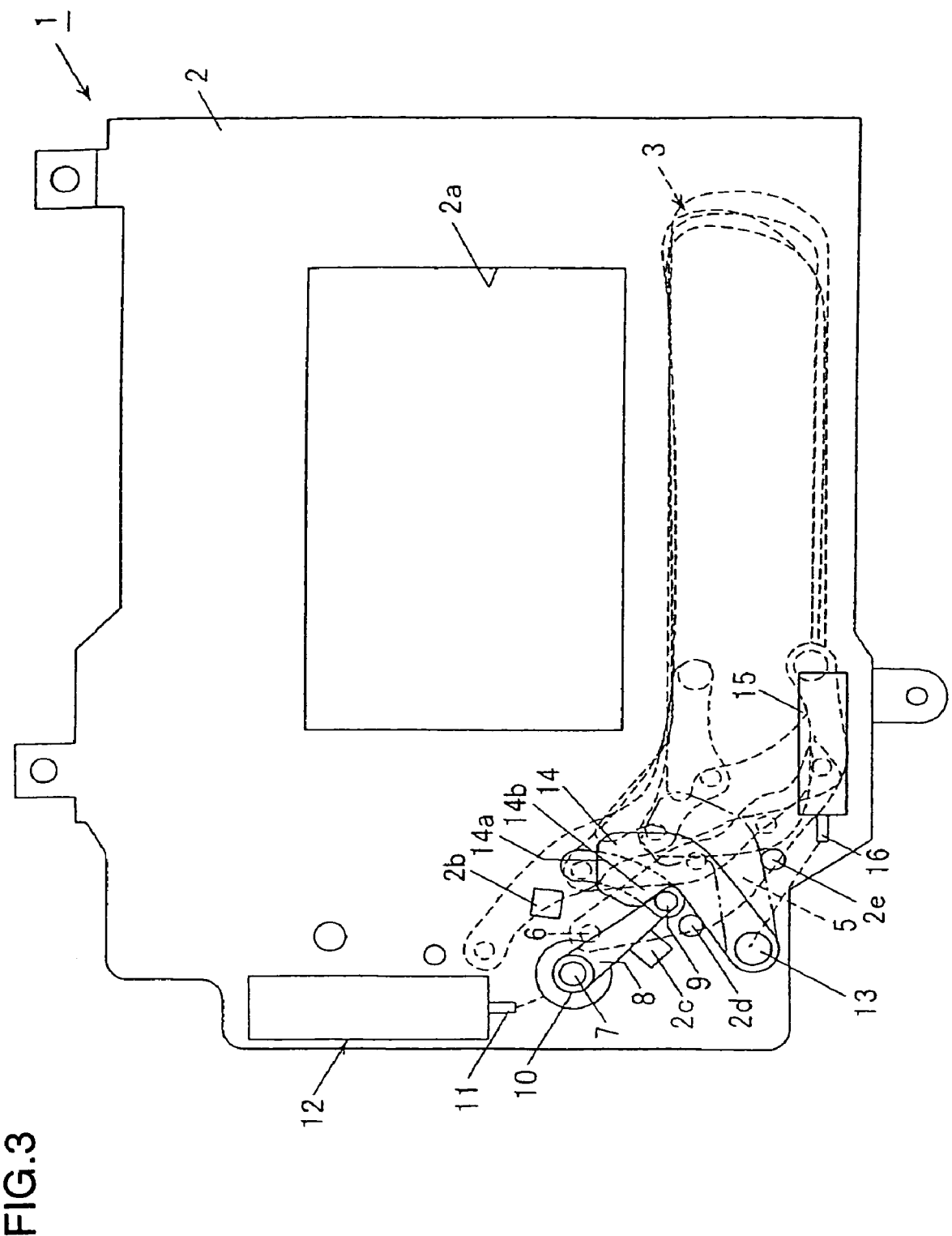
FIG. 3 is a front view of the shutter in a state in which the blade set is withdrawn and the aperture is open.

FIGS. 2 and 3 illustrate the structure of and different operating states assumed in the focal plane shutter 1. FIG. 2 is a front view of the focal plane shutter 1 in a state in which an aperture 2a, i.e., the photographing aperture, is closed off by a single blade set 3. FIG. 3 shows a state in which the blade set 3 in FIG. 2 has been withdrawn to open the aperture 2a. The focal plane shutter 1 in FIGS. 2 and 3 includes a shutter baseplate 2 which is built into the electronic camera 51. The aperture 2a assuming a rectangular shape is provided at the shutter baseplate 2, and the blade set 3 used to open/close the aperture 2a is mounted at the shutter baseplate 2 via a blade arm 5. The blade arm 5 is allowed to rotate around a spindle 6.

In addition, a blade drive lever (drive member) 8, which is allowed to rotate around a support shaft 7, is disposed at the shutter baseplate 2. The front end of the drive lever 8 is linked to the blade arm 5 via an operating pin 9. In addition, a gear 10 having the same center of rotation as that of the spindle 7 is fixed to the drive lever 8 as an integrated part thereof. A pinion gear (not shown) coupled with a pinion shaft 11 of a main motor 12, which constitutes an electromagnetic actuator, interlocks with the gear 10 so as to communicate a rotational drive force from the main motor 12.

As the main motor 12 rotates in the closing direction so as to move the blade set 3 in the closing direction, the drive lever 8 rotates in the counterclockwise direction in FIG. 2 (FIG. 3) to come into contact with a close position regulating projection 2b at the shutter baseplate 2, and thus, the turning movement of the drive lever is regulated. If, on the other hand, the main motor 12 rotates in the opening direction so as to move the blade set 3 in the opening direction, the drive lever 8 rotates in the clockwise direction in FIG. 2 (FIG. 3) to come into contact with a open position regulating projection 2c at the shutter baseplate 2, and the turning movement of the drive lever is thus regulated.

The main motor 12 is structured so as to hold the drive lever 8 with stability at the positions indicated in FIGS. 2 and 3. Namely, by stopping the rotation of the main motor 12 so that the drive lever 8 rests at the close position in FIG. 2, the blade set 3 can be held in place with a high degree of stability in the closed state. In addition, by stopping the rotation of the main motor 12 so that the drive lever 8 rests at the open position, the blade set 3 can be held in place with a high degree of stability in the open state.

The power supply to the main motor 12, with which the drive lever 8 rotates counterclockwise, is referred to as a reverse power supply, whereas the power supply to the main motor 12 with which the drive lever 8 rotates clockwise is referred to as a forward power supply. In response to a reverse power supply to the main motor 12, the blade arm 5 rotates counterclockwise around the pinion 6 together with the drive lever 8, and thus, the aperture 2a becomes closed by the blade set 3.

In response to a forward power supply to the main motor 12, the blade arm 5 rotates clockwise around the pinion 6 together with the drive lever 8, thereby causing the blade set 3 to open the aperture 2a. Since the opening/closing drive of the blade set 3 is achieved with the main motor 12 in the focal plane shutter 1, the shutter 1 does not require any mechanical charge mechanism.

A holding lever (holding member) 14 is disposed at the shutter baseplate 2 in order to hold the drive lever 8 at the positions indicated in FIGS. 2 and 3 with further reliability. The holding lever 14, which is made to rotate as one with a pinion shaft 16 of a sub-motor 15 constituting an electromagnetic actuator, rotates around a supporting shaft 13 between the holding position (indicated by the solid line in FIGS. 2 and 3) and the hold release position (indicated by the 2-point chain line in FIGS. 2 and 3).

As the sub-motor 15 rotates to turn the holding lever toward the holding position, the holding lever 14 comes into contact with a holding position regulating projection 2d at the shutter baseplate 2 shown in FIGS. 2 and 3 and thus, the rotation of the holding lever toward the holding position becomes regulated. At this time, the holding lever 14 holds the drive lever either at the position (see FIG. 2) corresponding to the closed state of the blade set 3 or the position (see FIG. 3) corresponding to the open state of the blade set 3.

When the aperture 2a is closed by the blade set 3, a projected upper end 14a of the holding lever 14 restricts the movement of the drive lever 8 in the opening direction so that the blade set is not allowed to open the aperture. When the aperture 2a is opened by the blade set 3, a projected lower end 14b of the holding lever 14 restricts the movement of the drive lever 8 in the closing direction so that the blade set is not allowed to close the aperture. Namely, the holding lever 14 restricts the movement of the drive lever 8 by contacting the drive lever 8. Accordingly, even if the electronic camera 51 is subjected to an impact while the drive lever 8 is held at the position indicated in FIG. 2 or FIG. 3, the drive lever 8 is firmly held by the holding lever 14 to prevent the impact from causing any movement of the blade set 3.

In the embodiment, the drive operation of the holding lever 14 for sustaining the closed state is identical to the drive operation of the holding lever 14 for sustaining the open state. Namely, the holding lever 14 operates in exactly the same manner. These two different states, however, are sustained on hold by using different portions of the holding lever 14 to come into contact with the drive lever 8 to hold the closed state and to hold the open state.

As the sub-motor 15 rotates to drive the holding lever toward the hold release position, the holding lever 14 comes into contact with a hold release position regulating projection 2e at the shutter baseplate 2 in FIGS. 2 and 3, and thus, the rotation of the holding lever toward the hold release position becomes regulated. At this time, the hold of the holding lever 14 on the drive lever 8 is released.

Figure 4:
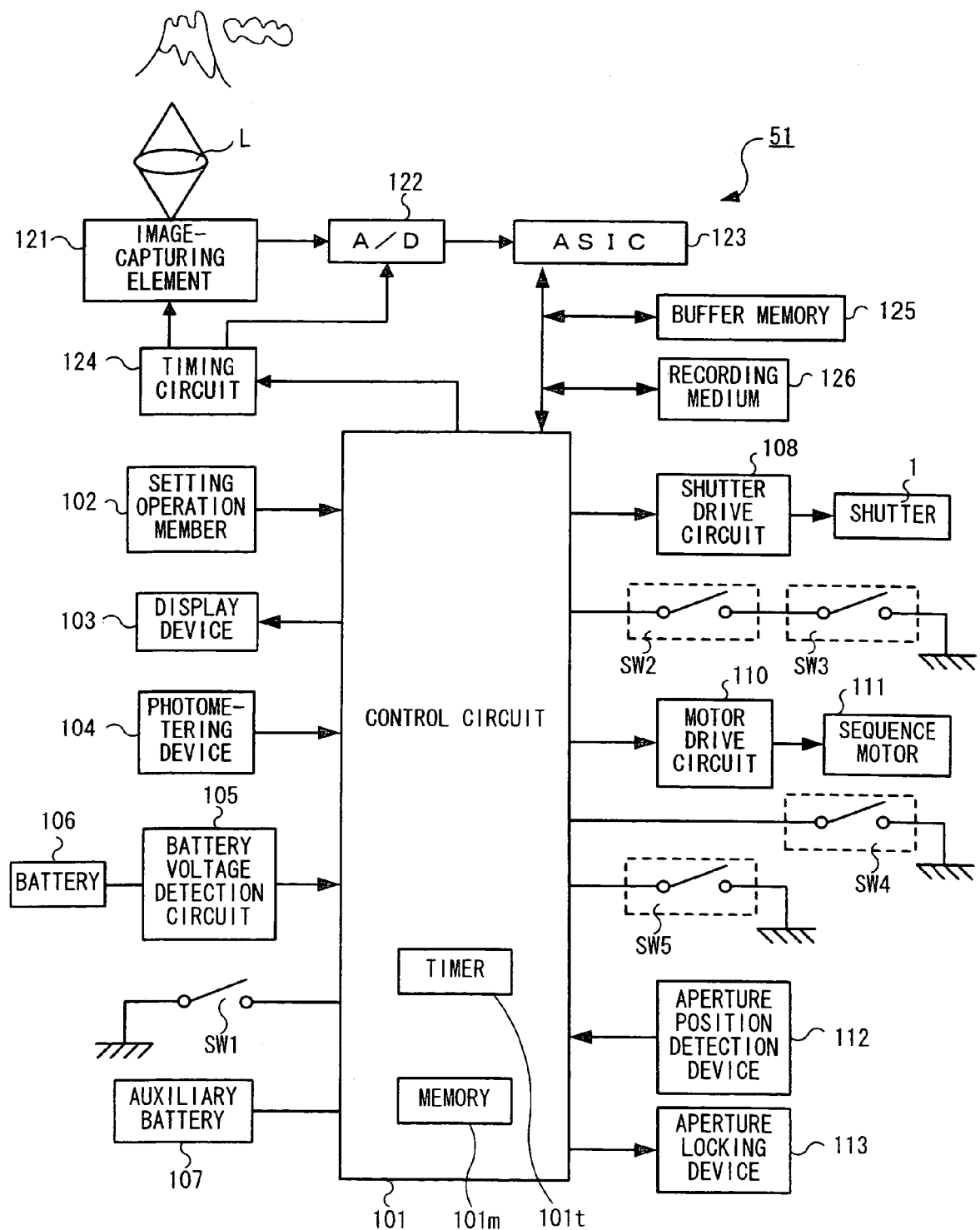
FIG. 4 is a block diagram showing the structure of the electronic camera.

FIG. 4 is a block diagram of the structure adopted in the electronic camera 51. An arithmetic operation circuit (control circuit) 101 in FIG. 4 is constituted with a microcomputer and the like. The arithmetic operation circuit 101 includes CPU peripheral circuits such as a memory 101m and a timer circuit 101t. The arithmetic operation circuit 101 executes specific arithmetic operations by using signals input thereto from various blocks to be detailed later and outputs control signals to the individual blocks based upon the results of the arithmetic operations. The memory 101m constituted with a non-volatile memory stores in memory various flags to be explained later.

A setting operation member 102 may be constituted with, for instance, buttons and a command dial. The setting operation member 102 outputs operation signals corresponding to setting operations to the arithmetic operation circuit 101. The arithmetic operation circuit 101 sets the shutter speed, the aperture value and the like based upon the operation signals.

A display device 103 brings up a display indicating the shutter speed (shutter time) and the aperture value in response to an instruction issued by the arithmetic operation circuit 101. A photometering device 104 detects the quantity of light having passed through the photographic lens L. It is to be noted that the full open aperture value of the photographic lens L is F2.8 and that control is enabled over a range of F2.8 to F22.

A battery voltage detection circuit 105 detects the voltage of the power supplied from a battery 106 to the arithmetic operation circuit 101 and the individual blocks in the electronic camera 51, and outputs a detection signal to the arithmetic operation circuit 101. The arithmetic operation circuit 101 checks the detection signal provided by the battery voltage detection circuit 105 to detect any voltage decrease at the battery 105 that would result in operational errors in receiving and transmitting signals at the individual blocks in the electronic camera 51.

A shutter release switch SW1, which enters an on state by interlocking with depression of a shutter release button (not shown), shifts into an off state as the shutter release button having been held down is released. An operation signal generated at the shutter release switch SW1 is used to trigger a photographing start instruction.

An auxiliary battery 107 supplies power to the arithmetic operation circuit 101 and the various blocks if a voltage decrease, which would cause operational errors at the individual blocks, occurs at the battery 106 or if the voltage at the battery 106 is lowered to 0V. It is to be noted that power is supplied from the battery 106 under normal circumstances.

A shutter drive circuit 108 opens/closes the blade set 3 through a forward power supply or a reverse power supply to the main motor 12 which drives the focal plane shutter 1. It also causes the sub-motor 15 to rotate forward and backward. When the sub-motor 15 rotates forward, the holding lever 14 is driven to release the hold on the drive lever, whereas when the sub-motor 15 rotates backward, the holding lever 14 is driven to hold the drive lever. Shutter switches SW2 and SW3 are used to detect the blade set 3 in a closed state and in an open state respectively. The shutter switch SW2 shifts from an on state to an off state when the blade set 3 has closed the aperture 2a completely (when the aperture set 3 has moved in the closing direction slightly after completely closing the aperture, to be more exact). The shutter switch SW3, on the other hand, shifts from an on state to an off state when the blade set 3 has completely withdrawn from the aperture 2a (when the blade set 3 has moved slightly further in the opening direction after completely opening the aperture, to be more exact). The shutter switches SW2 and SW3 are each turned on or off depending upon the position to which the drive lever 8 is rotated (see FIGS. 2 and 3). It is to be noted that the lengths of time required to open and close the focal plane shutter 1 (e.g., the lengths of time over which the blade set 3 runs) are each approximately 11 msec.

The shutter switches SW2 and SW3 are connected in series, the individual signals generated at the shutter switches SW2 and SW3 are synthesized, and the synthesized signal is input to a single input port at the arithmetic operation circuit 101. Thus, when the shutter switches SW2 and SW3 are both in an on state (the serial connection output: on), an input signal at L level is input to the arithmetic operation circuit 101, whereas when at least either the shutter switch SW2 or the shutter switch SW3 is in an off state (serial connection output: off), an input signal at H level is input to the arithmetic operation circuit 101. It is to be noted that the input port at the arithmetic operation circuit 101 is internally pulled up so as to assume that an H level signal is input when there is actually no input (serial connection output: off).

A motor drive circuit 110 controls the rotation of a sequence motor 111 in response to a command issued by the arithmetic operation circuit 101. The sequence motor 111 constitutes an image-capturing sequence drive mechanism.

The image-capturing sequence drive mechanism controls the photographing sequence in which the mirror 61 is raised/lowered, the aperture (not shown) is driven and the like through drive control of the sequence motor 111.

Sequence switches SW4 and SW5, which are part of the image-capturing sequence drive mechanism, are used to generate sequence control timing. The sequence switch SW4 is structured so that it remains in an on state while the mirror is at a lowered position, enters an off state immediately after a mirror up operation starts and shifts back into an on state at the end of the mirror up operation. The sequence switch SW5, which is structured so that it shifts from an off state to an on state while a mirror down operation is in progress and shifts from an on state to an off state approximately 11 msec before the end of the mirror up operation, generates the timing with which the operation of the main motor 12 starts. The length of time 11 msec corresponds to the length of time required to open or close the focal plane shutter 11 mentioned earlier.

An aperture position detection device 112 detects the aperture position to which the aperture is set by the sequence drive mechanism and outputs a detection signal to the arithmetic operation circuit 101. An aperture locking device 113 stops the aperture being driven and locks the aperture at a specific aperture value. The sequence drive mechanism is structured so that the aperture locked by the aperture locking device 113 becomes released while the mirror down operation is in progress.

The image-capturing element 121 captures a subject image having passed through the photographic lens L and outputs image signals constituted of stored electrical charges. The image-capturing sensitivity (exposure sensitivity) of the image-capturing element 121 is set to a level equivalent to ISO 100. In addition, the image-capturing element 121 has the electronic shutter function as explained earlier and a setting can be selected in specific steps within a 1 sec through $\frac{1}{16,000}$ sec range. The A/D conversion circuit 122 converts analog image signals output from the image-capturing element 121 to digital signals. An image processing circuit 123 constituted of an ASIC or the like executes image processing such as white balance (WB) adjustment on the digital signals, compression processing for compressing the image data resulting from the image processing into a specific format, decompression processing for decompressing the compressed data and the like.

A timing circuit 124 generates timing signals needed to engage the image-capturing element 121 and the A/D conversion circuit 122 in operation and outputs the respective timing signals to the image-capturing element 121 and the A/D conversion circuit 122. In a buffer memory 125, image data to undergo various types of processing including the image processing, the compression processing and the decompression processing are temporarily stored. A recording medium 126 is a recording medium such as a memory card, which can be detachably loaded into the electronic camera 51. Image data having undergone the compression processing are recorded in the recording medium 126.

The present invention is characterized by the sequence control achieved with the image-capturing sequence drive mechanism. FIGS. 5 through 9 are timing charts illustrating the timing with which the image-capturing sequence drive mechanism and the image-capturing element 121 operate.

Figure 5:
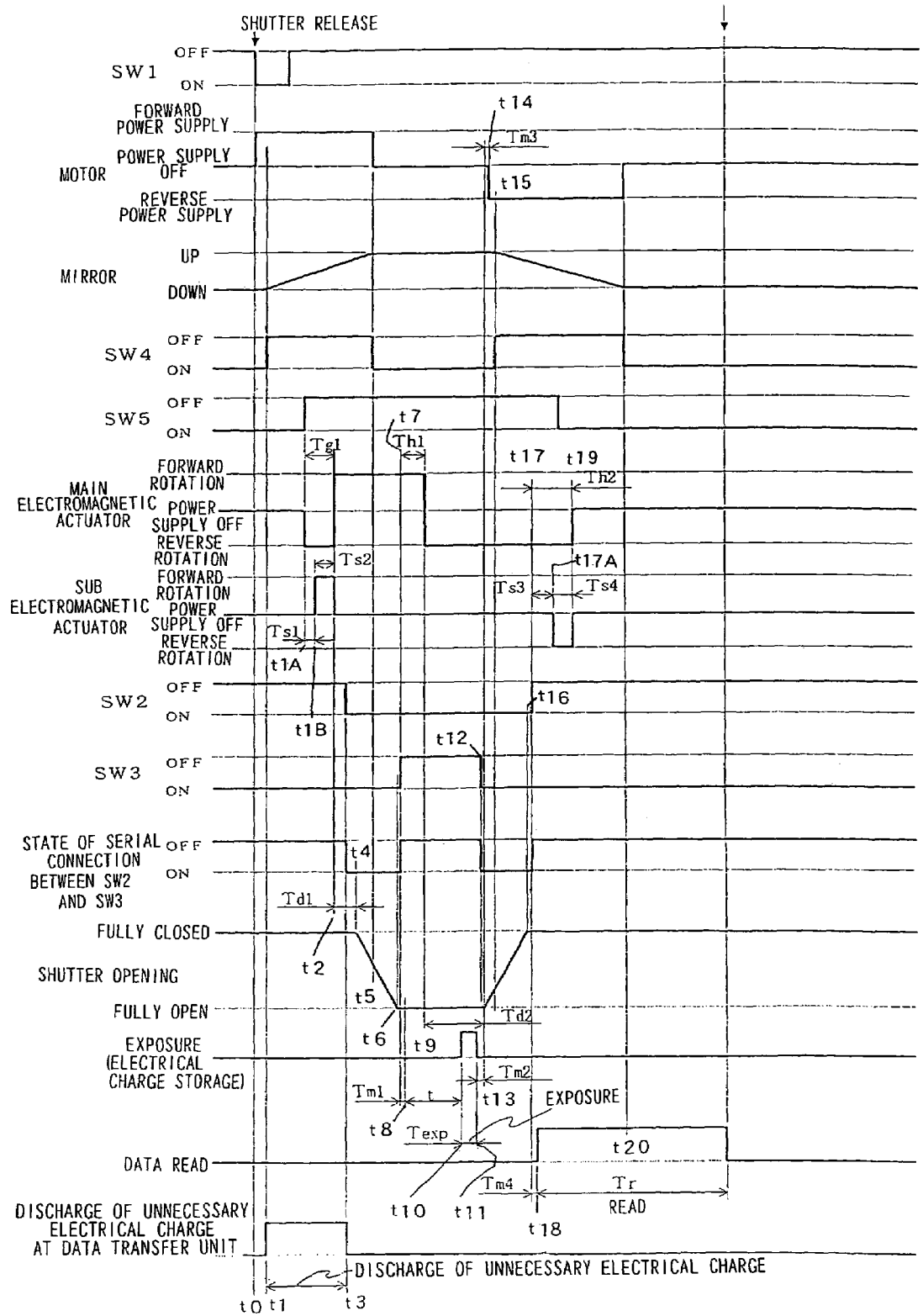
FIG. 5 shows the operational timing of the image-capturing sequence drive mechanism and the image-capturing element.

A signal "SW1" in FIG. 5 indicates the waveform of the operation signal generated from the shutter release switch. A signal "motor" indicates the waveform of the power supplied to the sequence motor. A signal "mirror" indicates the up/down state of the drive mechanism (not shown) of the mirror 61. Signals "SW4" and "SW5" indicate the waveforms of the signals generated from the respective sequence switches. A signal "main electromagnetic actuator" indicates the waveform of the power supplied to the main motor 12. A signal "sub electromagnetic actuator" indicates the waveform of the power supplied to the sub-motor 15.

Signals "SW2" and "SW3" indicate the waveforms of the signals generated from the respective shutter switches. A signal "state of serial connection between SW2 and SW3" indicates the waveform of the serially synthesized signal achieved by synthesizing the signals "SW2" and "SW3". A waveform "shutter opening" indicates the open/closed state of the focal plane shutter 1. A signal "exposure" indicates the waveform of the electrical charge storage instruction for the image-capturing element 121. A signal "data read" indicates the waveform of a data (stored electrical charge) read instruction for reading data from the image-capturing element 121. A signal "discharge of unnecessary electrical charge" indicates the waveform of a pre-exposure discharge of electrical charge instruction for discharging electrical charges at the image-capturing element 121.

As an operation signal (from off to on) is generated at the shutter release switch at time point t0, a forward power supply to the sequence motor 111 which drives the mirror 61 and the aperture (not shown) starts. With the forward power supply, the sequence motor 111 is driven in the direction to raise the mirror and set the aperture. As the mirror starts to move upward at time point t1, the sequence switch SW4 is turned off. At time point t1A, at which the mirror up operation and the aperture setting operation are still in progress, the sequence switch SW5 enters an off state, thereby starting a reverse power supply to the main motor (actuator) 12, and, as a result, the main motor 12 rotates in the reverse direction. Through the reverse rotation of the main motor 12, the blade set 3 is driven in the closing direction. Thus, the drive lever 8 is firmly set in contact with the close position regulating projection 2b at the shutter baseplate 2 (see FIG. 2).

When a wait time Ts1 (e.g., 2 msec) elapses following time point t1A, a forward power supply to the sub-motor (actuator) 15 starts at time point t1B and the sub-motor 15 rotates forward. The forward rotation of the sub-motor 15 drives the holding lever 14 toward the hold release position. Accordingly, the holding lever 14 starts to move toward the hold release position while the drive lever 8 maintains contact with the close position regulating projection 2b at the shutter baseplate 2 (see FIG. 2).

When a power supply period Ts2 (8 msec) elapses following time point t1B, the forward power supplied to the sub-motor 15 stops and a forward power supply to the main motor 12 starts at time point t2. In response, the main motor 12 rotates forward in a state in which the hold on the drive lever 8 is released. While the main motor 12 rotates forward, the blade set 3 is driven in the opening direction. The length of the period Tg1 of the reverse power supply to the main motor 12 is the sum of the wait time Ts1 and the power supply period Ts2.

The length of the time delay Td1 following the start of the forward rotation of the main motor 12 and is sustained until the blade set 3 starts to open the aperture 2a (at time point t4), may be, for instance, 9 msec. The shutter switch SW2 is structured so that it shifts from an off state to an on state at time point t3 which is approximately halfway through the time delay Td1. Accordingly, the signal "state of serial connection between SW2 and SW3" invariably enters an on state before the blade set 3 starts to open the aperture 2a, and thus, this time point t3 is used as the timing with which the discharge of unnecessary electrical charge ends.

As the mirror up operation ends at time point t5, the sequence switch SW4 is turned on, and the power supply to the sequence motor 111 is stopped with this timing.

The shutter switch SW3 is structured so that it shifts from an on state to an off state at time point t7 at which the blade set 3 has further moved in the opening direction slightly after opening the aperture 2a (at time point t6). When a predetermined length of time Th1 (e.g., 8 msec) elapses following time point t7, the power supply to the main motor 12 is switched from the forward power supply to the reverse power supply at time point t9. By further sustaining the positive power supply over the specific length of time Th1 beyond time point t7, the adverse effect of bounce and the like that occur when the blade set 3 becomes fully opened is minimized. Furthermore, the length of operating time over which the blade set 3 is subsequently driven to close the aperture (in particular, a time delay Td2 to be detailed later) is stabilized. It is to be noted that the time length Th1 is referred to as a holding time.

The time delay Td2 which follows the switch of the power supply (time point t9), e.g., the start of reverse rotation of the main motor 12, and ends when the blade set 3 starts to close the aperture 2a (at time point t13) maybe, for instance, 9 msec. This time delay Td2 occurs due to the delay with which the rotational drive force from the main motor 12 is transmitted to the blade set 3. It is to be noted that the reverse rotation of the main motor 12 drives the blade set 3 in the closing direction.

The shutter switch SW3 shifts from an off state to an on state at time point t12 at which the blade set 3 starts moving in the closing direction. The timing t13 described above corresponds to the time point at which the blade set 3 moves slightly in the closing direction and actually starts to close the aperture 2a.

A reverse power supply to the sequence motor 111 starts at time point t14 when a predetermined length of time Tm3 (e.g., 1 msec) elapses following time point t13. With the reverse power supply, the sequence motor 111 is driven in the direction to lower the mirror and open the aperture. As the mirror down operation starts at time point t15, the sequence switch SW4 enters an off state.

The shutter switch SW2 is structured so that it shifts from an on state to an off state at time point t17 at which the blade set 3 has further moved in the closing direction slightly after closing the aperture 2a (at time point t16). When a wait time Ts3 (e.g., 10 msec) elapses following time point t17, a reverse power supply to the sub-motor 15 starts at time point t17A and, in response, the sub-motor 15 rotates in the reverse direction. The reverse rotation of the sub-motor 15 drives the holding lever 14 toward the holding position. Thus, the holding lever 14 starts to move toward the holding position while the drive lever 8 maintains contact with the close position regulating projection 2b at the shutter baseplate 2 (see FIG. 2).

When a power supply period Ts4 (e.g., 8 msec) elapses following time point t17A, the reverse power supply to the sub-motor 15 stops and the reverse power supply to the main motor 12 also stops at time point t19.

The reverse power supply to the motor 12 stops when a holding time Th2 (Ts3+Ts4=18 msec) elapses following time point t17. By further sustaining the reverse power supply for approximately 20 msec after time point t17, the adverse effect of bounce and the like occurring when the blade set 3 stops is minimized. Moreover, the length of operating time over which the blade set 3 is driven to open the aperture to capture an image for the next frame (in particular, the time delay Td1 explained above) is stabilized.

As the mirror down operation is completed and the aperture is reset to the open state, the sequence switch SW4 shifts from an off state to an on state (at time point t20) and the reverse power supply to the sequence motor 111 stops.

The electrical charge storage (exposure) at the image-capturing element 121 is started at or after time point t8 which follows a pre-exposure time margin Tm1 (e.g., 1 msec) after time point t7 and it ends at time point t11 preceding time point t13 by a post-exposure time margin Tm2 (e.g., 1 msec). Accordingly, the length of time t to elapse between time point t8 and time point t10 at which the exposure actually starts is adjusted in correspondence to the setting for the exposure time (shutter speed) Texp.

Figure 6:
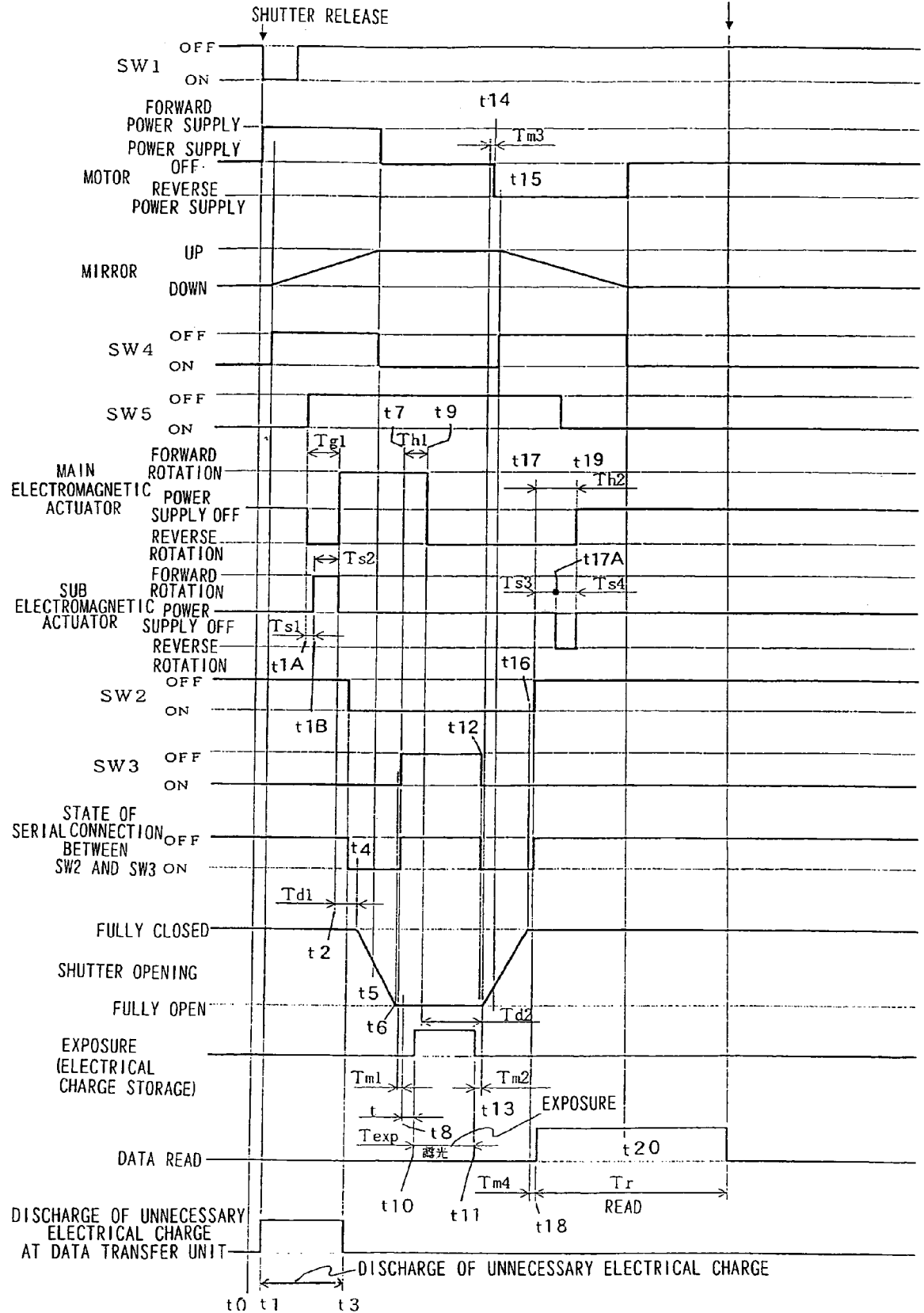
FIG. 6 shows the operational timing of the image-capturing sequence drive mechanism and the image-capturing element.

The timing chart in FIG. 5 represents an example of the camera operation executed when Texp<(Td2−Tm2) is true. The operation executed when a longer exposure time is selected and (Td2−Tm2)≦Texp<(Th1+Td2−Tm1−Tm2) is true corresponds to the timing chart in FIG. 6 instead of the one in FIG. 5. In FIG. 6, the exposure starts at time point t10 which precedes time point t9. It is to be noted that the exposure ends with the same timing at time point t11, as in the timing chart in FIG. 5.

Figure 7:
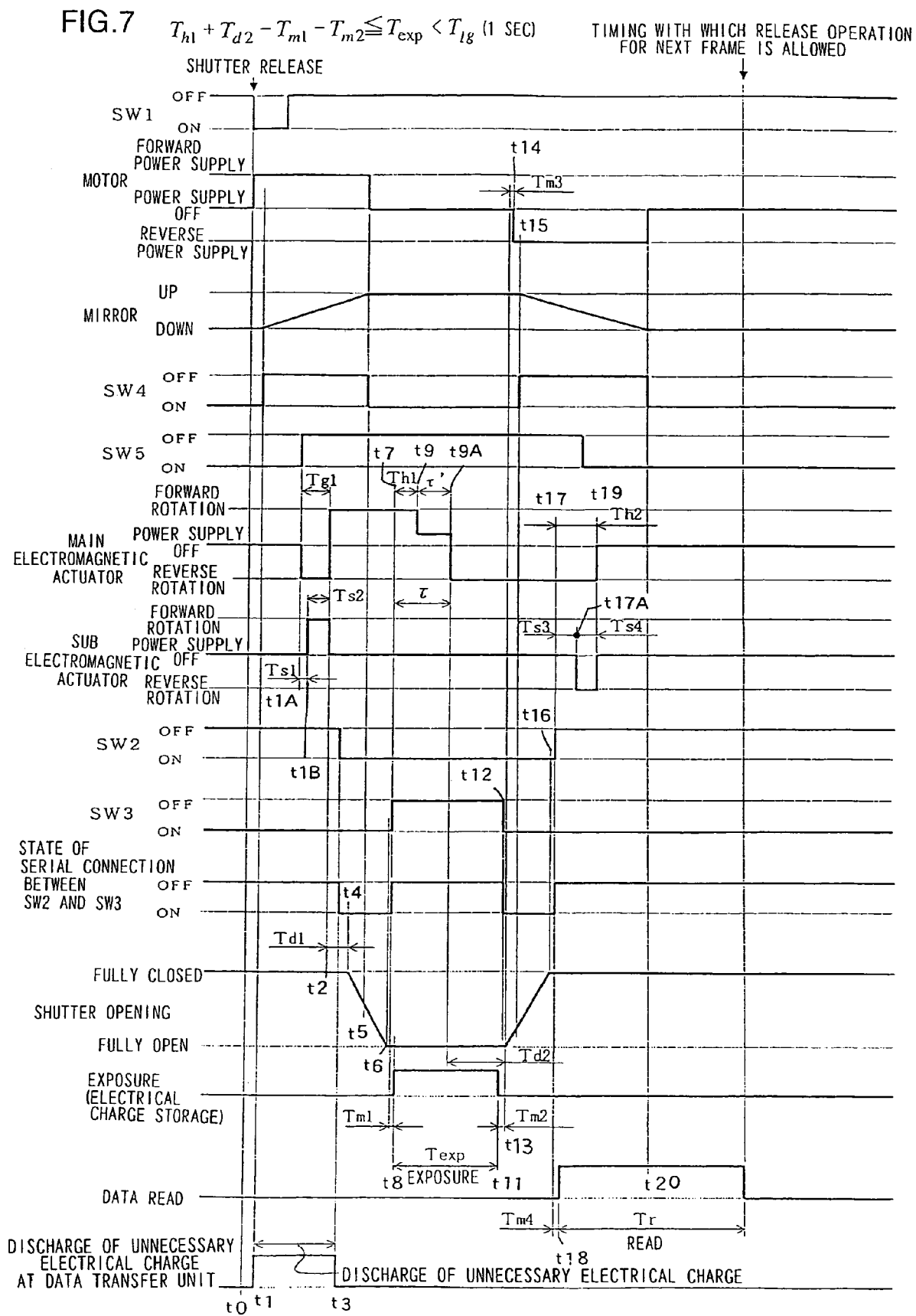
FIG. 7 shows the operational timing of the image-capturing sequence drive mechanism and the image-capturing element.

If the exposure time Texp is set even longer and (Th1+Td2−Tm1−Tm2)≦Texp<Tlg is true, the operation is executed as shown in the timing chart in FIG. 7 instead of FIG. 6. Tlg may assume any value between 0.5 sec and 2 sec, e.g., 1 sec. In FIG. 7, the timing with which the power supplied to the main motor 12 is switched from the forward power supply to the reverse power supply is shifted to time point t9A preceded by a time length T which elapses after time point t7. In other words, the forward power supply is further sustained for the time length τ after the blade set 3 of the shutter 1 becomes fully open at time point t7. It is to be noted that the level of the power supply to the main motor 12 is reduced to approximately ⅓ of the initial level (at time point t9) once the holding time Th1 elapses after time point t7. The time length τ, which is determined in correspondence to the setting for the exposure time (shutter speed), is to be described in detail later. The exposure is started at time point t8 and ends at time point t11.

Figure 8:
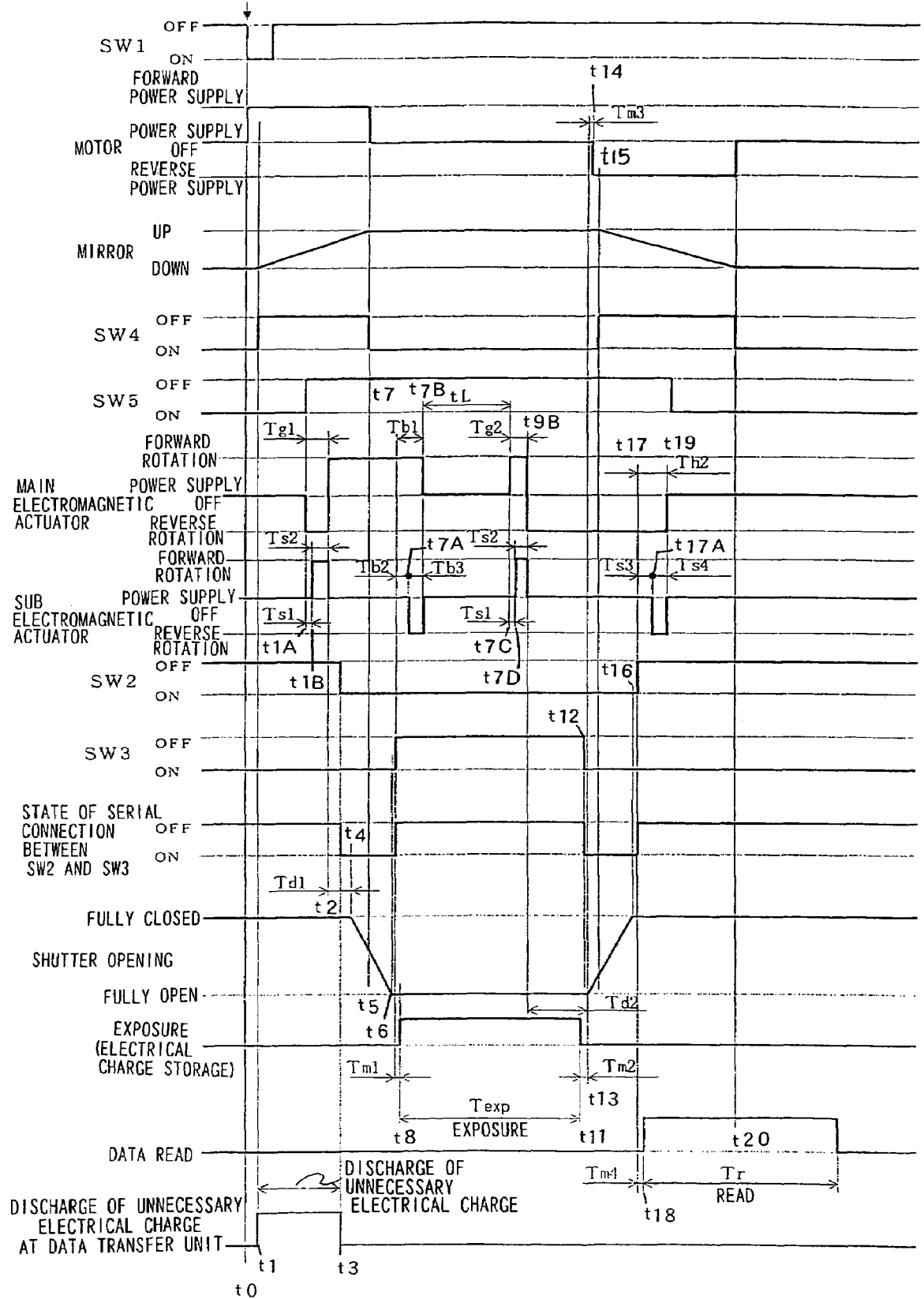
FIG. 8 shows the operational timing of the image-capturing sequence drive mechanism and the image-capturing element.

If the exposure time Texp is set equal to or greater than 1 sec and Texp≧Tlg is true, the operation is executed as shown in the timing chart in FIG. 8 instead of FIG. 7. The timing chart in FIG. 8 differs from those in FIGS. 5 through 7 in that the drive lever 8 is held by the holding lever 14 while the drive lever 8 maintains contact with the open position regulating projection 2c of the shutter baseplate 2 (see FIG. 3) and the forward power supply to the main motor is temporarily stopped during the exposure.

A reverse power supply to the sub-motor 15 starts at time point t7A when a wait time Tb2 (e.g., 10 msec) elapses after the blade set 3 of the shutter becomes fully open at time point t7, and as a result, the sub-motor 15 rotates in the reverse direction. The reverse rotation of the sub-motor 15 drives the holding lever 14 toward the holding position. Accordingly, the holding lever 14 starts to move toward the holding position while the drive lever 8 maintains contact with the open position regulating projection 2c at the shutter baseplate 2 (see FIG. 3).

When a power supply period Tb3 (e.g., 10 msec) elapses following time point t7A, the reverse power supply to the sub-motor 15 stops and also the forward power supply to the main motor 12 stops at time point t7B. As a result, the drive lever 8 is held with the blade set 3 in a full open state and the main motor 12 stops. Namely, the forward power supply is further sustained for a time length Tb1 (the sum of the wait time Tb2 and the power supply period Tb3) after the blade set 3 at the shutter 1 becomes fully open at time point t7.

When a length of time tL elapses following time point t7B, a forward power supply to the main motor 12 starts to rotate the main motor 12 forward at time point t7C. While the main motor 12 rotates forward, the blade set 3 is driven in the opening direction. The forward rotation of the main motor 12 firmly sets the drive lever 8 in contact with the open position regulating projection 2c at the shutter baseplate 2 (see FIG. 3). It is to be noted that the time length tL, which is determined in correspondence to the setting for the exposure time (shutter speed), is to be described in detail later.

When the wait time Ts1 (e.g., 2 msec) elapses following time point t7C, a forward power supply to the sub-motor 15 starts at time point t7D and the sub-motor 15 rotates forward. The forward rotation of the sub-motor 15 drives the holding lever 14 toward the hold release position. Accordingly, the holding lever 14 starts to move toward the hold release position while the drive lever 8 maintains contact with the open position regulating projection 2c at the shutter baseplate 2 (see FIG. 3).

When the power supply period Ts2 (e.g., 8 msec) elapses following time point t7D, the forward power supply to the sub-motor 15 stops and a reverse power supply to the main motor 12 starts at time point t9B. In response, the main motor 12 rotates in the reverse direction in a state in which the hold on the drive motor 8 is released. While the main motor 12 rotates in the reverse direction, the blade set 3 is driven in the closing direction. The length of the period Tg2 of the forward power supply to the main motor 12 is the sum of the wait time Ts1 and the power supply period Ts2.

Figure 9:
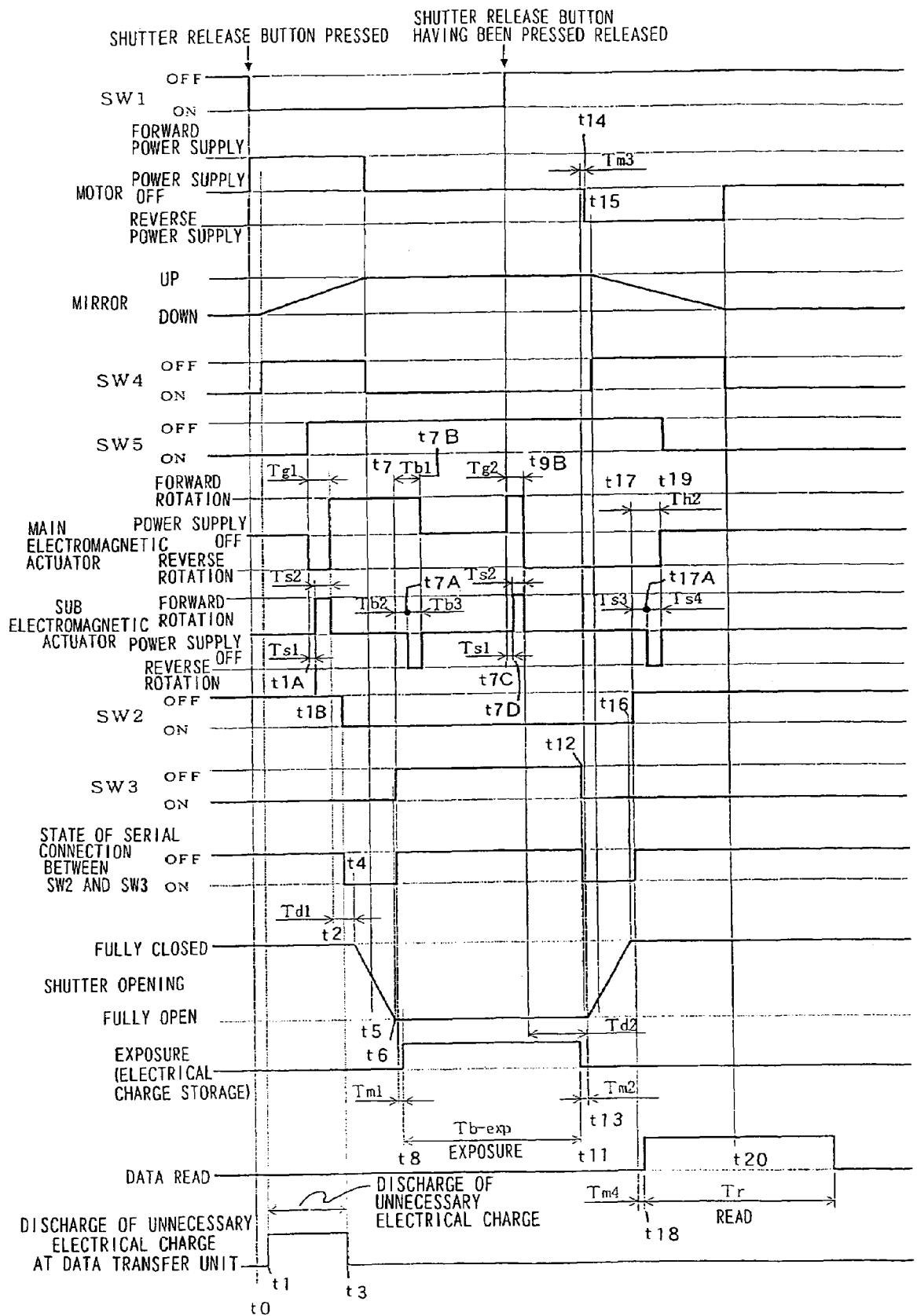
FIG. 9 shows the operational timing of the image-capturing sequence drive mechanism and the image-capturing element.

If the shutter speed setting is either "valve" or "time", the operation is executed as shown in the timing chart in FIG. 9 instead of FIG. 8. "valve" is a mode in which after the shutter release operation signal enters an on state, the exposure is completed by using the timing with which the shutter release operation signal shifts to an off state as a trigger. "time" is a mode in which the exposure is completed by using the timing with which the shutter release operation signal having switched from an on state to an off state shifts back into an on state as a trigger.

The timing chart in FIG. 9 differs from that in FIG. 8 in that the timing with which the operation signal from the shutter release switch shifts from an on state to an off state as the shutter release button having been held down is released is set at time point t7C in the "valve" photographing mode. However, the drive lever 8 is held by the holding lever 14 while the drive lever 8 maintains contact with the open position regulating projection 2c at the shutter baseplate 2 (see FIG. 3) and the forward power supply to the main motor is temporarily stopped during the exposure, as in FIG. 8.

In the "time" photographing mode, the timing with which the shutter release button is pressed down again after the shutter release button having been held down is released and the operation signal from the shutter release switch shifts back into an on state from the off state corresponds with time point t7C.

In each of FIGS. 5 through 7 explained above, the stored electrical charges are read out from the image-capturing element 121 over an electrical charge read time Tr starting at time point t18 which follows a pre-read time margin Tm4 (e.g., 1 msec) elapsing after time point t17. When the read time Tr has elapsed, a shutter release for the next frame is allowed.

Figure 10:
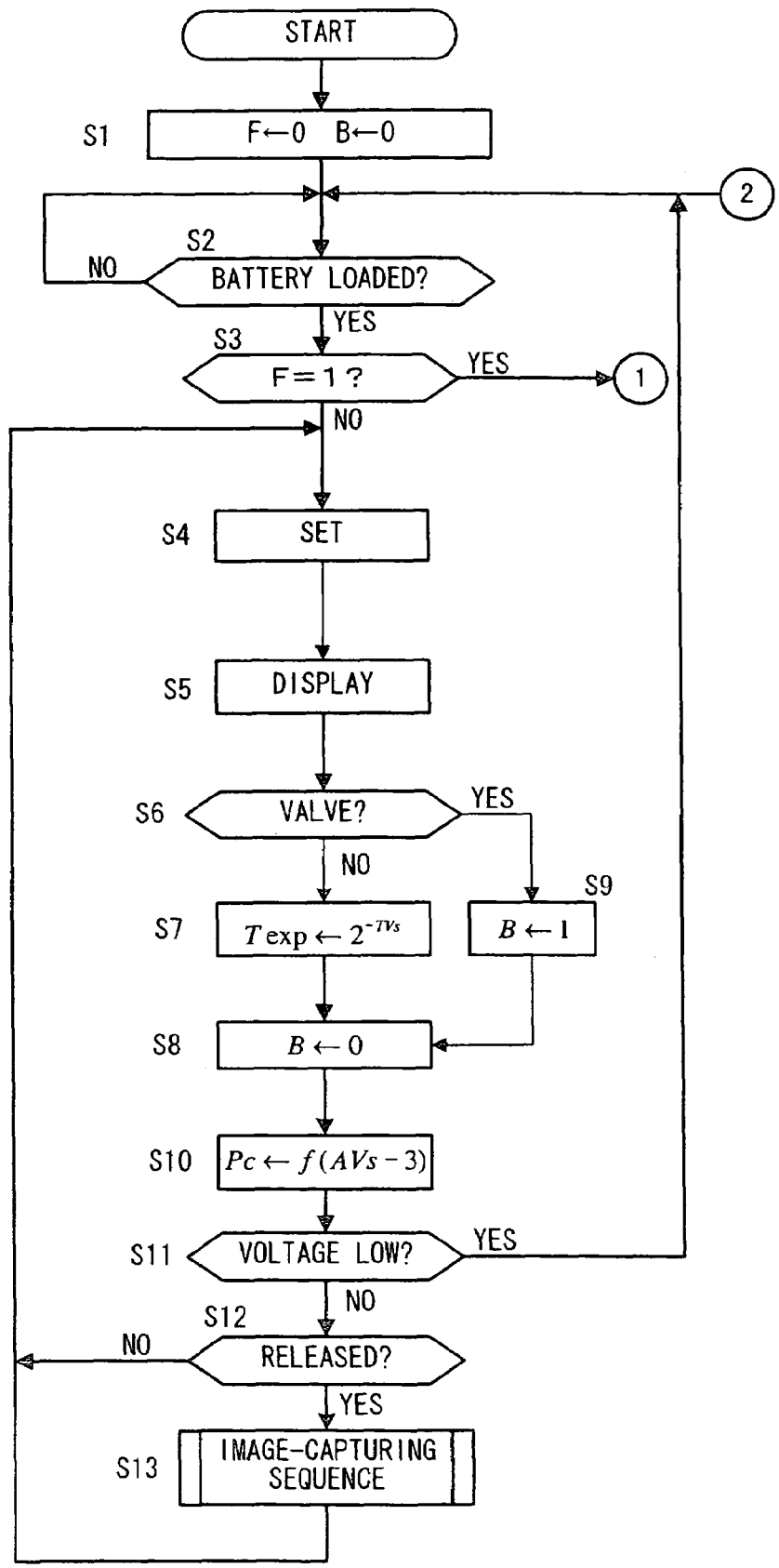
FIG. 10 presents a flowchart of the camera operation processing executed at the arithmetic operation circuit.
Figure 11:
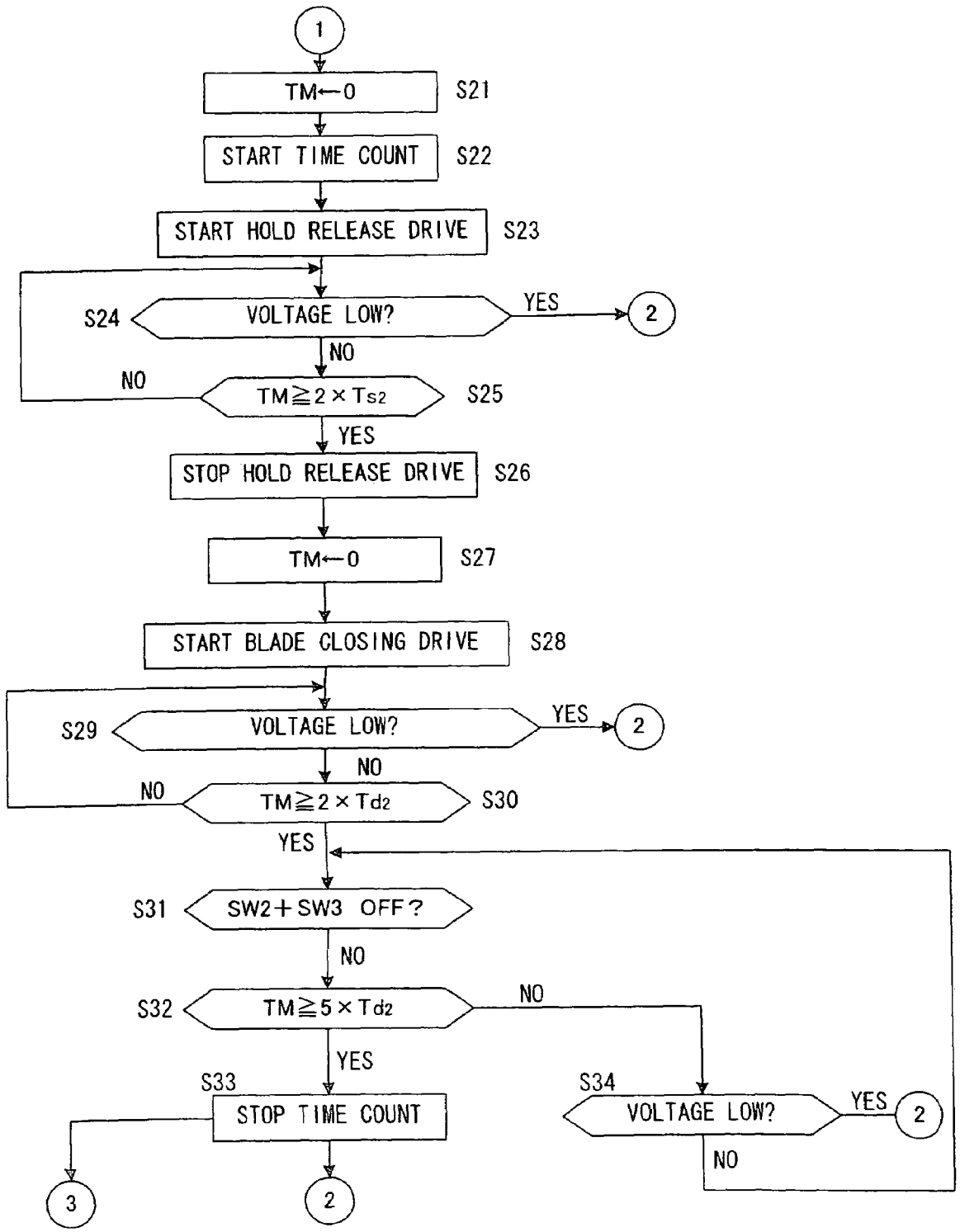
FIG. 11 presents a flowchart of the camera operation processing executed at the arithmetic operation circuit.
Figure 12:
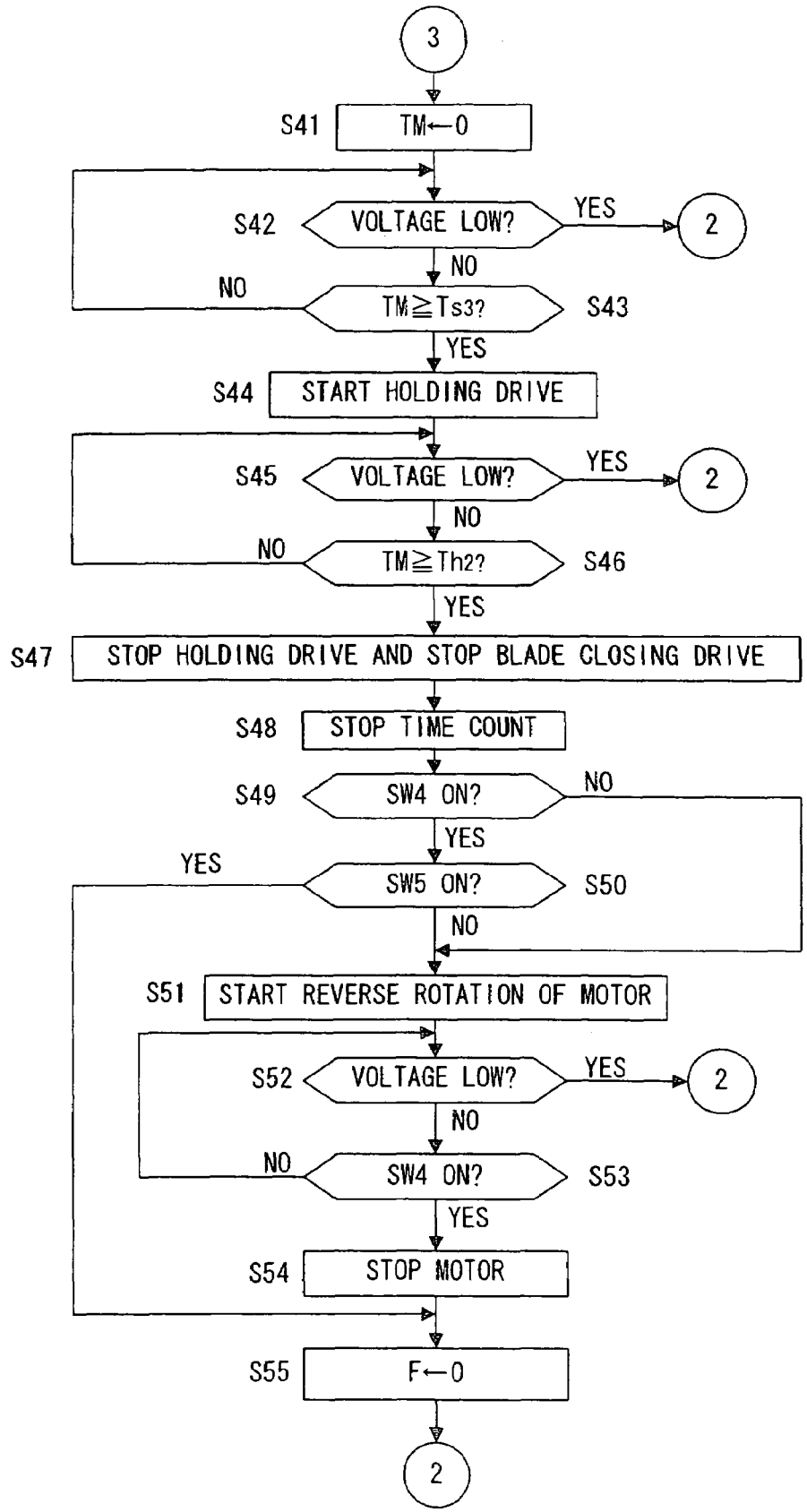
FIG. 12 presents a flowchart of the camera operation processing executed at the arithmetic operation circuit.
Figure 13:
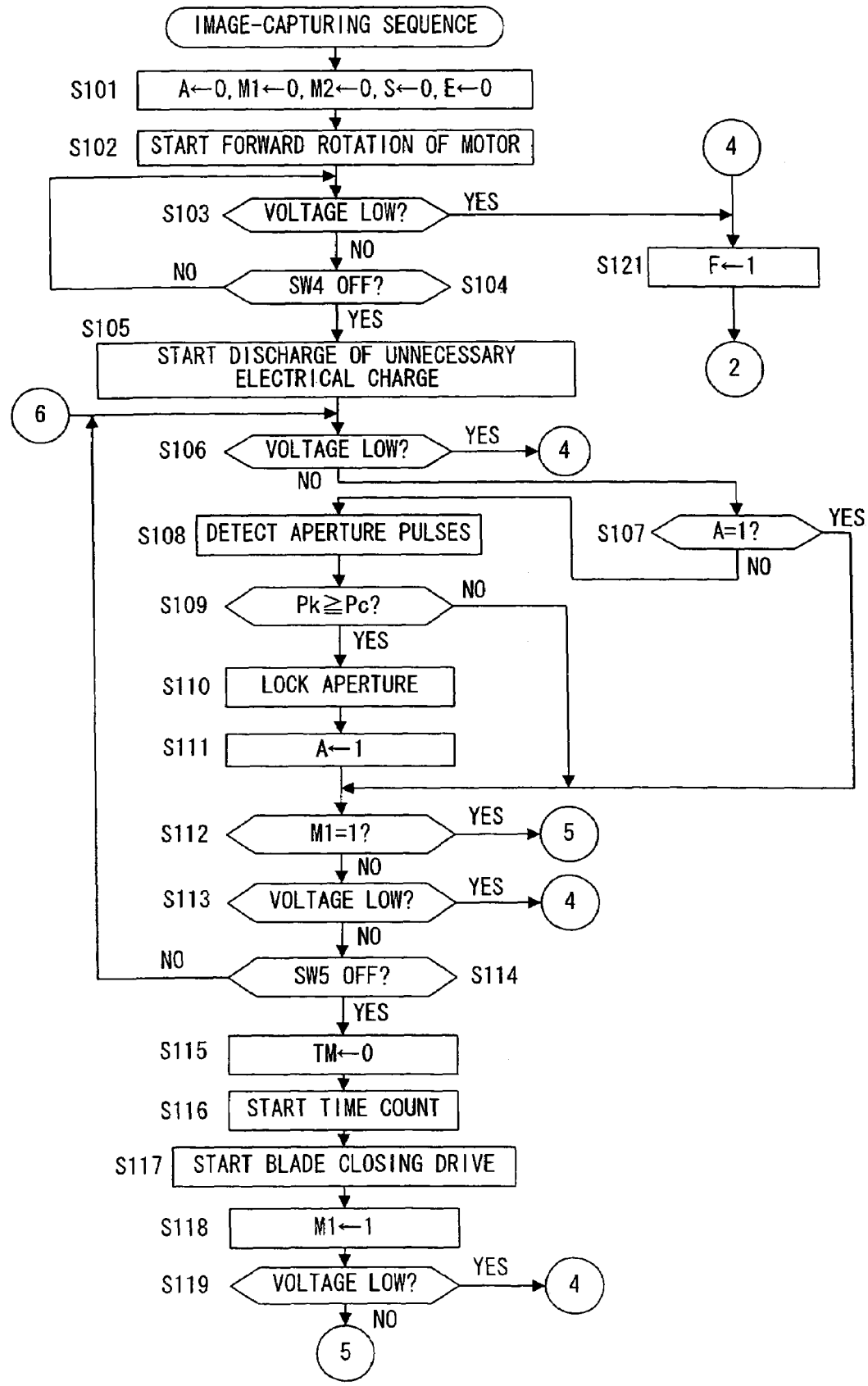
FIG. 13 presents a flowchart of the image-capturing sequence processing.

The flow of the camera operation processing executed in the arithmetic operation circuit 101 of the electronic camera 51 is explained in reference to the flowchart presented in FIGS. 10 through 12. The program in conformance to which the processing is executed as shown in the flowchart in FIG. 10 starts as the auxiliary battery (107) is loaded into the electronic camera 51.

In step S1 in FIG. 10, the arithmetic operation circuit 101 sets a flag A and a flag B both to 0 and then the operation proceeds to step S2. The flag F, which is an error flag, is set to 1 if the voltage at the battery 106 becomes low while the electronic camera 51 is engaged in operation and is set to 0 in response to an image-capturing sequence reset operation. The flag B, which is a valve flag, is set to 1 when "valve" is selected as the shutter speed setting and is set to 0 when a setting other than "valve" is selected.

In step S2, the arithmetic operation circuit 101 makes a decision by checking the voltage detection signal input from the battery voltage detection circuit 105 as to whether or not the battery 106 is loaded in the electronic camera 51. The arithmetic operation circuit 101 makes an affirmative decision in step S2 upon judging that the battery 106 is loaded and thus the electronic camera 51 is in an operation enabled state to proceed to step S3. The arithmetic operation circuit 101 makes a negative decision in step S2 upon judging that the battery 106 is not loaded or that the operation of the electronic camera 51 is not enabled at the detected battery voltage level to repeatedly execute this decision-making processing.

In step S3, the arithmetic operation circuit 101 makes a decision as to whether or not the flag F is currently set to 1. The arithmetic operation circuit 101 makes an affirmative decision in step S3 if F=1 to proceed to step S21 in FIG. 11, whereas it makes a negative decision in step S3 if F=0 to proceed to step S4. The operation proceeds to step S21 upon judging that the battery voltage has become low during the image-capturing sequence which is to be detailed later, and in step S21 and following steps, the image-capturing sequence reset operation is executed. The operation proceeds to step S4 upon judging that it is not necessary to execute the image-capturing sequence reset operation.

In step S4, the arithmetic operation circuit 101 sets the shutter speed, the aperture value and the like in correspondence to the setting operation signals from the setting operation member 102, and then the operation proceeds to step S5. In step S5, the arithmetic operation circuit 101 engages the display device 103 to display the details with regard to the settings for the aperture value and the shutter speed before the operation proceeds to step S6.

In step S6, the arithmetic operation circuit 101 makes a decision as to whether or not the "valve" setting is selected for the shutter speed. The arithmetic operation circuit 101 makes an affirmative decision in step S6 if "valve" has been set in step S4 to proceed to step S9, whereas it makes a negative decision in step S6 if "valve" has not been set in step S4 to proceed to step S7.

In step S7, the arithmetic operation circuit 101 calculates the exposure time $Texp=2^{-TVs}$ and then the operation proceeds to step S8. TVs is the apex value corresponding to the shutter speed setting.

In step S8, the arithmetic operation circuit 101 sets 0 for the flag B and then the operation proceeds to step S10. In step S9, the arithmetic operation circuit 101 sets 1 for the flag B and then the operation proceeds to step S10.

In step S10, the arithmetic operation circuit 101 calculates the number of control aperture pulses Pc as a function f of the number of aperture setting stages (AVc−3) Namely, it calculates Pc as f (AVc−3). In principle, the number of aperture setting stages and the number of aperture pulses detected by the aperture position detection device 112 have a proportional relation to each other. However, since a greater number of detected aperture pulses is output in the vicinity of the aperture full open setting, the number of control aperture pulses Pc is calculated as a function of the number of aperture setting stages (AVc−3). It is to be noted that AVs is the apex value corresponding to the aperture value setting. The value "3" in "−3" indicates the apex value corresponding to the open aperture value F2.8 of the photographic lens L described earlier.

In step S11, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S11 upon judging that the voltage at the battery 106 has become low to return to step S2. The arithmetic operation circuit 101 makes a negative decision in step S11 upon judging that the voltage at the battery 106 has not become low to proceed to step S12.

In step S12, the arithmetic operation circuit 101 makes a decision as to whether or not the shutter release switch SW1 has been turned on. The arithmetic operation circuit 101 makes an affirmative decision in step S12 if an operation signal has been input from the shutter release switch SW1 to proceed to step S13. If no operation signal has been input from the shutter release switch SW1, the arithmetic operation circuit 101 makes a negative decision in step S12 to return to step S4.

In step S13, the arithmetic operation circuit 101 executes the image-capturing sequence processing, and then the operation returns to step S4. The image-capturing sequence processing is to be explained in detail later. The sequence of photographic processing thus ends.

In step S21 and subsequent steps in FIG. 11, the image-capturing sequence reset processing is executed. In step S21, to which the operation proceeds after making an affirmative decision in step S3 as described above, the arithmetic operation circuit 101 clears a time count TM at the timer circuit 101$t$ to 0 before proceeding to step S22. It is to be noted that this time count TM is used in various types of time control including the control on the length of the electrical charge storage at the image-capturing element 121, i.e., the time count for the electronic shutter.

In step S22, the arithmetic operation circuit 101 starts a time count at the timer circuit 101$t$ before proceeding to step S23. In step S23, the arithmetic operation circuit 101 starts hold release drive before proceeding to step S24. More specifically, it outputs a command for the shutter drive circuit 108 to rotate the sub-motor 15 forward.

In step S24, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S24 upon judging that the voltage at the battery 106 has become low to return to step S2 in FIG. 10. The arithmetic operation circuit 101 makes a negative decision in step S24 upon judging that the voltage at the battery 106 has not become low to proceed to step S25.

In step S25, the arithmetic operation circuit 101 makes a decision as to whether or not TM≧(2×Ts2) is true with regard to the time count TM started in step S22. The arithmetic operation circuit 101 makes an affirmative decision in step S25 if TM≧(2×Ts2) is true, to proceed to step S26, whereas it makes a negative decision in step S25 if TM≧(2×Ts2) is not true, to return to step S24. The operation proceeds to step S26 on the assumption that the holding lever 14 has been firmly moved to the hold release position (the hold on the drive lever 8 has been released).

In step S26, the arithmetic operation circuit 101 stops the hold release drive and then the operation proceeds to step S27. More specifically, it outputs a command for the shutter drive circuit 108 to stop the sub-motor 15. In step S27, the arithmetic operation circuit 101 resets the time count TM to 0 before proceeding to step S28.

In step S28, the arithmetic operation circuit 101 starts drive of the blade set 3 in the closing direction before proceeding to step S29. In more specific terms, it outputs a command for the shutter drive circuit 108 to rotate the main motor 12 in the reverse direction.

In step S29, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S29 upon judging that the voltage at the battery 106 has become low to return to step S2 in FIG. 10. The arithmetic operation circuit 101 makes a negative decision in step S29 upon judging that the voltage at the battery 106 has not become low to proceed to step S30.

In step S30, the arithmetic operation circuit 101 makes a decision as to whether or not TM≧(2×Td2) is true with regard to the time count TM having been reset in step S27. The arithmetic operation circuit 101 makes an affirmative decision in step S30 if TM≧(2×Td2) is true, to proceed to step S31, whereas it makes a negative decision in step S30 if TM≧(2×Ts2) is not true, to return to step S29. The operation proceeds to step S31 on the assumption that the blade set 3 has started closing the aperture 2$a$.

In step S31, the arithmetic operation circuit 101 makes a decision as to whether or not the output of the serial connection achieved with the shutter switches SW2 and SW3 is in an off state. The arithmetic operation circuit 101 makes an affirmative decision in step S31 if the signal input to the input port for the shutter switches SW2 and SW3 is at H level to proceed to step S41 in FIG. 12. In this instance, the arithmetic operation circuit judges that the blade set 3 of the shutter 1 has completely closed the aperture 2$a$. If, on the other hand, the signal input to the input port for the shutter switches SW2 and SW3 is at L level, the arithmetic operation circuit 101 makes a negative decision in step S31 to proceed to step S32. In this case, the arithmetic operation circuit judges that the blade set 3 at the shutter 1 is currently engaged in the process of closing the aperture 2$a$.

In step S32, the arithmetic operation circuit 101 makes a decision as to whether or not TM≧(5×Td2) is true with regard to the time count TM having been reset in step S27. The arithmetic operation circuit 101 makes an affirmative decision in step S32 if TM≧(5×Td2) is true, to proceed to step S33, whereas it makes a negative decision in step S32 if TM≧(5×Td2) is not true, to proceed to step S34. The operation proceeds to step S33 if the blade set 3 having been engaged in the closing operation over a long enough period of time still has not closed the aperture 2$a$.

In step S33, the arithmetic operation circuit 101 stops the measurement of the time count TM and then the operation returns to step S2 in FIG. 10. Subsequently, the reset operation is executed again.

In step S34, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S34 upon judging that the voltage at the battery 106 has become low to return to step S2 in FIG. 10. The arithmetic operation circuit 101 makes a negative decision in step S34 upon judging that the voltage at the battery 106 has not become low to return to step S31.

In step S41 in FIG. 12, to which the operation proceeds after making an affirmative decision in step S31 as described above, the arithmetic operation circuit 101 resets the time count TM to 0 and then the operation proceeds to step S42.

In step S42, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S42 upon judging that the voltage at the battery 106 has become low to return to step S2 in FIG. 10. The arithmetic operation circuit 101 makes a negative decision in step S42 upon judging that the voltage at the battery 106 has not become low to proceed to step S43.

In step S43, the arithmetic operation circuit 101 makes a decision as to whether or not $TM \geqq Ts3$ is true with regard to the time count TM having been reset in step S41. The arithmetic operation circuit 101 makes an affirmative decision in step S43 if $TM \geqq Ts3$ is true, to proceed to step S44, whereas it makes a negative decision in step S43 if $TM \geqq Ts3$ is not true, to return to step S42. The operation proceeds to step S44 on the assumption that the holding lever 14 should be driven to the holding position at this time.

In step S44, the arithmetic operation circuit 101 starts the holding drive before proceeding to step S45. More specifically, it outputs a command for the shutter drive circuit 108 to rotate the sub-motor 15 in the reverse direction.

In step S45, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S45 upon judging that the voltage at the battery 106 has become low to return to step S2 in FIG. 10. The arithmetic operation circuit 101 makes a negative decision in step S45 upon judging that the voltage at the battery 106 has not become low to proceed to step S46.

In step S46, the arithmetic operation circuit 101 makes a decision as to whether or not $TM \geqq Th2$ is true with regard to the time count TM having been reset in step S41. The arithmetic operation circuit 101 makes an affirmative decision in step S46 if $TM \geqq Th2$ is true, to proceed to step S47, whereas it makes a negative decision in step S46 if $TM \geqq Th2$ is not true, to return to step S45. The operation proceeds to step S47 on the assumption that the holding time Th2 has elapsed after the serial connection output from the serial connection of the shutter switches SW2 and SW3 went into an off state.

In step S47, the arithmetic operation circuit 101 stops the holding drive and also stops the closing drive of the blade set 3 before proceeding to step S48. The closing drive is stopped by issuing an instruction for the shutter drive circuit 108 to stop the reverse rotation of the main motor 12.

In step S48, the arithmetic operation circuit 101 stops the measurement of the time count TM and then the operation proceeds to step S49. Through the processing executed up to step S48 as described above, the aperture 2a becomes closed by the blade set 3.

In step S49, the arithmetic operation circuit 101 makes a decision as to whether or not the sequence switch SW4 is in an on state. The arithmetic operation circuit 101 makes an affirmative decision in step S49 if the signal from the sequence switch SW4 is at L level to proceed to step S50, whereas it makes a negative decision in step S49 if the signal from the sequence switch SW4 is at H level to proceed to step S51. In step S50, the arithmetic operation circuit 101 makes a decision as to whether or not the sequence switch SW5 is in an on state. The arithmetic operation circuit 101 makes an affirmative decision in step S50 if the signal from the sequence switch SW5 is at L level to proceed to step S55, whereas it makes a negative decision in step S50 if the signal from the sequence switch SW5 is at H level to proceed to step S51. The operation proceeds to step S55 if both the switches SW4 and SW5 are in an on state on the assumption that the mirror is in the lowered state. If, on the other hand, at least either the switch SW4 or the switch SW5 is in an off state, the operation proceeds to step S51 to lower the mirror.

In step S51, the arithmetic operation circuit 101 outputs a command for the motor drive circuit 110 to start rotating the sequence motor 111 in the reverse direction before the operation proceeds to step S52. In step S52, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S52 upon judging that the voltage at the battery 106 has become low to return to step S2 in FIG. 10. The arithmetic operation circuit 101 makes a negative decision in step S52 upon judging that the voltage at the battery 106 has not become low to proceed to step S53.

In step S53, the arithmetic operation circuit 101 makes a decision as to whether or not the sequence switch SW4 is in an on state. The arithmetic operation circuit 101 makes an affirmative decision in step S53 if the signal from the sequence switch SW4 is at an L level to proceed to step S54, whereas it makes a negative decision in step S53 if the signal from the sequence switch SW4 is at H level to return to step S52. The operation proceeds to step S54 on the assumption that the mirror down operation has been completed.

In step S54, the arithmetic operation circuit 101 outputs a command for the motor drive circuit 110 to stop the reverse rotation of the sequence motor 111 before the operation proceeds to step S55. With this, the mirror down operation and the reset operation to reset the aperture to the open position ends. It is to be noted that when stopping the sequence motor, a brake such as a reverse power supply brake or a short brake is applied to stop the sequence motor 111 instantaneously. Accordingly, the extent of the overrun can be disregarded. In step S55, the arithmetic operation 101 sets the flag F to 0 before returning to step S2 in FIG. 10.

The flow of the image-capturing sequence processing executed in step S13 in FIG. 10 is now explained in reference to the flowchart presented in FIGS. 13 through 22. In step S101 in FIG. 13, the arithmetic operation circuit 101 selects the following initial settings. Namely, it sets a flag A, a flag M1, a flag M2, a flag S and a flag E all to 0. The flag A is set to 1 when the aperture becomes held at the aperture value setting AVs to be achieved under the control. The flag M1 is set to 1 as closing (in the closing direction) drive of the blade set 3 at the shutter 1 starts. The flag M2 is set to 1 as opening (in the opening direction) drive of the blade set 3 at the shutter 1 starts. The flag S is set to 1 as drive of the holding lever 14 to the hold release position starts. The flag E is switched to 1 as the discharge of unnecessary electrical charges at the image-capturing element 121 ends.

In step S102, the arithmetic operation circuit 101 issues a command for the motor drive circuit 110 to start a forward rotation of the sequence motor 111, and then the operation proceeds to step S103. In response, the mirror starts to move upward and an aperture setting operation starts. In step S103, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S103 upon judging that the voltage at the battery 106 has become low to proceed to step S121. The arithmetic operation circuit 101 makes a negative decision in step S103 upon judging that the voltage at the battery 106 has not become low to proceed to step S104.

In step S121, the arithmetic operation circuit 101 sets the flag F to 1 before returning to step S2 in FIG. 10.

In step S104, the arithmetic operation circuit 101 makes a decision as to whether or not the sequence switch SW4 is in an off state. The arithmetic operation circuit 101 makes an affirmative decision in step S104 if the signal from the sequence switch SW4 is at H level, to proceed to step S105, whereas it makes a negative decision in step S104 if the signal from the sequence switch SW4 is at L level to return to step S103. It is to be noted that while the mirror has started to move upward by the time the operation proceeds to step S105, the aperture is not yet locked and the drive of the blade set 3 has not yet started.

In step S105, the arithmetic operation circuit 101 issues a command for the timing circuit 124 to start a discharge of unnecessary electrical charges at the data transfer unit of the image-capturing element 121, and then the operation proceeds to step S106.

In step S106, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S106 upon judging that the voltage at the battery 106 has become low to proceed to step S121. The arithmetic operation circuit 101 makes a negative decision in step S106 upon judging that the voltage at the battery 106 has not become low to proceed to step S107.

In step S107, the arithmetic operation circuit 101 makes a decision as to whether or not the flag A is currently set to 1. The arithmetic operation circuit 101 makes an affirmative decision in step S107 if A=1 (the aperture hold operation has been completed) to proceed to step S112, whereas it makes a negative decision in step S107 if A=0 (the aperture hold operation has not been completed) to proceed to step S108.

In step S108, the arithmetic operation circuit 101 counts detection signals (aperture pulses) input from the aperture position detection device 112 and designates the count value as the number of aperture pulses Pk, before the operation proceeds to step S109. In step S109, the arithmetic operation circuit 101 makes a decision as to whether or not a relationship expressed as Pk≧Pc is achieved between the number of aperture pulses Pk and the number of control aperture pulses Pc. The arithmetic operation circuit 101 makes an affirmative decision in step S109 if Pk≧Pc is true to proceed to step S110, whereas it makes a negative decision in step S109 if Pk≧Pc is not true to proceed to step S112.

In step S110, the arithmetic operation circuit 101 outputs a command for the aperture lock device 113 to lock the aperture and then the operation proceeds to step S111. In response, the aperture setting operation stops. In step S111, the arithmetic operation circuit 101 sets the flag A to 1, and then the operation proceeds to step S112.

In step S112, the arithmetic operation circuit 101 makes a decision as to whether or not the flag M1 is currently set to 1. The arithmetic operation circuit 101 makes an affirmative decision in step S112 if M1=1 (closing drive has started) to proceed to step S131 in FIG. 14, whereas it makes a negative decision in step S112 if M1=0 (closing drive has not started yet) to proceed to step S113.

In step S113, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S113 upon judging that the voltage at the battery 106 has become low to proceed to step S121. The arithmetic operation circuit 101 makes a negative decision in step S113 upon judging that the voltage at the battery 106 has not become low to proceed to step S14.

In step S114, the arithmetic operation circuit 101 makes a decision as to whether or not the sequence switch SW5 is in an off state. The arithmetic operation circuit 101 makes an affirmative decision in step S114 if the signal from the sequence switch SW5 is at H level, to proceed to step S115, whereas it makes a negative decision in step S114 if the signal from the sequence switch SW5 is at L level to return to step S106. The operation proceeds to step S115 on the assumption that the main motor 12 of the shutter 1 should start at this time rotating in the reverse direction, whereas the operation returns to step S106 on the assumption that the reverse rotation of the main motor 12 should not start yet.

In step S115, the arithmetic operation circuit 101 sets the time count TM to 0 and then the operation proceeds to step S116. In step S116, the arithmetic operation circuit 101 starts a time count at the timer circuit 101t before proceeding to step S117.

In step S117, the arithmetic operation circuit 101 starts closing drive of the blade set 3 at the shutter 1 before proceeding to step S118. In more specific terms, it outputs a command for the shutter drive circuit 108 to start rotating the main motor 12 in the reverse direction. In step S118, the arithmetic operation circuit 101 sets the flag M1 to 1 before proceeding to step S119.

In step S119, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S119 upon judging that the voltage at the battery 106 has become low to proceed to step S121. The arithmetic operation circuit 101 makes a negative decision in step S119 upon judging that the voltage at the battery 106 has not become low to proceed to step S131 in FIG. 14.

Figure 14:
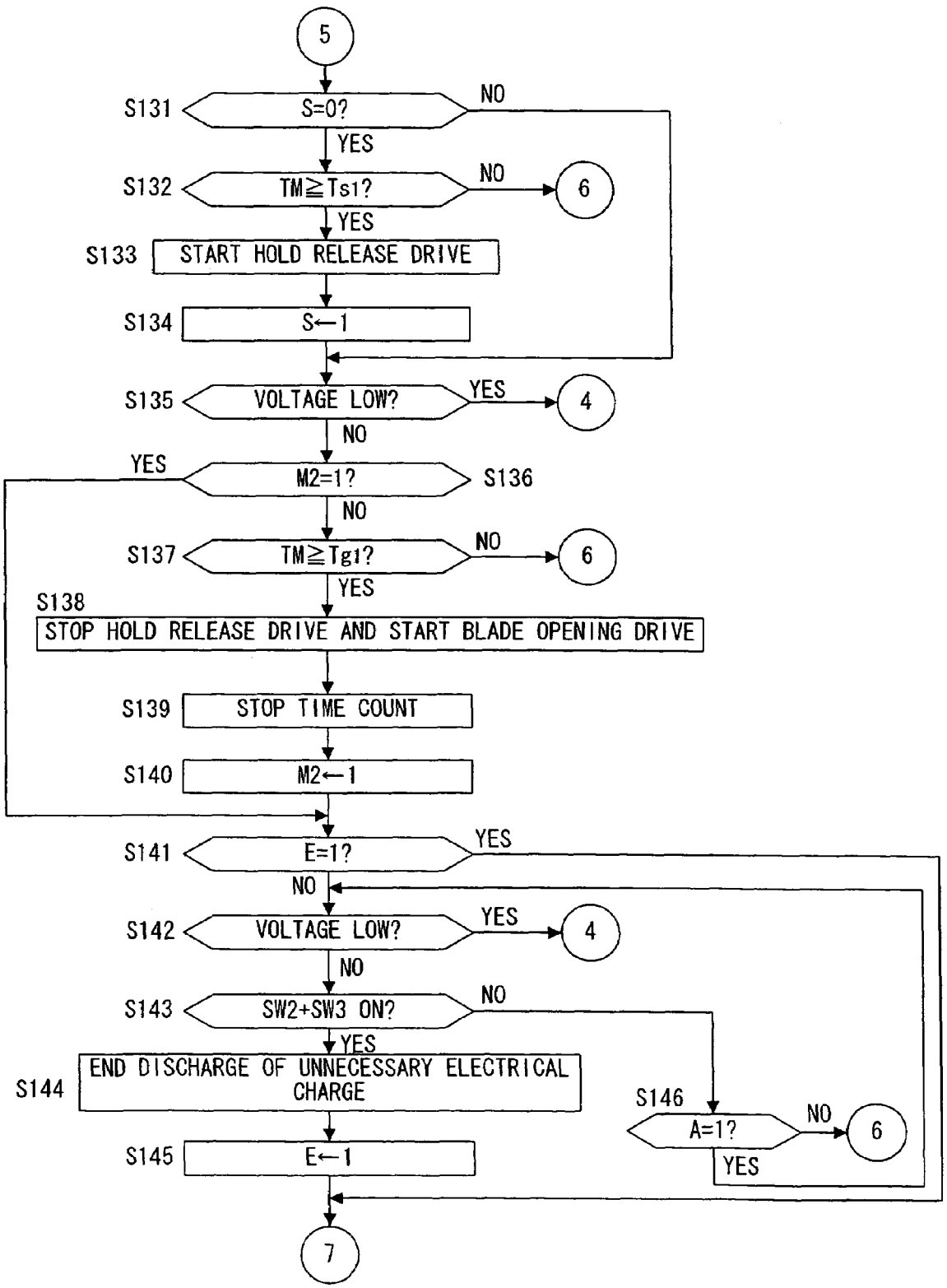
FIG. 14 presents a flowchart of the image-capturing sequence processing.

In step S131 in FIG. 14, the arithmetic operation circuit 101 makes a decision as to whether or not the flag S is currently set to 0. The arithmetic operation circuit 101 makes an affirmative decision in step S131 if S=0 to proceed to step S132, whereas it makes a negative decision in step S131 if S=1 to proceed to step S135. The operation proceeds to step S132 on the assumption that the hold release drive of the holding lever 14 has not started. The operation proceeds to step S135 on the assumption that the hold release drive of the holding lever 14 has started.

In step S132, the arithmetic operation circuit 101 makes a decision as to whether or not TM≧Ts1 is true with regard to the time count TM started in step S116. The arithmetic operation circuit 101 makes an affirmative decision in step S132 if TM≧Ts1 is true, to proceed to step S133, whereas it makes a negative decision in step S132 if TM≧Ts1 is not true, to return to step S106 in FIG. 13. The operation proceeds to step S133 on the assumption that the wait time Ts1 has elapsed.

In step S133, the arithmetic operation circuit 101 starts hold release drive and then the operation proceeds to step S134. More specifically, it outputs a command for the shutter drive circuit 108 to start rotating the sub-motor 15 forward. In step S134, the arithmetic operation circuit 101 sets the flag S to 1 before proceeding to step S135.

In step S135, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S135 upon judging that the voltage at the battery 106 has become low to proceed to step S121 in FIG. 13. The arithmetic operation circuit 101 makes a negative decision in step S135 upon judging that the voltage at the battery 106 has not become low to proceed to step S136.

In step S136, the arithmetic operation circuit 101 makes a decision as to whether or not the flag M2 is currently set to 1. The arithmetic operation circuit 101 makes an affirmative decision in step S136 if M2=1 to proceed to step S141, whereas it makes a negative decision in step S136 if M2=0 to proceed to step S137. The operation proceeds to step S137 on the assumption that opening drive of the blade set 3 has not yet started.

In step S137, the arithmetic operation circuit 101 makes a decision as to whether or not TM≧Tg1 is true with regard to the time count TM started in step S116. The arithmetic operation circuit 101 makes an affirmative decision in step S137 if TM≧Tg1 is true, to proceed to step S138, whereas it makes a negative decision in step S137 if TM≧Tg1 is not true, to return to step S106 in FIG. 13. The operation proceeds to step S138 on the assumption that the reverse power supply period Tg1 has elapsed.

In step S138, the arithmetic operation circuit 101 stops the hold release drive and also starts opening drive of the blade set 3, before the operation proceeds to step S139. The opening drive is started by issuing an instruction for the shutter drive circuit 108 to rotate the main motor 12 forward.

In step S139, the arithmetic operation circuit 101 stops the measurement of the time count TM before proceeding to step S140. In step S140, the arithmetic operation circuit 101 sets the flag M2 to 1 before the operation proceeds to step S141.

In step S141, the arithmetic operation circuit 101 makes a decision as to whether or not the flag E is currently set to 1. The arithmetic operation circuit 101 makes an affirmative decision in step S141 if E=1 to proceed to step S151 in FIG. 15, whereas it makes a negative decision in step S141 if E=0 to proceed to step S142. The operation proceeds to step S151 on the assumption that the unnecessary electrical charge discharge processing at the image-capturing element 121 has ended. The operation proceeds to step S142 on the assumption that the unnecessary electrical charge discharge processing at the image-capturing element 121 has not yet ended.

In step S142, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S142 upon judging that the voltage at the battery 106 has become low to proceed to step S121 in FIG. 13. The arithmetic operation circuit 101 makes a negative decision in step S142 upon judging that the voltage at the battery 106 has not become low to proceed to step S143.

In step S143, the arithmetic operation circuit 101 makes a decision as to whether or not the output of the serial connection achieved with the shutter switches SW2 and SW3 is in an on state. The arithmetic operation circuit 101 makes an affirmative decision in step S143 if the signal input to the input port for the shutter switches SW2 and SW3 is at L level to proceed to step S144. This instance manifests between the time points t3 and t4 explained earlier and the arithmetic operation circuit 101 judges that the start of the opening drive of the blade set 3 at the shutter 1 is imminent.

The arithmetic operation circuit 101 makes a negative decision in step S143 if the signal input to the input port for the shutter switches SW2 and SW3 is at H level to proceed to step S146. This instance manifests prior to time point t3 explained earlier and the arithmetic operation circuit judges that the opening drive of the blade set 3 of the shutter 1 is not to be started yet.

In step S144, the arithmetic operation circuit 101 outputs a command for the timing circuit 124 to end the discharge of the unnecessary electrical charges at the data transfer unit of the image-capturing element 121 before the operation proceeds to step S145. In step S145, the arithmetic operation circuit 101 sets the flag E to 1 before proceeding to step S151 in FIG. 15.

In step S146, the arithmetic operation circuit 101 makes a decision as to whether or not the flag A is currently set to 1. The arithmetic operation circuit 101 makes an affirmative decision in step S146 if A=1 to return to step S142, whereas it makes a negative decision in step S146 if A=0 to return to step S106 in FIG. 13. The operation returns to step S142 on the assumption that the aperture has already been locked on hold by the aperture lock device 113, whereas the operation returns to step S106 on the assumption that the aperture lock by the aperture lock device 113 has not yet been completed.

Figure 15:
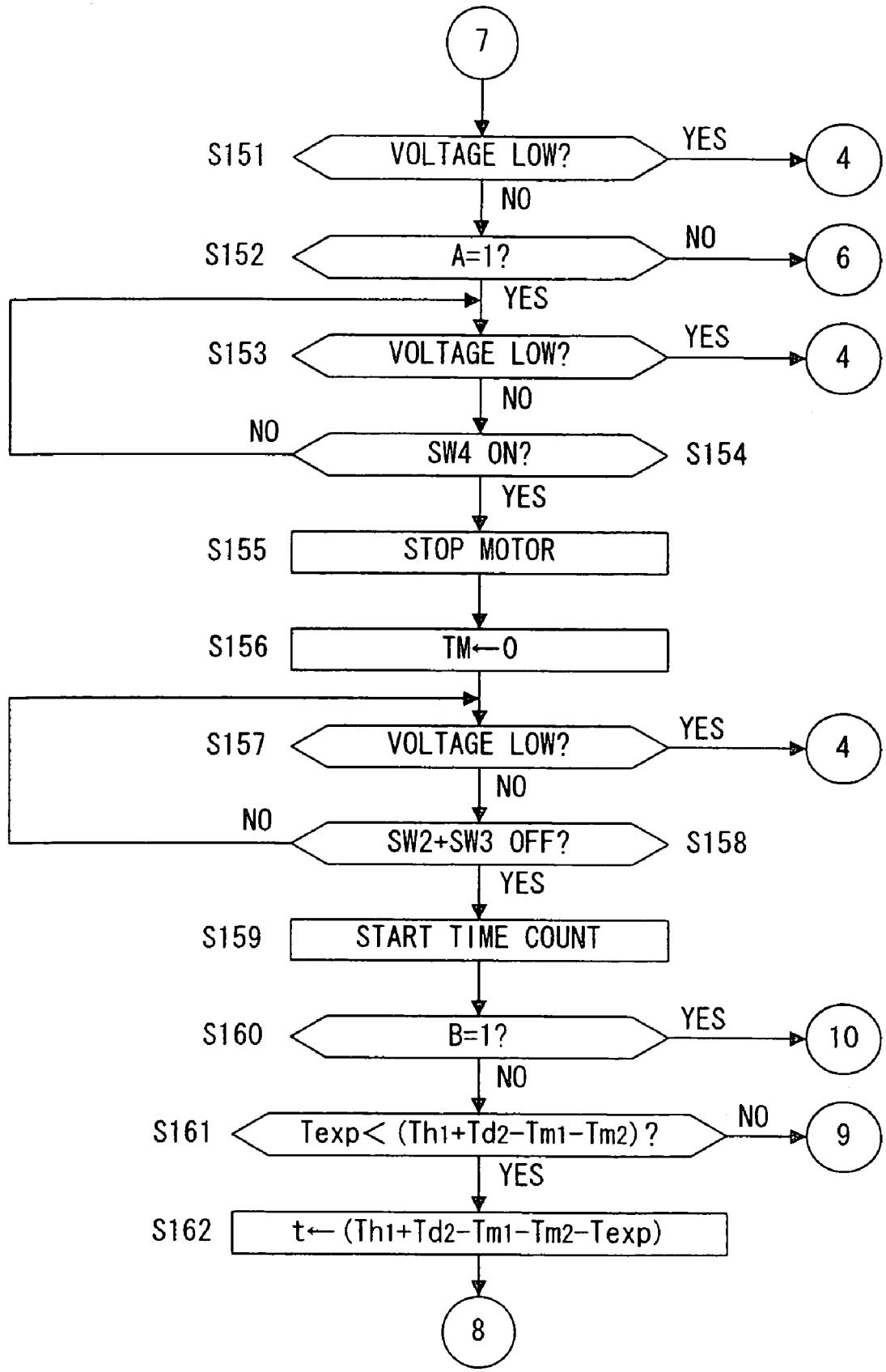
FIG. 15 presents a flowchart of the image-capturing sequence processing.

In step S151 in FIG. 15, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S151 upon judging that the voltage at the battery 106 has become low to proceed to step S121 in FIG. 13. The arithmetic operation circuit 101 makes a negative decision in step S151 upon judging that the voltage at the battery 106 has not become low to proceed to step S152.

In step S152, the arithmetic operation circuit 101 makes a decision as to whether or not the flag A is currently set to 1. The arithmetic operation circuit 101 makes an affirmative decision in step S152 if A=1 to proceed to step S153, whereas it makes a negative decision in step S152 if A=0 to return to step S106 in FIG. 13. The operation proceeds to step S153 on the assumption that the aperture has already been locked by the aperture lock device 113, whereas the operation returns to step S106 on the assumption that the aperture lock by the aperture lock device 113 has not yet been completed.

In step S153, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S153 upon judging that the voltage at the battery 106 has become low to proceed to step S121 in FIG. 13. The arithmetic operation circuit 101 makes a negative decision in step S153 upon judging that the voltage at the battery 106 has not become low to proceed to step S154.

In step S154, the arithmetic operation circuit 101 makes a decision as to whether or not the sequence switch SW4 is in an on state. The arithmetic operation circuit 101 makes an affirmative decision in step S154 if the signal from the sequence switch SW4 is at L level to proceed to step S155, whereas it makes a negative decision in step S154 if the signal from the sequence switch SW4 is at H level to return to step S153. The operation proceeds to step S155 when the mirror up operation has been completed, whereas the operation returns to step S153 if the mirror up operation is still in progress.

In step S155, the arithmetic operation circuit 101 outputs a command for the motor drive circuit 110 to stop the forward rotation of the sequence motor 111. It is to be noted that this stop processing is executed by applying a brake such as a reverse power supply brake or a short brake to stop the sequence motor 111 instantaneously. Accordingly, the extent of the overrun can be disregarded. In addition, the image-capturing sequence drive mechanism is structured so as to complete the aperture lock operation by the aperture locking device 113 by the time it is judged in step S154 that the mirror up operation has ended.

In step S156, the arithmetic operation circuit 101 sets the time count TM by the timer circuit 101t to 0 before the operation proceeds to step S157.

In step S157, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S157 upon judging that the voltage at the battery 106 has become low to proceed to step S121 in FIG. 13. The arithmetic operation circuit 101 makes a negative decision in step S157 upon judging that the voltage at the battery 106 has not become low to proceed to step S158.

In step S158, the arithmetic operation circuit 101 makes a decision as to whether or not the output of the serial connection achieved with the shutter switches SW2 and SW3 is in an off state. The arithmetic operation circuit 101 makes an affirmative decision in step S158 if the signal input to the input port for the shutter switches SW2 and SW3 is at H level to proceed to step S159. In this instance, the arithmetic operation circuit judges that the aperture 2a is opened to a full open state with the blade set 3 of the shutter 1, having been withdrawn. If, on the other hand, the signal input to the input port for the shutter switches SW2 and SW3 is at L level, the arithmetic operation circuit 101 makes a negative decision in step S158 to return to step S157. In this case, the arithmetic operation circuit judges that the blade set 3 at the shutter 1 is currently engaged in the process of opening the aperture 2a.

In step S159, the arithmetic operation circuit 101 starts a time count by the timer circuit 101t before proceeding to step S160.

In step S160, the arithmetic operation circuit 101 makes a decision as to whether or not the flag B is currently set to 1. The arithmetic operation circuit 101 makes an affirmative decision in step S160 if B=1 to proceed to step S291 in FIG. 21, whereas it makes a negative decision in step S160 if B=0 to proceed to step S161. The operation proceeds to step S291 if the current shutter speed setting is "valve", and in this case, the operation is executed as shown in FIG. 9. The operation proceeds to step S161 if a setting other than "valve" is currently selected for the shutter speed.

In step S161, the arithmetic operation circuit 101 makes a decision as to whether or not the length of exposure time Texp is smaller than (Th1+Td2−Tm1−Tm2). The arithmetic operation circuit 101 makes an affirmative decision in step S161 if Texp<(Th1+Td2−Tm1−Tm2) to proceed to step S162, whereas it makes a negative decision in step S161 if Texp<(Th1+Td2−Tm1−Tm2) is not true, to proceed to step S241 in FIG. 19. The timing charts in FIGS. 5 and 6 correspond to the operation proceeding to step S162, whereas the timing charts in FIGS. 7 and 8 correspond to the operation proceeding to step S241.

In step S162, the arithmetic operation circuit 101 substitutes (Th1+Td2−Tm1−Tm2−Texp) for the parameter t (time length t and FIGS. 5 and 6) before the operation proceeds to step S171.

Figure 16:
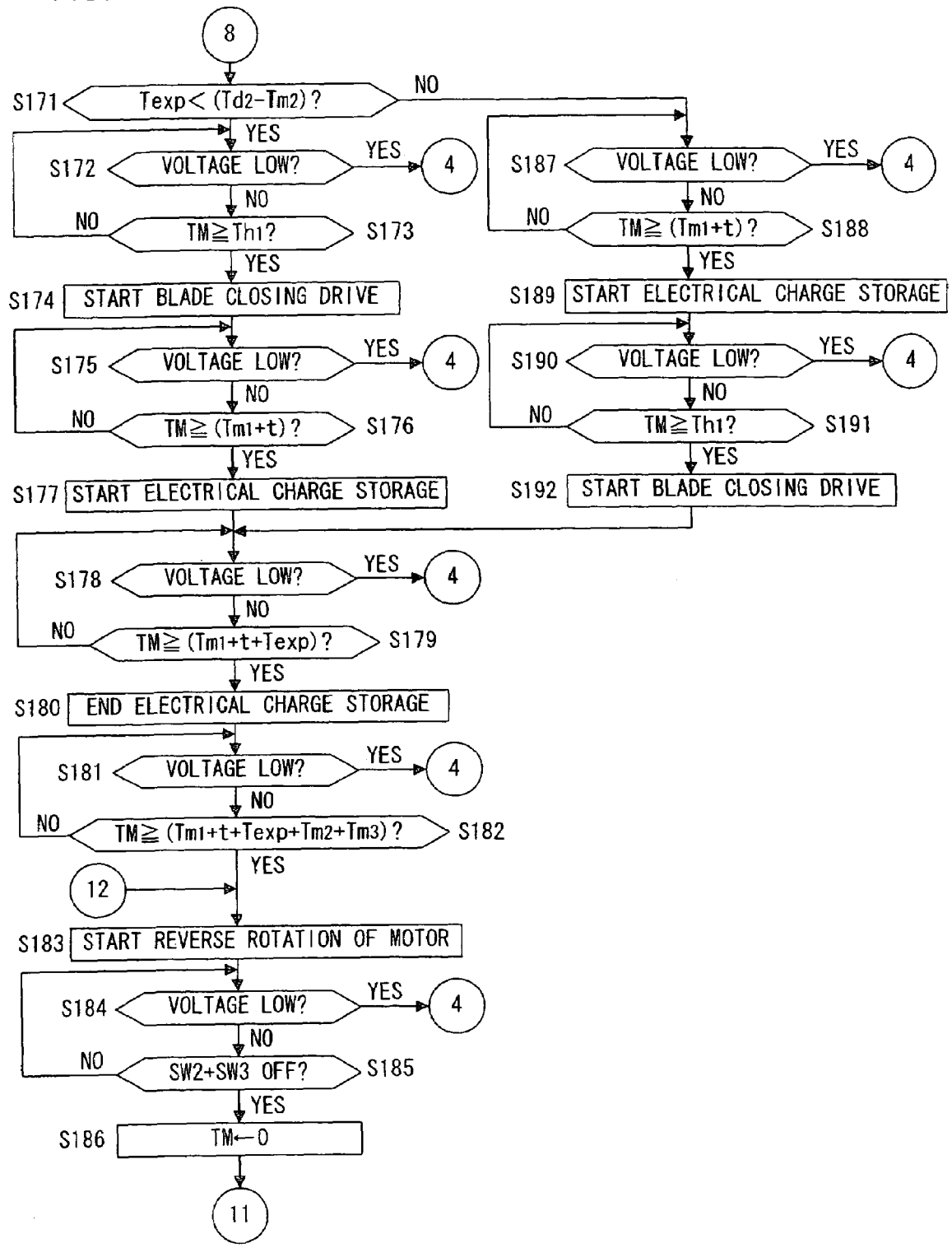
FIG. 16 presents a flowchart of the image-capturing sequence processing.

In step S171 in FIG. 16, the arithmetic operation circuit 101 makes a decision as to whether or not the length of exposure time Texp is smaller than (Td2−Tm2). The arithmetic operation circuit 101 makes an affirmative decision in step S171 if Texp<(Td2−Tm2) to proceed to step S172, whereas it makes a negative decision in step S171 if Texp<(Td2−Tm2) is not true, to proceed to step S187. The timing chart in FIG. 5 corresponds to the operation proceeding to step S172, whereas the timing chart in FIG. 6 corresponds to the operation proceeding to step S187.

In step S172, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S172 upon judging that the voltage at the battery 106 has become low to proceed to step S121 in FIG. 13. The arithmetic operation circuit 101 makes a negative decision in step S172 upon judging that the voltage at the battery 106 has not become low to proceed to step S173.

In step S173, the arithmetic operation circuit 101 makes a decision as to whether or not TM≧Th1 is true with regard to the time count TM started in step S159. The arithmetic operation circuit 101 makes an affirmative decision in step S173 if TM≧Th1 is true, to proceed to step S174, whereas it makes a negative decision in step S173 if TM≧Th1 is not true, to return to step S172. The operation proceeds to step S174 on the assumption that the holding time Th1 has elapsed.

In step S174, the arithmetic operation circuit 101 starts closing drive of the blade set 3 at the shutter 1 to close the aperture 2a. More specifically, it outputs a command for the shutter drive circuit 108 to start rotating the main motor 12 in the reverse direction.

In step S175, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S175 upon judging that the voltage at the battery 106 has become low to proceed to step S121 in FIG. 13. The arithmetic operation circuit 101 makes a negative decision in step S175 upon judging that the voltage at the battery 106 has not become low to proceed to step S176.

In step S176, the arithmetic operation circuit 101 makes a decision as to whether or not TM≧(Tm1+t) is true. The arithmetic operation circuit 101 makes an affirmative decision in step S176 if TM≧(Tm1+t) is true, to proceed to step S177, whereas it makes a negative decision in step S176 if TM≧(Tm1+t) is not true, to return to step S175. The operation proceeds to step S177 on the assumption that the exposure should start at this time (time point t10 in FIG. 5).

In step S177, the arithmetic operation circuit 101 outputs a command for the timing circuit 124 to start electrical charge storage at the image-capturing element 121, and then the operation proceeds to step S178.

In step S178, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S178 upon judging that the voltage at the battery 106 has become low to proceed to step S121 in FIG. 13. The arithmetic operation circuit 101 makes a negative decision in step S178 upon judging that the voltage at the battery 106 has not become low to proceed to step S179.

In step S179, the arithmetic operation circuit 101 makes a decision as to whether or not TM≧(Tm1+t+Texp) is true. The arithmetic operation circuit 101 makes an affirmative decision in step S179 if TM≧(Tm1+t+Texp) is true, to proceed to step S180, whereas it makes a negative decision in step S179 if TM≧(Tm1+t+Texp) is not true, to return to step S178. The operation proceeds to step S180 on the assumption that the exposure should end at this time (time point t11 in FIG. 5).

In step S180, the arithmetic operation circuit 101 outputs a command for the timing circuit 124 to end the electrical charge storage at the image-capturing element 121 before the operation proceeds to step S181.

In step S181, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S181 upon judging that the voltage at the battery 106 has become low to proceed to step S121 in FIG. 13. The arithmetic operation circuit 101 makes a negative decision in step S181 upon judging that the voltage at the battery 106 has not become low to proceed to step S182.

In step S182, the arithmetic operation circuit 101 makes a decision as to whether or not TM≧(Tm1+t+Texp+Tm2+Tm3) is true. The arithmetic operation circuit 101 makes an affirmative decision in step S182 if TM≧(Tm1+t+Texp+Tm2+Tm3) is true, to proceed to step S183, whereas it makes a negative decision in step S182 if TM≧(Tm1+t+Texp+Tm2+Tm3) is not true, to return to step S181. The operation proceeds to step S183 on the assumption that a mirror down operation and an aperture open reset operation should start at this time (t14 in FIG. 5).

In step S183, the arithmetic operation circuit 101 outputs a command for the motor drive circuit 110 to start rotating the sequence motor 111 in the reverse direction before the operation proceeds to step S184.

In step S184, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S184 upon judging that the voltage at the battery 106 has become low to proceed to step S121 in FIG. 13. The arithmetic operation circuit 101 makes a negative decision in step S184 upon judging that the voltage at the battery 106 has not become low to proceed to step S185.

In step S185, the arithmetic operation circuit 101 makes a decision as to whether or not the output of the serial connection achieved with the shutter switches SW2 and SW3 is in an off state. The arithmetic operation circuit 101 makes an affirmative decision in step S185 if the signal input to the input port for the shutter switches SW2 and SW3 is at H level to proceed to step S186. In this instance, the arithmetic operation circuit judges that the aperture 2a is closed to a fully closed state with the blade set 3 of the shutter 1. If, on the other hand, the signal input to the input port for the shutter switches SW2 and SW3 is at L level, the arithmetic operation circuit 101 makes a negative decision in step S185 to return to step S184. In this case, the arithmetic operation circuit judges that the aperture 2a blade set 3 at the shutter 1 is currently engaged in the process of closing the aperture 2a.

Figure 17:
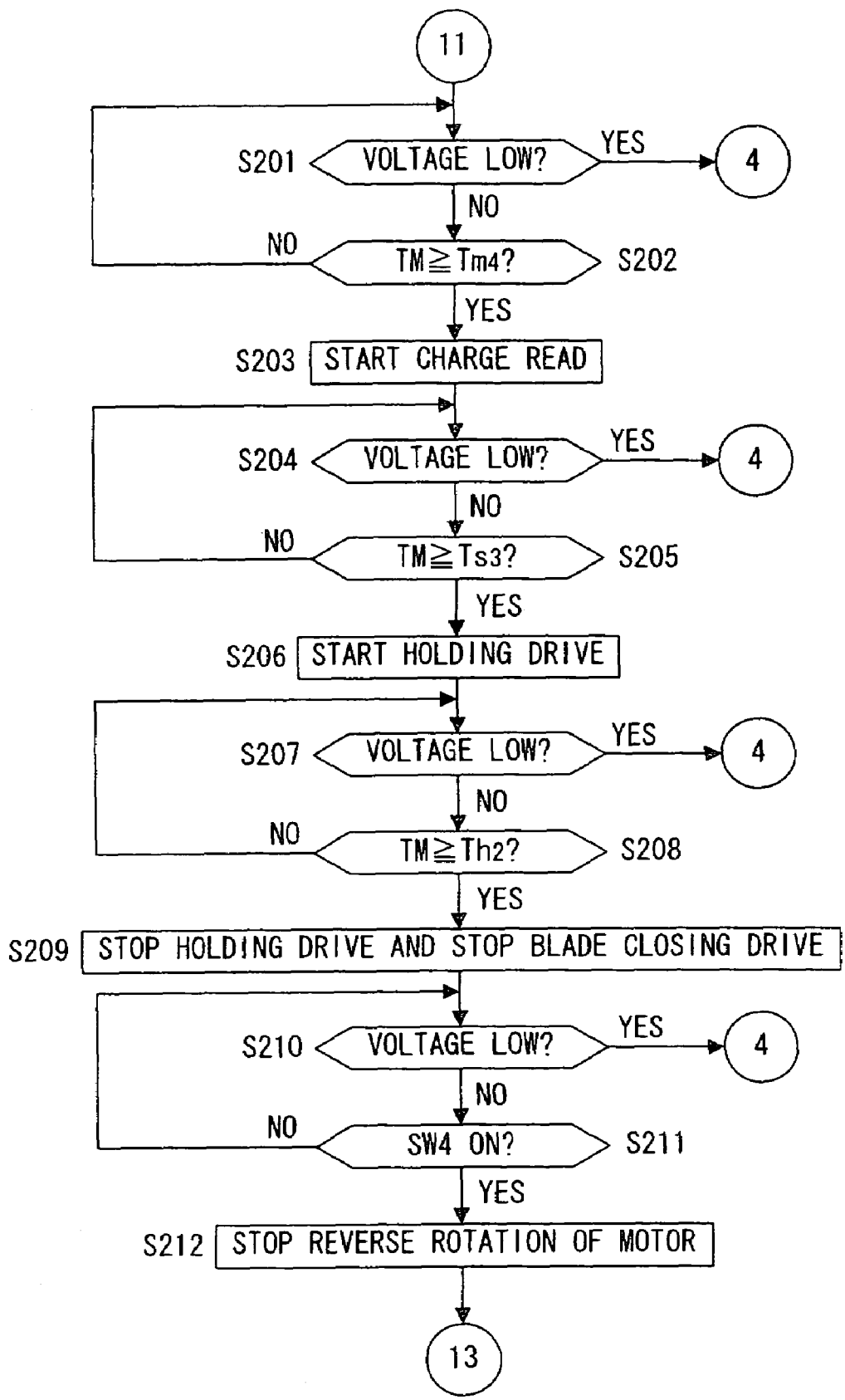
FIG. 17 presents a flowchart of the image-capturing sequence processing.

In step S186, the arithmetic operation circuit 101 sets the time count TM by the timer circuit 101t to 0 and then the operation proceeds to step S201 in FIG. 17. Thus, the time count TM is cleared to 0 at time point t17 in FIG. 5. It is to be noted that the time count is continuously executed after the reset.

In step S187, to which the operation proceeds after making a negative decision in step S171 as described above, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S187 upon judging that the voltage at the battery 106 has become low to proceed to step S121 in FIG. 13. The arithmetic operation circuit 101 makes a negative decision in step S187 upon judging that the voltage at the battery 106 has not become low to proceed to step S188.

In step S188, the arithmetic operation circuit 101 makes a decision as to whether or not TM≧(Tm1+t) is true with regard to the time count TM started in step S159. The arithmetic operation circuit 101 makes an affirmative decision in step S188 if TM≧(Tm1+t) is true, to proceed to step S189, whereas it makes a negative decision in step S188 if TM≧(Tm1+t) is not true, to return to step S187. The operation proceeds to step S189 on the assumption that the exposure should start at this time (t10 in FIG. 6).

In step S189, the arithmetic operation circuit 101 outputs a command for the timing circuit 124 to start electrical charge storage at the image-capturing element 121 before proceeding to step S190.

In step S190, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S190 upon judging that the voltage at the battery 106 has become low to proceed to step S121 in FIG. 13. The arithmetic operation circuit 101 makes a negative decision in step S190 upon judging that the voltage at the battery 106 has not become low to proceed to step S191.

In step S191, the arithmetic operation circuit 101 makes a decision as to whether or not TM≧Th1 is true. The arithmetic operation circuit 101 makes an affirmative decision in step S191 if TM≧Th1 is true, to proceed to step S192, whereas it makes a negative decision in step S191 if TM≧Th1 is not true, to return to step S190. The operation proceeds to step S192 on the assumption that the holding time Th1 has elapsed.

In step S192, the arithmetic operation circuit 101 starts closing drive of the blade set 3 at the shutter 1 to close the aperture 2a, and then the operation proceeds to step S178. Namely, it outputs a command for the shutter drive circuit 108 to start rotating the main motor 12 in the reverse direction.

The processing executed in steps S187 through S192 as described above differs from the processing executed in steps S172 through S177 in that the electrical charge storage at the image-capturing element 121 starts before starting the closing drive of the blade set 3.

In step S201 in FIG. 17, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S201 upon judging that the voltage at the battery 106 has become low to proceed to step S121 in FIG. 13. The arithmetic operation circuit 101 makes a negative decision in step S201 upon judging that the voltage at the battery 106 has not become low to proceed to step S202.

In step S202, the arithmetic operation circuit 101 compares the time count TM having been reset in step S186 with the pre-read time margin Tm4. The arithmetic operation circuit 101 makes an affirmative decision in step S202 if TM≧Tm4 is true to proceed to step S203, whereas it makes a negative decision in step S202 if TM≧Tm4 is not true to return to step S201. The operation proceeds to step S203 on the assumption that the pre-read time margin Tm4 has elapsed after the aperture 2a became fully closed by the blade set 3.

In step S203, the arithmetic operation circuit 101 outputs a command for the timing circuit 124 to start reading out the image signals from the image-capturing element 121, and then the operation proceeds to step S204. In response, the image signals constituted of the stored electrical charges are output from the image-capturing element 121, and the analog image signals are converted to digital signals at the A/D conversion circuit 122.

In step S204, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S204 upon judging that the voltage at the battery 106 has become low to proceed to step S121 in FIG. 13. The arithmetic operation circuit 101 makes a negative decision in step S204 upon judging that the voltage at the battery 106 has not become low to proceed to step S205.

In step S205, the arithmetic operation circuit 101 makes a decision as to whether or not TM≧Ts3 is true. The arithmetic operation circuit 101 makes an affirmative decision in step S205 if TM≧Ts3 is true, to proceed to step S206, whereas it makes a negative decision in step S205 if TM≧Ts3 is not true, to return to step S204. The operation proceeds to step S206 on the assumption that the holding lever 14 should now be driven to the holding position.

In step S206, the arithmetic operation circuit starts holding drive and then the operation proceeds to step S207. More specifically, it outputs a command for the shutter drive circuit 108 to rotate the sub-motor 15 in the reverse direction.

In step S207, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S207 upon judging that the voltage at the battery 106 has become low to proceed to step S121 in FIG. 13. The arithmetic operation circuit 101 makes a negative decision in step S207 upon judging that the voltage at the battery 106 has not become low to proceed to step S208.

In step S208, the arithmetic operation circuit 101 makes a decision as to whether or not TM≧Th2 is true. The arithmetic operation circuit 101 makes an affirmative decision in step S208 if TM≧Th2 is true, to proceed to step S209, whereas it makes a negative decision in step S208 if TM≧Th2 is not true, to return to step S207. The operation proceeds to step S209 on the assumption that the holding time Th2 has elapsed after the serial connection output from the serial connection between the shutter switches SW2 and SW3 have shifted into an off state.

In step S209, the arithmetic operation circuit 101 stops the holding drive and also stops the closing drive of the blade set 3 before proceeding to step S210. The holding drive is stopped by issuing an instruction for the shutter drive circuit 108 to stop the reverse rotation of the sub-motor 15 and the closing drive is stopped by issuing an instruction for the shutter drive circuit 108 to stop the reverse rotation of the main motor 12.

In step S210, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S210 upon judging that the voltage at the battery 106 has become low to proceed to step S121 in FIG. 13. The arithmetic operation circuit 101 makes a negative decision in step S210 upon judging that the voltage at the battery 106 has not become low to proceed to step S211.

In step S211, the arithmetic operation circuit 101 makes a decision as to whether or not the sequence switch SW4 is in an on state. The arithmetic operation circuit 101 makes an affirmative decision in step S211 if the signal from the sequence switch SW4 is at L level to proceed to step S212, whereas it makes a negative decision in step S211 if the signal from the sequence switch SW4 is at H level to return to step S210. The operation proceeds to step S212 when the mirror down operation and the aperture open reset operation have been completed.

Figure 18:
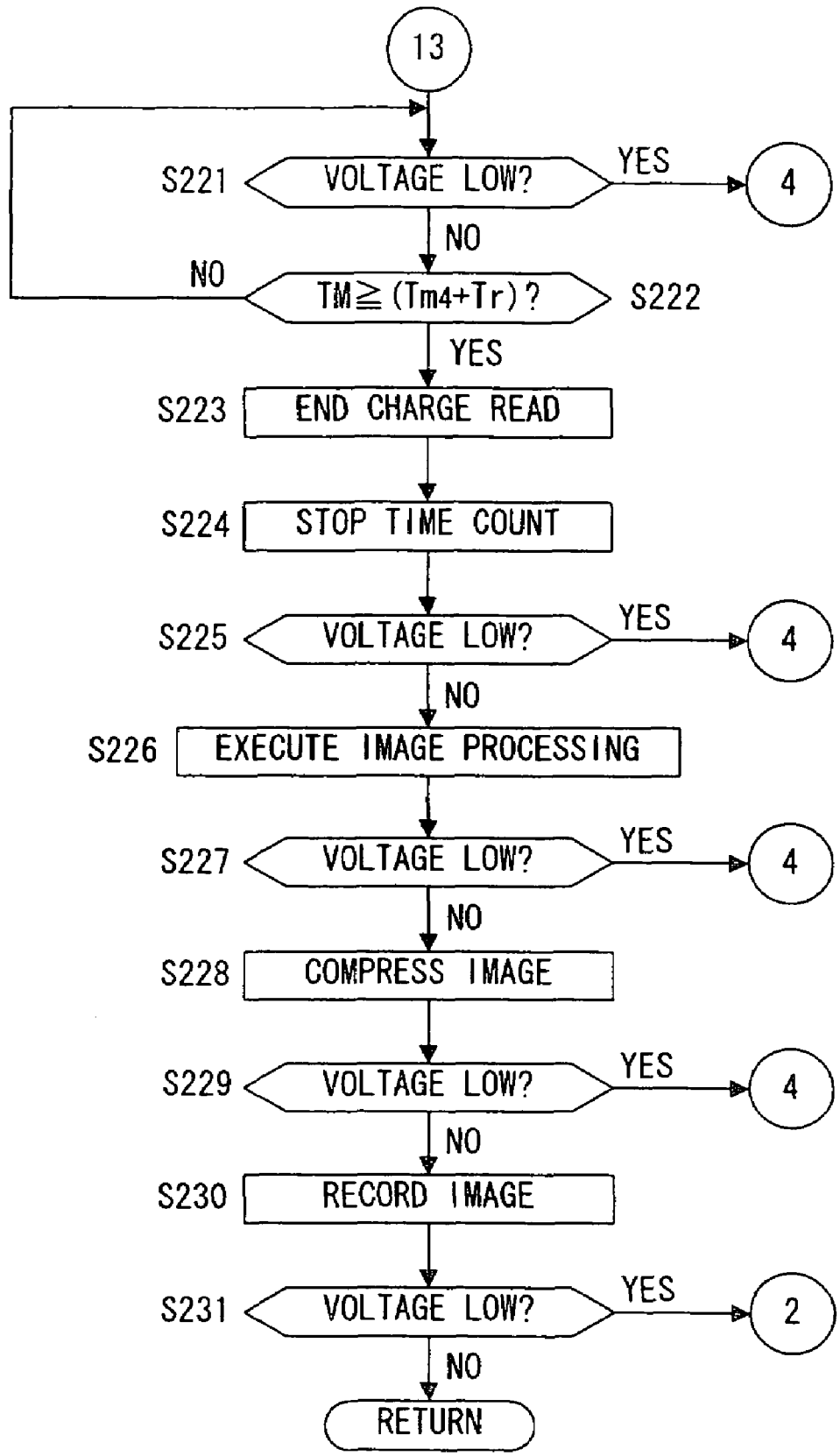
FIG. 18 presents a flowchart of the image-capturing sequence processing.

In step S212, the arithmetic operation circuit 101 outputs a command for the motor drive circuit 110 to stop the reverse rotation of the sequence motor 111 and then the operation proceeds to step S221 in FIG. 18. It is to be noted that when stopping the sequence motor, a brake such as a reverse power supply brake or a short brake is applied to stop the sequence motor 111 instantaneously. Accordingly, the extent of the overrun can be disregarded.

The sequence switch SW4 shifts into an on state (at time point t20 in FIG. 5) later than the time point (t17 in FIG. 5) at which the output from the serial connection achieved by the shutter switches SW2 and SW3 shifts into an off state but before the read time Tr during which the electrical charges stored at the image-capturing element 121 are readout elapses.

In step S221 in FIG. 18, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S221 upon judging that the voltage at the battery 106 has become low to proceed to step S121 in FIG. 13. The arithmetic operation circuit 101 makes a negative decision in step S221 upon judging that the voltage at the battery 106 has not become low to proceed to step S222.

In step S222, the arithmetic operation circuit 101 makes a decision as to whether or not TM≧(Tm4+Tr) is true. The arithmetic operation circuit 101 makes an affirmative decision in step S222 if TM≧(Tm4+Tr) is true, to proceed to step S223, whereas it makes a negative decision in step S222 if TM≧(Tm4+Tr) is not true, to return to step S221. The operation proceeds to step S223 on the assumption that the data read should end at this time.

In step S223, the arithmetic operation circuit 101 outputs a command for the timing circuit 124 to stop the read of the image signals from the image-capturing element 121 before the operation proceeds to step S224. In step S224, the arithmetic operation circuit 101 stops the time count by the timer circuit 101t before proceeding to step S225.

In step S225, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S225 upon judging that the voltage at the battery 106 has become low to proceed to step S121 in FIG. 13. The arithmetic operation circuit 101 makes a negative decision in step S225 upon judging that the voltage at the battery 106 has not become low to proceed to step S226.

In step S226, the arithmetic operation circuit 101 starts image processing such as white balance adjustment, edge compensation and gamma correction by engaging the image processing circuit 123 in operation before proceeding to step S227.

In step S227, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S227 upon judging that the voltage at the battery 106 has become low to proceed to step S121 in FIG. 13. The arithmetic operation circuit 101 makes a negative decision in step S227 upon judging that the voltage at the battery 106 has not become low to proceed to step S228.

In step S228, the arithmetic operation circuit 101 engages the image processing circuit 123 in operation to start image compression processing and then the operation proceeds to step S229. In response, the image processing circuit 123 starts the image compression processing and processing for storing the image data having undergone the compression processing into the buffer memory 125.

In step S229, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S229 upon judging that the voltage at the battery 106 has become low to proceed to step S121 in FIG. 13. The arithmetic operation circuit 101 makes a negative decision in step S229 upon judging that the voltage at the battery 106 has not become low to proceed to step S230.

In step S230, the arithmetic operation circuit 101 executes processing for recording the compressed image data stored in the buffer memory 125 into the recording medium 126, and then the operation proceeds to step S231.

In step S231, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S231 upon judging that the voltage at the battery 106 has become low to return to step S2 in FIG. 10. The arithmetic operation circuit 101 makes a negative decision in step S231 upon judging that the voltage at the battery 106 has not become low to return to step S4 in FIG. 10. The sequence of photograph processing thus ends.

Figure 19:
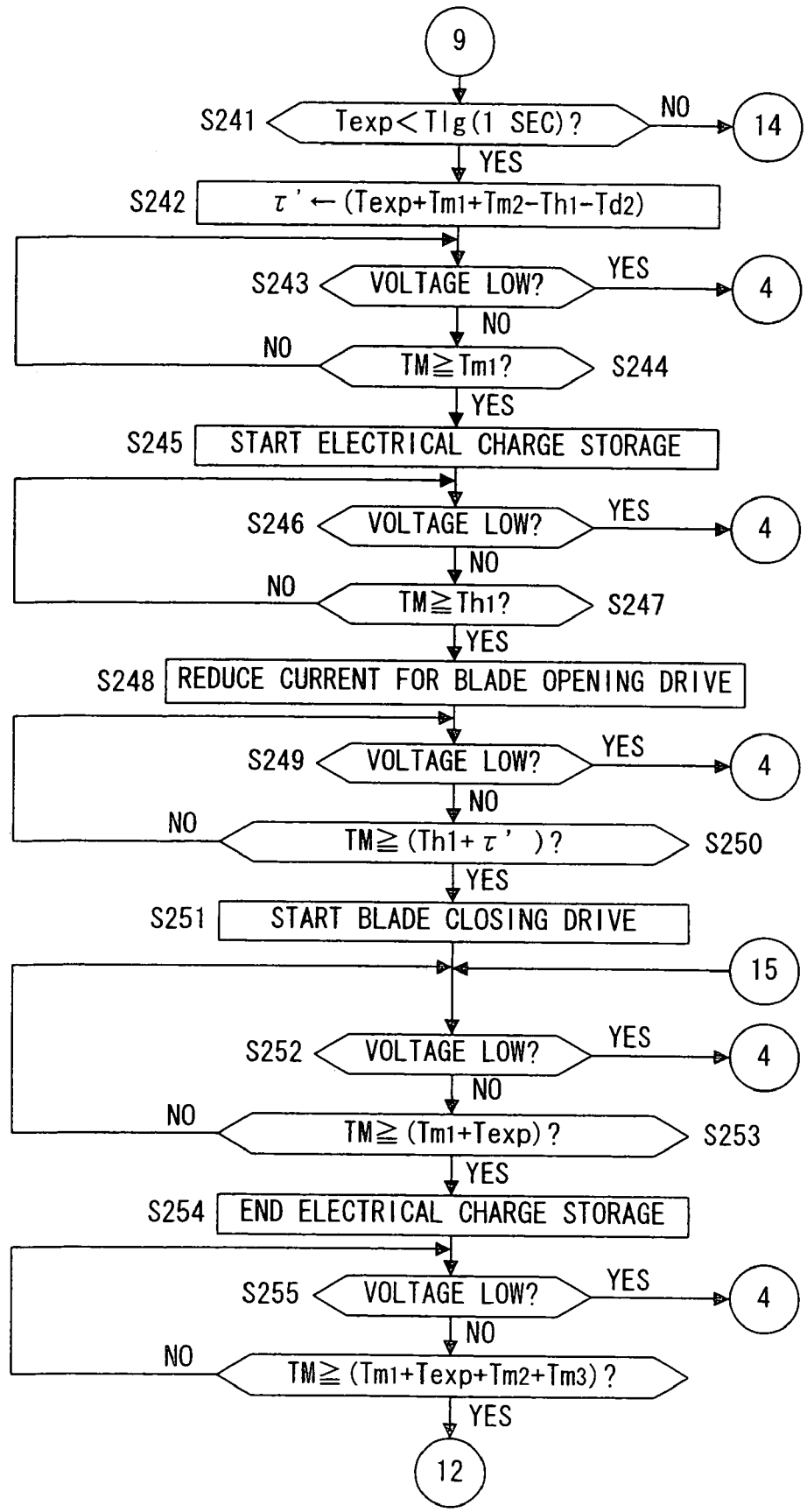
FIG. 19 presents a flowchart of the image-capturing sequence processing.

In step S241 in FIG. 19, to which the operation proceeds after making a negative decision in step S161 as described above, the arithmetic operation circuit 101 makes a decision as to whether or not Texp<Tlg is true. The arithmetic operation circuit 101 makes an affirmative decision in step S241 if Texp<Tlg is true to proceed to step S242, whereas it makes a negative decision in step S241 if Texp<Tlg is not true, to proceed to step S261 in FIG. 20. The timing chart in FIG. 7 corresponds to the operation proceeding to step S242, whereas the timing chart in FIG. 8 corresponds to the operation proceeding to step S261.

In step S242, the arithmetic operation circuit 101 substitutes the parameter τ' (length of time τ' in FIG. 7) with (Texp+Tm1+Tm2−Th1−Td2) before the operation proceeds to step S243.

In step S243, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S243 upon judging that the voltage at the battery 106 has become low to proceed to step S121 in FIG. 13. The arithmetic operation circuit 101 makes a negative decision in step S243 upon judging that the voltage at the battery 106 has not become low to proceed to step S244.

In step S244, the arithmetic operation circuit 101 makes a decision as to whether or not TM≧Tm1 is true. The arithmetic operation circuit 101 makes an affirmative decision in step S244 if TM≧Tm1 is true, to proceed to step S245, whereas it makes a negative decision in step S244 if TM≧Tm1 is not true, to return to step S243. The operation proceeds to step S245 on the assumption that the pre-exposure time margin Tm1 has elapsed (t8 in FIG. 7)

In step S245, the arithmetic operation circuit 101 outputs a command for the timing circuit 124 to start electrical charge storage at the image-capturing element 121 and then the operation proceeds to step S246.

In step S246, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S246 upon judging that the voltage at the battery 106 has become low to proceed to step S121 in FIG. 13. The arithmetic operation circuit 101 makes a negative decision in step S246 upon judging that the voltage at the battery 106 has not become low to proceed to step S247.

In step S247, the arithmetic operation circuit 101 makes a decision as to whether or not TM≧Th1 is true. The arithmetic operation circuit 101 makes an affirmative decision in step S247 if TM≧Th1 is true, to proceed to step S248, whereas it makes a negative decision in step S247 if TM≧Th1 is not true, to return to step S246. The operation proceeds to step S247 on the assumption that the holding time Th1 has elapsed.

In step S248, the arithmetic operation circuit 101 outputs a command for the shutter drive circuit 108 to reduce the power supplied to the main motor 12 to approximately ⅓ of the initial level (with the timing t9 in FIG. 7). The power may be reduced by lowering the current being supplied or by lowering the level of the voltage being applied.

In step S249, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S249 upon judging that the voltage at the battery 106 has become low to proceed to step S121 in FIG. 13. The arithmetic operation circuit 101 makes a negative decision in step S249 upon judging that the voltage at the battery 106 has not become low to proceed to step S250.

In step S250, the arithmetic operation circuit 101 makes a decision as to whether or not TM≧(Th1+τ') is true. The arithmetic operation circuit 101 makes an affirmative decision in step S250 if TM≧(Th1+τ') is true, to proceed to step S251, whereas it makes a negative decision in step S250 if TM≧(Th1+τ') is not true, to return to step S249. The operation proceeds to step S251 on the assumption that the closing drive should start at this time (t9A in FIG. 7).

In step S251, the arithmetic operation circuit 101 outputs a command for the shutter drive circuit 109 (with the timing t9A) to raise the power to the original level and start rotating the main motor 12 in the reverse direction before proceeding to step S252. In response, closing drive of the blade set 3 at the shutter 1 to close the aperture 2*a* starts.

In step S252, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S252 upon judging that the voltage at the battery 106 has become low to proceed to step S121 in FIG. 13. The arithmetic operation circuit 101 makes a negative decision in step S252 upon judging that the voltage at the battery 106 has not become low to proceed to step S253.

In step S253, the arithmetic operation circuit 101 makes a decision as to whether or not TM≧(Tm1+Texp) is true. The arithmetic operation circuit 101 makes an affirmative decision in step S253 if TM≧(Tm1+Texp) is true, to proceed to step S254, whereas it makes a negative decision in step S253 if TM≧(Tm1+Texp) is not true, to return to step S252. The operation proceeds to step S254 on the assumption that the exposure should end at this time (t11 in FIG. 7).

In step S254, the arithmetic operation circuit 101 outputs a command for the timing circuit 124 to end the electrical charge storage at the image-capturing element 121 and then the operation proceeds to step S255.

In step S255, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S255 upon judging that the voltage at the battery 106 has become low to proceed to step S121 in FIG. 13. The arithmetic operation circuit 101 makes a negative decision in step S255 upon judging that the voltage at the battery 106 has not become low to proceed to step S256.

In step S256, the arithmetic operation circuit 101 makes a decision as to whether or not TM≧(Tm1+Texp+Tm2+Tm3) is true. The arithmetic operation circuit 101 makes an affirmative decision in step S256 if TM≧(Tm1+Texp+Tm2+Tm3) is true, to proceed to step S183 in FIG. 16, whereas it makes a negative decision in step S256 if TM≧(Tm1+Texp+Tm2+Tm3) is not true, to return to step S255. The operation proceeds to step S183 on the assumption that a mirror down operation and an aperture open reset operation should start at this time (t14 in FIG. 7).

The processing explained above in reference to FIG. 19 differs from the processing in FIG. 16 in that an electrical charge storage at the image-capturing element 121 starts immediately after the pre-exposure time margin Tm1 elapses, in that the power supplied to the main motor 12 is reduced following the holding time Th1 until the length of time τ' elapses and in that the start of the reverse rotation of the main motor 12 is delayed until the time length τ' elapses.

Figure 20:
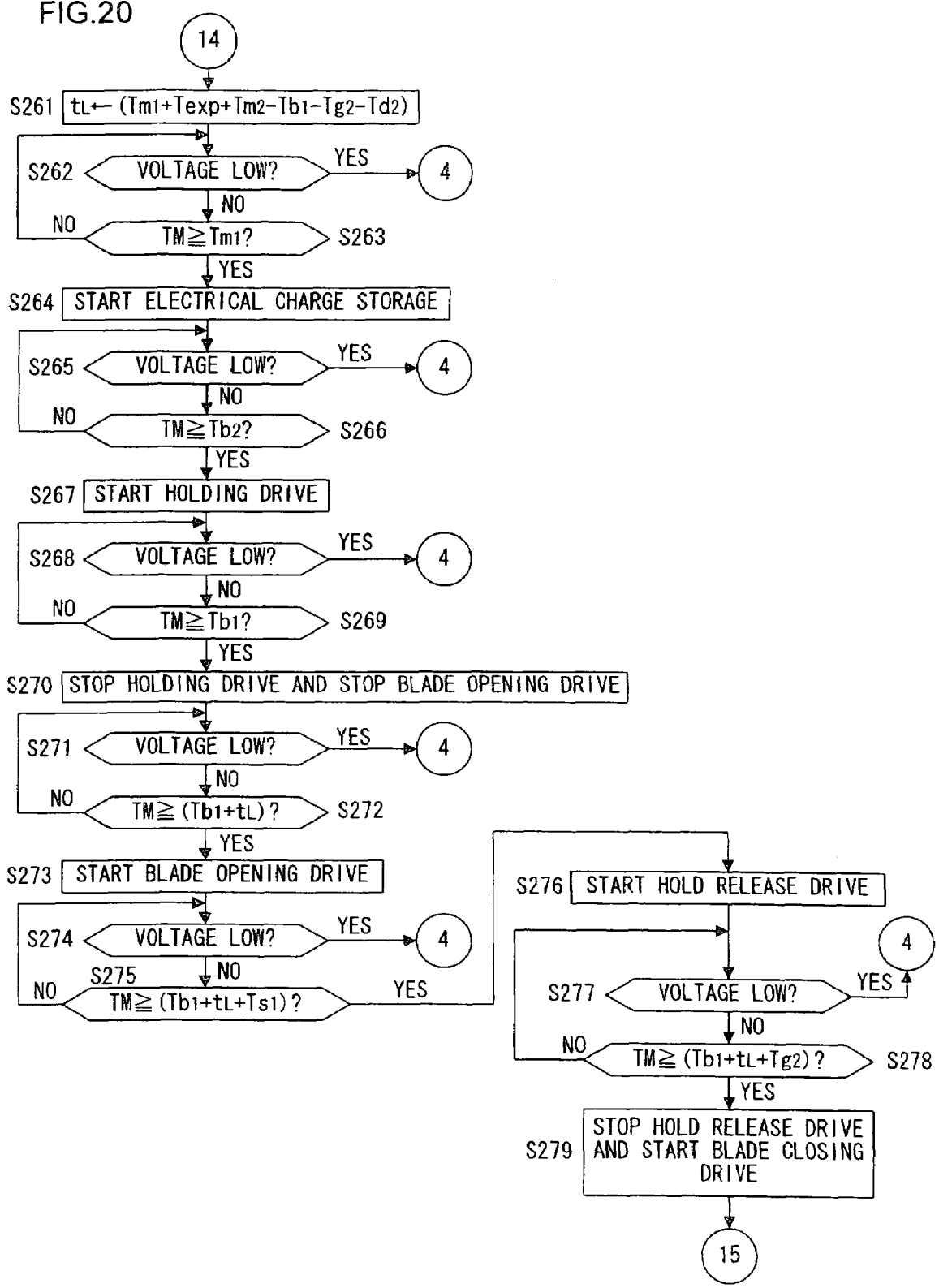
FIG. 20 presents a flowchart of the image-capturing sequence processing.

In step S261 in FIG. 20, to which the operation proceeds after making a negative decision in step S241 as described above, the arithmetic operation circuit 101 substitutes the parameter tL (the length of time tL in FIG. 8) with (Tm1+Texp+Tm2−Tb1−Tg2−Td2) and then the operation proceeds to step S262.

Since the processing executed in steps S262 through S265 is identical to the processing executed in steps S243 through S246 in FIG. 19, its explanation is omitted.

In step S266, the arithmetic operation circuit 101 makes a decision as to whether or not TM≧Tb2 is true. The arithmetic operation circuit 101 makes an affirmative decision in step S266 if TM≧Tb2 is true, to proceed to step S267, whereas it makes a negative decision in step S266 if TM≧Tb2 is not true, to return to step S265. The operation proceeds to step S267 on the assumption that the holding lever 14 should be now driven to the holding position.

In step S267, the arithmetic operation circuit 101 starts holding drive and then the operation proceeds to step S268. In more specific terms, it outputs a command for the shutter drive circuit 108 to rotate the sub-motor 15 in the reverse direction.

In step S268, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S268 upon judging that the voltage at the battery 106 has become low to proceed to step S121 in FIG. 13. The arithmetic operation circuit 101 makes a negative decision in step S268 upon judging that the voltage at the battery 106 has not become low to proceed to step S269.

In step S269, the arithmetic operation circuit 101 makes a decision as to whether or not TM≧Tb1 is true. The arithmetic operation circuit 101 makes an affirmative decision in step S269 if TM≧Tb1 is true, to proceed to step S270, whereas it makes a negative decision in step S269 if TM≧Tb1 is not true, to return to step S268. The operation proceeds to step S270 on the assumption that the holding time Tb1 has elapsed after the serial connection output from the serial connection between the shutter switches SW2 and SW3 went into an off state.

In step S270, the arithmetic operation circuit 101 stops the holding drive and also stops the opening drive of the blade set 3 before the operation proceeds to step S271. The holding drive is stopped by issuing an instruction for the shutter drive circuit 108 to stop the reverse rotation of the sub-motor 15, and the opening drive is stopped by issuing an instruction for the shutter drive circuit 108 to stop the forward rotation of the main motor 12.

In step S271, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S271 upon judging that the voltage at the battery 106 has become low to proceed to step S121 in FIG. 13. The arithmetic operation circuit 101 makes a negative decision in step S271 upon judging that the voltage at the battery 106 has not become low to proceed to step S272.

In step S272, the arithmetic operation circuit 101 makes a decision as to whether or not TM≧(Tb1+tL) is true. The arithmetic operation circuit 101 makes an affirmative decision in step S272 if TM≧(Tb1+tL) is true, to proceed to step S273, whereas it makes a negative decision in step S272 if TM≧(Tb1+tL) is not true, to return to step S271. The operation proceeds to step S273 on the assumption that the opening drive should resume at this time.

In step S273, the arithmetic operation circuit 101 starts opening drive of the blade set 3 and then the operation proceeds to step S274. In step S274, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S274 upon judging that the voltage at the battery 106 has become low to proceed to step S121 in FIG. 13. The arithmetic operation circuit 101 makes a negative decision in step S274 upon judging that the voltage at the battery 106 has not become low to proceed to step S275.

In step S275, the arithmetic operation circuit 101 makes a decision as to whether or not TM≧(Tb1+tL+Ts1) is true. The arithmetic operation circuit 101 makes an affirmative decision in step S275 if TM≧(Tb1+tL+Ts1) is true, to proceed to step S276, whereas it makes a negative decision in step S275 if TM≧(Tb1+tL+Ts1) is not true, to return to step S274. The operation proceeds to step S276 on the assumption that the hold release drive should start at this time.

In step S276, the arithmetic operation circuit 101 starts hold release drive before the operation proceeds to step S277. The hold release drive is started by issuing an instruction for the shutter drive circuit 108 to start rotating the sub-motor 15 forward. In step S277, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S277 upon judging that the voltage at the battery 106 has become low to proceed to step S121 in FIG. 13. The arithmetic operation circuit 101 makes a negative decision in step S277 upon judging that the voltage at the battery 106 has not become low to proceed to step S278.

In step S278, the arithmetic operation circuit 101 makes a decision as to whether or not TM≧(Tb1+tL+Tg2) is true. The arithmetic operation circuit 101 makes an affirmative decision in step S278 if TM≧(Tb1+tL+Tg2) is true, to proceed to step S279, whereas it makes a negative decision in step S278 if TM≧(Tb1+tL+Tg2) is not true, to return to step S277. The operation proceeds to step S279 on the assumption that the hold release drive should be stopped and that closing drive of the blade set 3 should start at this time.

In step S279, the arithmetic operation circuit 101 stops the hold release drive and starts closing drive of the blade set 3 before the operation proceeds to step S252 in FIG. 19. The hold release drive is stopped by issuing an instruction for the shutter drive circuit 108 to stop the forward rotation of the sub-motor 15 and the closing drive is started by issuing an instruction for the shutter drive circuit 108 to start rotating the main motor 12 in the reverse direction.

The processing explained above in reference to FIG. 20 differs from the processing in FIG. 16 and in FIG. 19 in that the power supply to the main motor 12 is suspended when the blade set 3 is in an open state.

Figure 21:
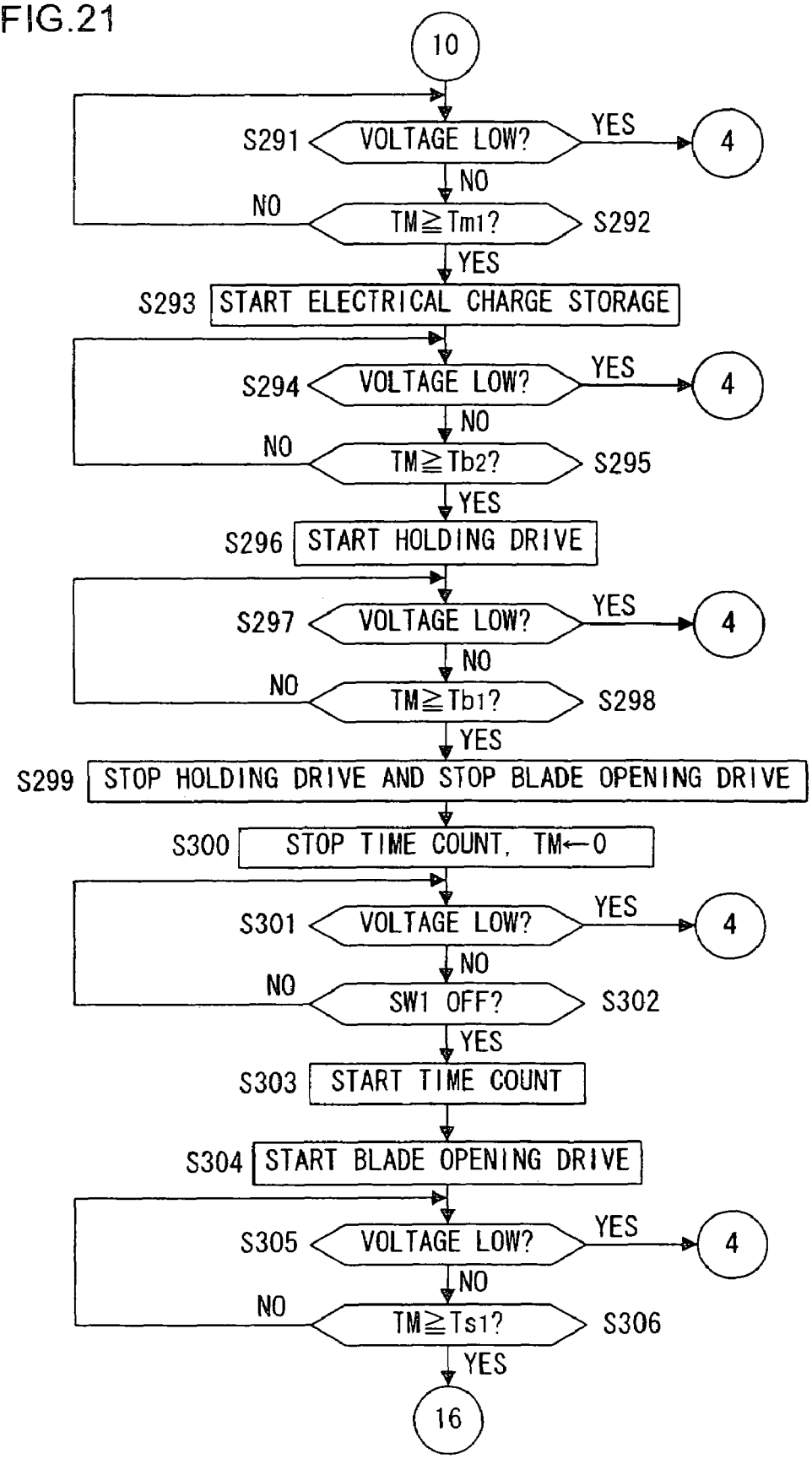
FIG. 21 presents a flowchart of the image-capturing sequence processing.
Figure 22:
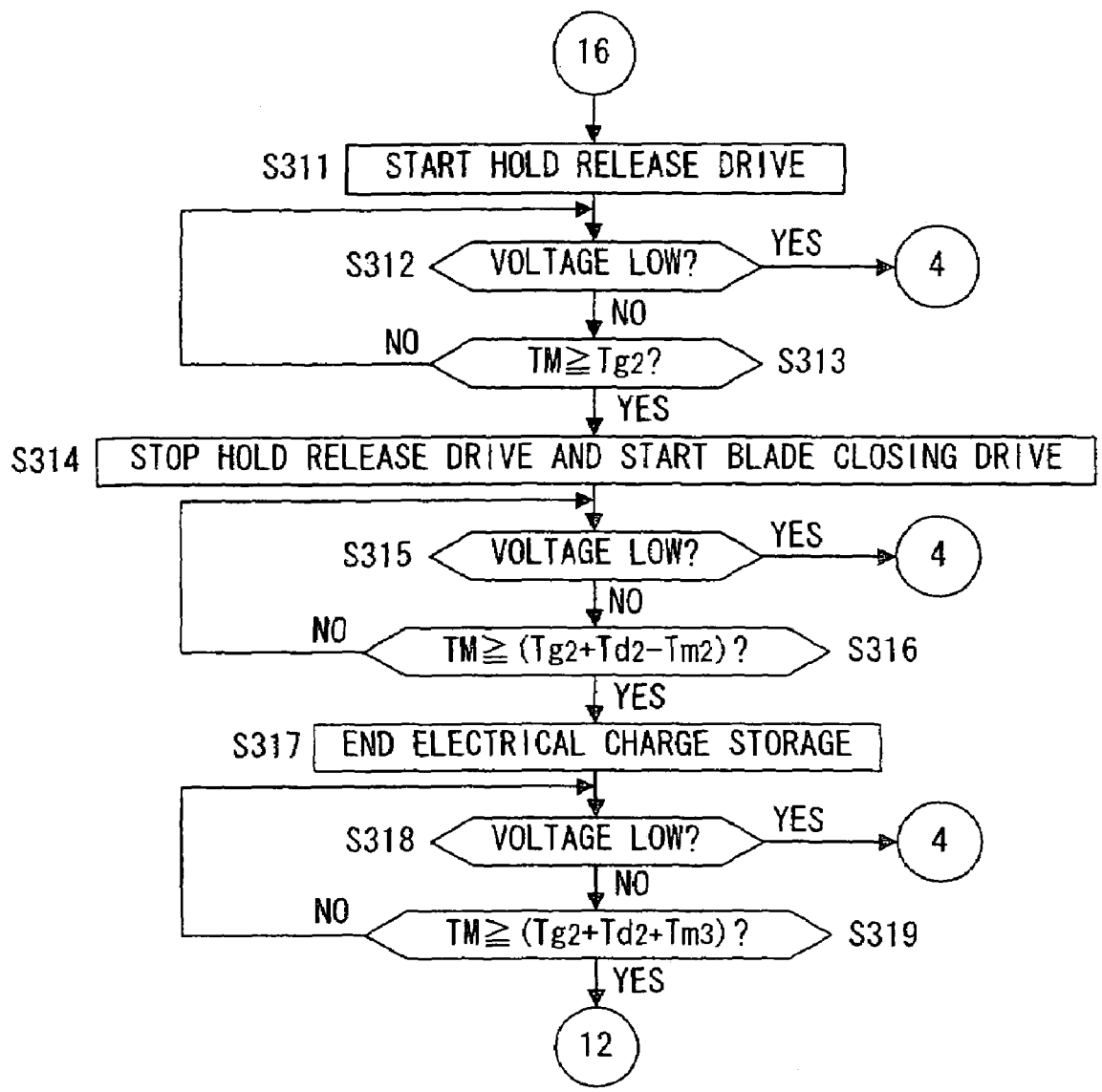
FIG. 22 presents a flowchart of the image-capturing sequence processing.

In step S291 in FIG. 21, to which the operation proceeds after making an affirmative decision in step S160 in FIG. 15 as described above, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S291 upon judging that the voltage at the battery 106 has become low to proceed to step S121 in FIG. 13. The arithmetic operation circuit 101 makes a negative decision in step S291 upon judging that the voltage at the battery 106 has not become low to proceed to step S292.

Since the processing executed in steps S292 through S299 is identical to the processing executed in steps S263 through S270 in FIG. 20, its explanation is omitted.

In steps S300, the arithmetic operation circuit 101 stops the measurement of the time count by the timer circuit 101t and clears the time count TM to 0 before proceeding to step S301. In step S301, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S301 upon judging that the voltage at the battery 106 has become low to proceed to step S121 in FIG. 13. The arithmetic operation circuit 101 makes a negative decision in step S301 upon judging that the voltage at the battery 106 has not become low to proceed to step 302.

In steps S302, the arithmetic operation circuit 101 makes a decision as to whether or not the shutter release operation signal having entered an on state (step S12) has shifted into an off state. The arithmetic operation circuit 101 makes an affirmative decision in step S302 if the operation signal from the shutter release which SW1 has shifted to H level to proceed to step S303. However, it makes a negative decision in step S302 if the operation signal from the shutter release which SW1 has not shifted to H level and in this case, the operation returns to step S301.

In step S303, the arithmetic operation circuit 101 starts a time count by the timer circuit 101t and then the operation proceeds to step S304.

Since the processing executed in steps S304 and S305 is identical to the processing executed in steps S273 and S274 in FIG. 20, its explanation is omitted.

In step S306, the arithmetic operation circuit 101 makes a decision as to whether or not TM≧Ts1 is true. The arithmetic operation circuit 101 makes an affirmative decision in step S306 if TM≧Ts1 is true, to proceed to step S311 in FIG. 22, whereas it makes a negative decision in step S306 if TM≧Ts1 is not true, to return to step S305. The operation proceeds to step S311 on the assumption that the hold release drive should start at this time.

Since the processing executed in steps S311 and S312 is identical to the processing executed in steps S276 and S277 in FIG. 20, its explanation is omitted.

In step S313, the arithmetic operation circuit 101 makes a decision as to whether or not TM≧Tg2 is true. The arithmetic operation circuit 101 makes an affirmative decision in step S313 if TM≧Tg2 is true, to proceed to step S314, whereas it makes a negative decision in step S313 if TM≧Tg2 is not true, to return to step S312. The operation proceeds to step S314 on the assumption that the hold release drive should stop and closing drive of the blade set 3 should start at this time.

In steps S314, the arithmetic operation circuit 101 stops the hold release drive and starts the closing drive of the blade set 3 before the operation proceeds to step S315. It stops the hold release drive by issuing an instruction for the shutter drive circuit 108 to stop the forward rotation of the sub-motor 15 and starts the closing drive by issuing an instruction for the shutter drive circuit 108 to start rotating the main motor 12 in the reverse direction.

In step S315, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S315 upon judging that the voltage at the battery 106 has become low to proceed to step S121 in FIG. 13. The arithmetic operation circuit 101 makes a negative decision in step S315 upon judging that the voltage at the battery 106 has not become low to proceed to step 316.

In step S316, the arithmetic operation circuit 101 makes a decision as to whether or not TM≧(Tg2+Td2−Tm2) is true. The arithmetic operation circuit 101 makes an affirmative decision in step S316 if TM≧(Tg2+Td2−Tm2) is true, to proceed to step S317, whereas it makes a negative decision in step S316 if TM≧(Tg2+Td2−Tm2) is not true, to return to step S315. The operation proceeds to step S317 on the assumption that the exposure should end at this time (t11 in FIG. 9).

In steps S317, the arithmetic operation circuit 101 outputs a command for the timing circuit 124 to end the electrical charge storage at the image-capturing element 121, and then the operation proceeds to step S318.

In step S318, the arithmetic operation circuit 101 makes a decision as to whether or not the voltage at the battery 106 has become low by checking the voltage detection signal input from the battery voltage detection circuit 105. The arithmetic operation circuit 101 makes an affirmative decision in step S318 upon judging that the voltage at the battery 106 has become low to proceed to step S121 in FIG. 13. The arithmetic operation circuit 101 makes a negative decision in step S318 upon judging that the voltage at the battery 106 has not become low to proceed to step 319.

In step S319, the arithmetic operation circuit 101 makes a decision as to whether or not TM≧(Tg2+Td2+Tm3) is true. The arithmetic operation circuit 101 makes an affirmative decision in step S319 if TM≧(Tg2+Td2+Tm3) is true, to proceed to step S183 in FIG. 16, whereas it makes a negative decision in step S319 if TM≧(Tg2+Td2+Tm3) is not true, to return to step S318. The operation proceeds to step S183 on the assumption that a mirror down operation and an aperture open reset operation should start at this time (t14 in FIG. 9).

In the processing explained above in reference to FIGS. 21 and 22, the power supply to the main motor 12 is stopped while the blade set 3 is in an open state if the "valve" setting is currently selected.

As explained above, it should be assumed that the shutter release button is pressed down again after the shutter release button having been held down is released with timing t7C in FIG. 9 in the "time" photographing mode. More specifically, processing for deciding whether or not the shutter release which SW1 has been turned on and processing for making a decision as to whether or not the voltage at the battery 106 has become low should be executed between step S302 and step S303 in FIG. 21.

The image-capturing sequence executed in the electronic camera in the embodiment as explained above is now summarized.

A. When exposure time Texp≧Tlg (FIG. 8) or when the shutter speed is set to "valve" or "time" (FIG. 9)

(1) After the blade set 3 at the shutter becomes fully open (at time point t7), the holding time Tb1 elapses and then the forward power supply to the main motor 12 is stopped while holding the blade set 3 in the open state (at time point t7B) The blade set 3 is held in the open state by holding the drive lever 8 with the holding lever 14 while the drive lever 8 maintains contact with the open position regulating projection 2c of the shutter baseplate 2 (see FIG. 3). Thus, even when the exposure period is long, the power consumption by the main motor 12 during the exposure is minimized. In addition, the extent to which the temperature rises due to the heat generation at the main motor 12 is minimized.

(2) If the shutter speed is set to neither "valve" nor "time", closing drive of the blade set 3 is started (at time point t9B) when the length of time that is the sum of the time length tL calculated in correspondence to the exposure time Texp and the forward power supply period Tg2 elapses after the blade set 3 at the shutter 1 becomes fully open (at time point t7 in FIG. 8). It is to be noted that the hold on the drive lever 8 will have been released by the time the closing drive starts. Accordingly, the length of time required for the image-capturing sequence can be reduced compared to the length of time required for an image-capturing sequence during which the closing drive of the blade set 3 does not start until the exposure (electrical charge storage) ends. This feature is particularly effective if the closing drive of the blade set 3 is achieved by using an electromagnetic actuator with which a time lag (Td2=9 msec in the example explained above) occurs at startup or when the driving direction is switched.

(3) The length of time tL in A(2) above is calculated so as to ensure that the exposure end (time point t11) precedes the time point (t13) at which the blade set 3 at the shutter 1 moves slightly in the closing direction and actually starts to close the aperture 2a by the post-exposure time margin Tm2 (e.g., 1 msec) and, as a result, the length of time elapsing between the exposure end (time point t11) and the start of the read (time point t18) of the stored electrical charges (data) from the image-capturing element 121 is reduced to minimize the adverse effect of the noise attributable to the dark current at the photodiodes constituting the pixels of the image-capturing element 121. In addition, since the blade set 3 is immediately driven to close the aperture 2a (i.e., to shield the image-capturing element 121 from the light) immediately after the electrical charge storage (image-capturing operation), the extent of smearing that occurs when reading out the electrical charges is minimized.

(4) If the shutter speed is set to "valve" or "time", closing drive of the blade set 3 is started (at time point t9B) when the power supply period Tg2 elapses following time point t7C (see FIG. 9) at which the shutter release button having been pressed down is released (at the "valve" setting) or the shutter release button is pressed down again (at the "time" setting). Thus, the length of time required for the image-capturing sequence can be reduced compared to the length of time required for an image-capturing sequence during which the closing drive of the blade set 3 does not start until the exposure (electrical charge storage) ends.

B When (Th1+Td2−Tm1−Tm2)≦Texp<Tlg (FIG. 7)

(1) After the blade set 3 at the shutter 1 becomes fully open (at time point t7), the holding time Th1 elapses and then the power supplied to the main motor 12 is reduced (time point t9). Thus, the extent of the increase in the temperature due to heat generation at the main motor 12 is minimized and the power consumption is reduced.

(2) The power is sustained at the lower level as described above in B(1) over the length of time τ' calculated in correspondence to the exposure time Texp and closing drive of the blade set 3 is started at time point t9A. Thus, the length of time required for the image-capturing sequence can be reduced compared to the length of time required for an image-capturing sequence during which the closing drive of the blade set 3 does not start until the exposure (electrical charge storage) ends.

(3) Since the time length τ' in B(2) above is calculated so as to ensure that the exposure end (time point t11) precedes the time point (t13), at which the blade set 3 at the shutter 1 slightly moves in the closing direction and actually starts to close the aperture 2a, by the post-exposure time margin Tm2 (e.g., 1 msec), and thus, the adverse effect of noise is reduced and the extent of smearing that occurs when reading out electrical charges is minimized.

C When exposure time Texp<(Td2−Tm2) (FIG. 5) or when (Td2−Tm2)≦Texp<Th1+Td2−Tm1−Tm2) (FIG. 6);

(1) After the blade set 3 of the shutter 1 becomes fully open (at time point t7), the holding time Th1 elapses and then closing drive of the blade set 3 is started (at time point t9), thus, the length of time required for the image-capturing sequence is reduced compared to the length of time required for an image-capturing sequence during which the closing drive of the blade set 3 does not start until the exposure (electrical charge storage) ends.

(2) The exposure start timing t10 is adjusted so as to ensure that the exposure end precedes the time point (t13), at which the blade set 3 at the shutter 1 moves slightly in the closing direction and actually starts to close the aperture 2a, by the post-exposure time margin Tm2 (e.g., 1 msec).

Thus, the adverse effect of noise is reduced and the extent of smearing that occurs when reading out electrical charges is minimized.

In A through C explained above, the rotating direction of the main motor 12, which is an electromagnetic actuator, is switched and the rotation of the motor 12 is stopped respectively after the holding time Th1 (Tb1) and the holding time Th2, and thus, the length of time Td2 elapsing between the start of the reverse power supply to the main motor 12 (time point t9, t9A or t9B) and time point (t13) at which the blade set 3 actually starts to close the aperture 2a and the length of time Td1 elapsing between the start of the forward power supply to the motor 12 (t2) and the time point (t4) at which the blade set 3 actually starts to open the aperture 2a can both be stabilized at approximately 9 msec. Consequently, the accuracy of the image-capturing sequence is improved and the individual time margins Tm1 through Tm4 can be kept to minimum lengths so as to further reduce the length of time required for the image-capturing sequence.

In A through C explained above, after detecting that the blade set 3 is in a closed state, the reverse power supply to the main motor 12 is stopped (time point t19) while holding the blade set 3 in the closed state. Then, the blade set 3 held in a closed state is first released and the forward power supplied to the main motor 12 is started (at time point t2) for the next photographing operation. Thus, even if the electronic camera becomes subjected to an impact or the like after the image-capturing sequence is completed, the blade set 3 is held in the closed state with a high degree of reliability.

In addition, in A through C described above, before releasing the hold of the blade set 3 in an open state or a closed state, power is first supplied to the main motor 12 in the direction opposite from the direction in which power is supplied to the main motor 12 after the release. Thus, the drive lever 8 remains in contact with the close position regulating projection 2b or the open position regulating projection 2c without fail when the holding lever 14 moves between the holding position and the hold release position so as to ensure that the drive lever 8 is never allowed to obstruct the movement of the holding lever 14.

Furthermore, when there is a considerable risk of the image-capturing sequence in progress becoming halted, e.g., when a reduction in battery voltage is detected, reset processing is executed so that the holding lever 14 is first driven to the hold release position (step S23: forward power supply to the sub-motor 15) and then the blade set 3 is driven in the closing direction (step S28: reverse power supply to the main motor 12), and thus, the holding lever 14 is never allowed to obstruct the movement of the drive lever 8.

The numerical values as of Th1, Th2, Tm1 through Tm4, Td1, Td2 and the like are not limited to those used in the example explained above. A time margin may be set to, for instance, 0.5 msec.

It is to be noted that the components used in the first embodiment described above may constitute the following elements. The shielding member may be constituted with, for instance, the blade set 3 (focal plane shutter 1). The first electromagnetic actuator may be constituted with, for instance, the main motor 12. The holding member may be constituted with, for instance, the holding lever 14. The second electromagnetic actuator may be constituted with, for instance, the sub-motor 15. The means for exposure control may be constituted with, for instance, the arithmetic operation circuit 101.

Second Embodiment

The operation of a single lens reflex electronic camera executed in a cleaning mode is explained in reference to the second embodiment. The side view of the single lens reflex electronic camera achieved in the second embodiment and the structure of its focal plane shutter are identical to the side view of the electronic camera 51 achieved in the first embodiment and its focal plane shutter 1, and accordingly, the explanation of the first embodiment given in reference to FIGS. 1 through 3 should be reviewed.

Figure 23:
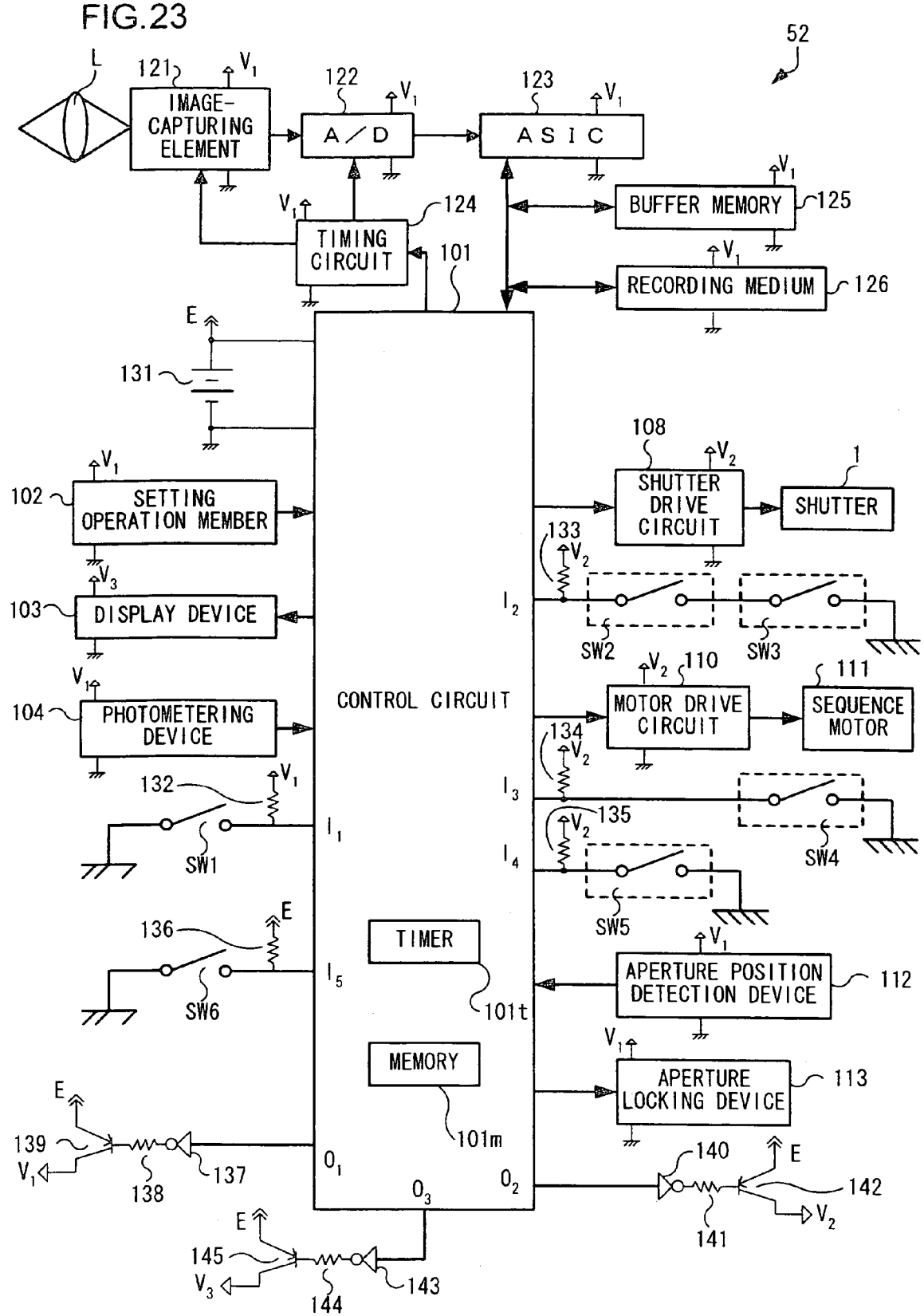
FIG. 23 is a block diagram showing the structure adopted in the electronic camera achieved in a second embodiment.

FIG. 23 is a block diagram of the structure adopted in an electronic camera 52 in the second embodiment. The same reference numerals are assigned to components identical to those in the electronic camera 51 achieved in the first embodiment. An arithmetic operation circuit (control circuit) 101 in FIG. 23 is constituted with a microcomputer and the like. The arithmetic operation circuit 101 includes CPU peripheral circuits such as a memory 101m and a timer circuit 101t. The arithmetic operation circuit 101 executes specific arithmetic operations by using signals input thereto from various blocks to be detailed later and outputs control signals to the individual blocks based upon the results of the arithmetic operations. The memory 101m constituted with a nonvolatile memory stores in memory various flags to be explained later. Power is supplied to the arithmetic operation circuit 101 from a battery 131 loaded in the camera. E indicates the terminal voltage of the battery 131.

An emitter terminal and a base terminal of a PNP transistor 139 are respectively connected to a power line (voltage E) achieved with the battery 131 and to an output port O1 of the arithmetic operation circuit 101 via a resistor 138 and an inverter 137. When a signal output from the output port O1 is at high level, the transistor 139 is turned on and thus, power with the voltage V1 is supplied from a collector terminal. When the signal output from the output port O1 is at low level, the transistor 139 enters an off state to cut off the supply of power with the voltage V1.

An emitter terminal and a base terminal of a PNP transistor 142 are respectively connected to a power line (voltage E) achieved with the battery 131 and to an output port O2 of the arithmetic operation circuit 101 via a resistor 141 and an inverter 140. When a signal output from the output port O2 is at high level, the transistor 141 is turned on and thus, power with the voltage V2 is supplied from a collector terminal. When the signal output from the output port O2 is at low level, the transistor 141 enters an off state to cut off the supply of power with the voltage V2.

An emitter terminal and a base terminal of a PNP transistor 145 are respectively connected to a power line (voltage E) achieved with the battery 131 and to an output port O3 of the arithmetic operation circuit 101 via a resistor 144 and an inverter 143. When a signal output from the output port O3 is at high level, the transistor 145 is turned on and thus, power with the voltage V3 is supplied from a collector terminal. When the signal output from the output port O3 is at low level, the transistor 145 enters an off state to cut off the supply of power with the voltage V3.

A setting operation member 102 may be constituted with, for instance, buttons and a command dial. The setting operation member 102 outputs operation signals corresponding to setting operations to the arithmetic operation circuit 101. Power is supplied to the setting operation member 102 through the power line (with the voltage V1) achieved with the transistor 139. The arithmetic operation circuit 101 selects the normal photographing mode, the cleaning mode or the like in correspondence to an operation signal from the setting operation member 102. The cleaning mode is a maintenance operation mode in which the mirror is held in the raised state and the blade set 3 is held in the open state in order to facilitate removal of dirt or dust adhering to the image-capturing element 121 and its vicinity.

A display device 103 brings up a display indicating the shutter speed and the aperture value in response to an instruction issued by the arithmetic operation circuit 101. Power is supplied to the display device 103 through the power line (with the voltage V3) achieved with the transistor 145.

A photometering device 104 detects the quantity of light having passed through the photographic lens L. It is to be noted that the full open aperture value of the photographic lens L is F2.8 and the aperture can be controlled within a range of F2.8 to F20. Power is supplied to the photometering device 104 through the power line (with the voltage V1) achieved with the transistor 139.

A shutter release switch SW1, which enters an on state by interlocking with depression of a shutter release button (not shown), shifts into an off state as the shutter release button having been held down is released. An operation signal generated from the shutter release switch SW1 constitutes a photographing start instruction in the photographing mode and constitutes an operation start instruction for a mirror up operation and the like in the cleaning mode. One of the terminals at the switch SW1 is connected to an input port I1 of the arithmetic operation circuit 101 and is also pulled up via a resistor 132 to the power line (with the voltage V1) achieved with the transistor 139. The other terminal of the switch SW1 is grounded.

A power switch SW6, which is turned on/off by interlocking with a rotating operation of a power dial (not shown), enters an off state when the power dial is set to an on position and enters an on state when the power dial is set to an off position. One of the terminals at the switch SW6 is connected to an input port I5 of the arithmetic operation circuit 101 and is also pulled up via a resistor 136 to the power line (with the voltage E) achieved with the battery 131. The other terminal of the switch SW6 is grounded.

A shutter drive circuit 108 opens/closes a blade set 3 through a forward power supply or a reverse power supply to the main motor 12 which drives the focal plane shutter 1 and a sub-motor 15. Power is supplied to the shutter drive circuit 108 through the power line (with the voltage V2) achieved with the transistor 142.

Shutter switches SW2 and SW3 are used to detect the blade set 3 in a closed state and in an open state respectively. The shutter switch SW2 shifts from an on state to an off state when the blade set 3 closes the aperture 2a completely (when the aperture set 3 has moved slightly further in the closing direction after completely closing the aperture, to be more exact). The shutter switch SW3, on the other hand, shifts from an on state to an off state when the blade set 3 withdraws and the aperture 2a becomes completely open, (when the blade set 3 has moved slightly further in the opening direction after completely opening the aperture, to be more exact). The shutter switches SW2 and SW3 are each turned on or off depending upon the position to which the drive lever 8 is rotated (see FIGS. 2 and 3). It is to be noted that the lengths of time required to open and close the focal plane shutter 1 (e.g., the lengths of time over which the blade set 3 runs) are each approximately 11 msec.

The shutter switches SW2 and SW3 are connected in series, the individual signals generated at the shutter switches SW2 and SW3 are synthesized, and the synthesized signal is input to an input port I2 of the arithmetic operation circuit 101. Thus, when the shutter switches SW2 and SW3 are both in an on state (the serial connection output: on), an input signal at low level is input to the arithmetic operation circuit 101, whereas when at least either the shutter switch SW2 or the shutter switch SW3 is in an off state (serial connection output: off), an input signal at high level is input to the arithmetic operation circuit 101. It is to be noted that the input port I2 at the arithmetic operation circuit 101 is internally pulled up via the resistor 133 to the power line (with the voltage V2) achieved with the transistor 142 so as to assume that an H level signal is input when there is actually no input (serial connection output: off).

A motor drive circuit 110 controls the rotation of a sequence motor 111 in response to a command issued by the arithmetic operation circuit 101. Power is supplied to the motor drive circuit 110 through the power line (with the voltage V2) achieved with the transistor 142.

The sequence motor 111 constitutes an image-capturing sequence drive mechanism. The image-capturing sequence drive mechanism controls a photographing sequence during which a mirror 61 is raised/lowered and the aperture (not shown) is driven by controlling the drive of the sequence motor 111. It is to be noted that in the cleaning mode, it is utilized to raise/lower the mirror 61.

Sequence switches SW4 and SW5, which are part of the image-capturing sequence drive mechanism, generate sequence control timing. The sequence switch SW4 is structured so that it remains in an on state while the mirror is is in a lowered position enters an off state immediately after a mirror up operation starts and shifts back into an on state at the end of the mirror up operation. One of the terminals of the switch SW4 is connected to an input port I3 of the arithmetic operation circuit 101 and is also pulled up via a resistor 134 to the power line (with the voltage V2). The other terminal of the switch SW4 is grounded.

The sequence switch SW5, which is structured so that it shifts from an off state to an on state while a mirror down operation is in progress and shifts from an on state to an off state approximately 11 msec before the end of the mirror up operation, generates the timing with which the operation of the main motor 12 starts. The length of time 11 msec corresponds to the length of time required to open or close the focal plane shutter 11 mentioned earlier. One of the terminals of the switch SW5 is connected to an input port I4 of the arithmetic operation circuit 101 and is also pulled up via a resistor 135 to the power line (with the voltage V2) The other terminal of the switch SW5 is grounded.

An aperture position detection device 112 detects the aperture position to which the aperture is set by the image-capturing sequence drive mechanism and outputs a detection signal to the arithmetic operation circuit 101. Power is supplied to the aperture position detection device 112 through the power line (with the voltage V1) achieved with the transistor 139.

An aperture locking device 113 stops the aperture being driven and locks the aperture at a specific aperture value. The sequence drive mechanism is structured so that the aperture locked on hold by the aperture locking device 113 becomes released while the mirror down operation is in progress. Power is supplied to the aperture locking device 113 through the power line (with the voltage V1) achieved with the transistor 139.

An image-capturing element 121 captures a subject image having passed through the photographic lens L and outputs image signals constituted of stored electrical charges. The image-capturing sensitivity (exposure sensitivity) of the image-capturing element 121 is set to a level equivalent to ISO 100. In addition, the image-capturing element 121 has an electronic shutter function as explained earlier and a setting can be selected in specific steps within a 1 sec through 1/16,000 sec range. Power is supplied to the image-capturing element 121 through the power line (with the voltage V1) achieved with the transistor 139.

An A/D conversion circuit 122 converts analog image signals output from the image-capturing element 121 to digital signals. Power to the A/D conversion circuit 122 is supplied through the power line (with the voltage V1) achieved with the transistor 139.

An image processing circuit 123 constituted of an ASIC or the like executes image processing such as white balance (WB) adjustment on the digital signals, compression processing for compressing the image data resulting from the image processing into a specific format, decompression processing for decompressing the compressed data and the like. Power to the image processing circuit 123 is supplied through the power line (with the voltage V1) achieved with the transistor 139.

A timing circuit 124 generates timing signals needed to engage the image-capturing element 121 and the A/D conversion circuit 122 in operation and outputs the respective timing signals to the image-capturing element 121 and the A/D conversion circuit 122. Power to the timing circuit 124 is supplied through the power line (with the voltage V1) achieved with the transistor 139.

In a buffer memory 125, image data to undergo various types of processing including the image processing, the compression processing and the decompression processing are temporarily stored. Power to the buffer memory 125 is supplied through the power line (with the voltage V1) achieved with the transistor 139.

A recording medium 126 is a recording medium such as a memory card, which can be detachably loaded into the electronic camera 52. Image data having undergone the compression processing are recorded in the recording medium 126. Power to the recording medium 126 is supplied through the power line (with the voltage V1) achieved with the transistor 139.

The timing with which the image-capturing sequence drive mechanism and image-capturing element 121 operate when the electronic camera 52 described above is in the photographing mode is identical to the operational timing in the first embodiment explained in reference to FIG. 5, is omitted.

When a pre-read time margin Tm4 (e.g., 1 msec) elapses following time point t17 in FIG. 5, stored electrical charges are read out from the image-capturing element 121 over an electrical charge read period Tr starting at time point t18. Once the read period Tr elapses, a shutter release operation for the next frame is allowed.

Figure 24:
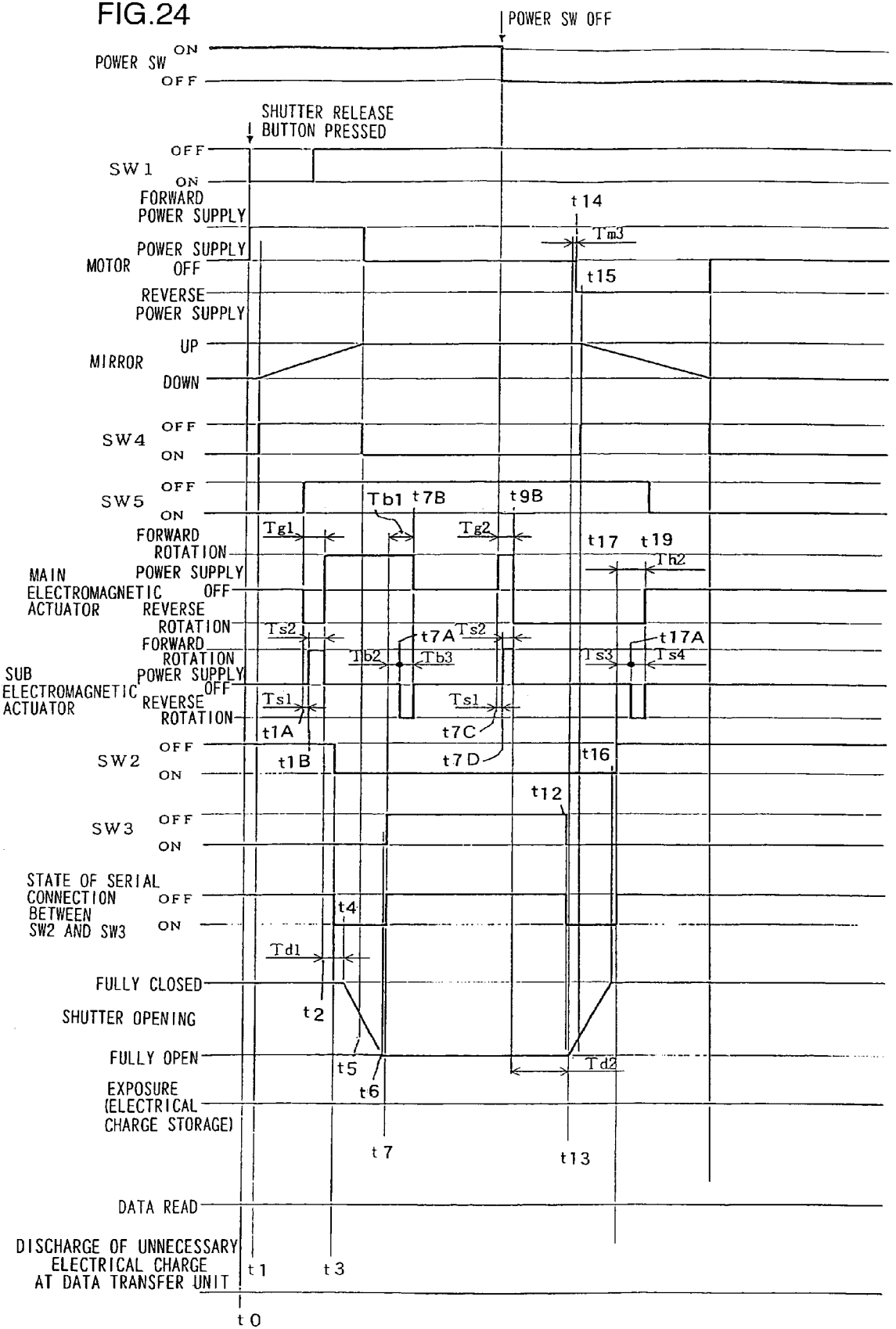
FIG. 24 shows the operational timing of the image-capturing sequence drive mechanism in the cleaning mode.

FIG. 24 shows the timing with which the image-capturing sequence drive mechanism operates when the electronic camera 52 is set in the cleaning mode. In the cleaning mode, the discharge of unnecessary electrical charge, the electrical charge storage and the data read at the image-capturing element 121 are not executed. A signal "power SW" in FIG. 24 indicates the waveform of the operation signal generated from the power switch SW6. As explained earlier, the switch SW6 is structured so as to close (enter an on state) when the power is turned off and to open (enter an off state) when the power is turned on. Accordingly, a signal at low level is input to the input port I5 of the arithmetic operation circuit 101 when power is off, whereas a signal at high level is input to the input port I5 when the power is on.

As an operation signal (from off to on) is generated from the shutter release switch SW1 at time point t0 in FIG. 24 in the electronic camera 52 set in the cleaning mode, a mirror up operation and an operation for opening the blade set 3 start.

The operation shown in FIG. 24 differs from the operation executed in the first embodiment as shown in FIG. 5 in that the drive lever 8 is held with the holding lever 14 and the forward power supply to the main motor is temporarily suspended while the shutter is fully opened, i.e., in the state (see FIG. 3) in which the drive lever 8 is in contact with the open position regulating projection 2c of the shutter baseplate 2, and in that a mirror down operation and an operation for closing the blade set 3 are started in response to an off operation of the power dial.

In FIG. 24, at time point t7A preceded by a wait time Tb2 (e.g., 10 msec) following time point t7 at which the blade set 3 at the shutter 1 becomes fully opened, a reverse power supply to the sub-motor 15 starts, causing the sub-motor 15 to rotate in the reverse direction. With the reverse rotation of the sub-motor 15, the holding lever 14 is driven toward the holding position. Thus, the holding lever 14 starts moving toward the holding position in the state (see FIG. 3) in which the drive lever 8 is in contact with the open position regulating projection 2c of the shutter baseplate 2.

When a power supply period Tb3 (e.g., 10 msec) elapses following time point t7A, the reverse power supply to the sub-motor 15 is stopped and the forward power supply to the main motor 12 is also stopped at time point t7B. As a result, the drive lever 8 becomes held with the blade set 3 in the full open state, and the main motor 12 stops. Maintenance work such as cleaning is executed in this condition.

At time point t7C at which the operation signal from the switch SW6 shifts from an on state to an off state in response to an off operation of the power switch SW6, a forward power supply to the main motor 12 is started, causing the main motor 12 to rotate forward. With the forward rotation of the main motor 12, the blade set 3 is driven in the opening direction. Accordingly, the drive lever 8 is firmly set in contact with the open position regulating projection 2c of the shutter baseplate 2 (see FIG. 3).

When a wait time Ts1 (e.g., 2 msec) elapses following time point t7C, a forward power supply to the sub-motor 15 is started at time point t7D causing the sub-motor 15 to rotate forward. With the forward rotation of the sub-motor 15, the holding lever 14 is driven toward the hold release position. Accordingly, the holding lever 14 starts moving toward the hold release position with the drive lever 8 maintaining contact with the open position regulating projection 2c of the shutter baseplate 2 (see FIG. 3).

When a power supply period Ts2 (e.g., 8 msec) elapses following time point t7D, the forward power supply to the sub-motor 15 is stopped and a reverse power supply to the main motor 12 is started at time point t9B. As a result, the main motor 12 rotates in the reverse direction in a state in which the hold on the drive lever 8 is released. With the reverse rotation of the main motor 12, the blade set 3 is driven in the closing direction. The length of time Tg2 over which the forward power supply to the main motor 12 is sustained is the sum of the wait time Ts1 and the power supply period Ts2.

After the power supply to the main motor 12 is switched to the reverse power supply (at time point t9B), i.e., after the main motor 12 starts the reverse rotation, a time delay Td2 occurs, and following the time delay Td2, the blade set 3 starts to close the aperture 2a (at time point t13). The subsequent operation is executed as shown in FIG. 5 in reference to which the first embodiment has been explained.

Figure 25:
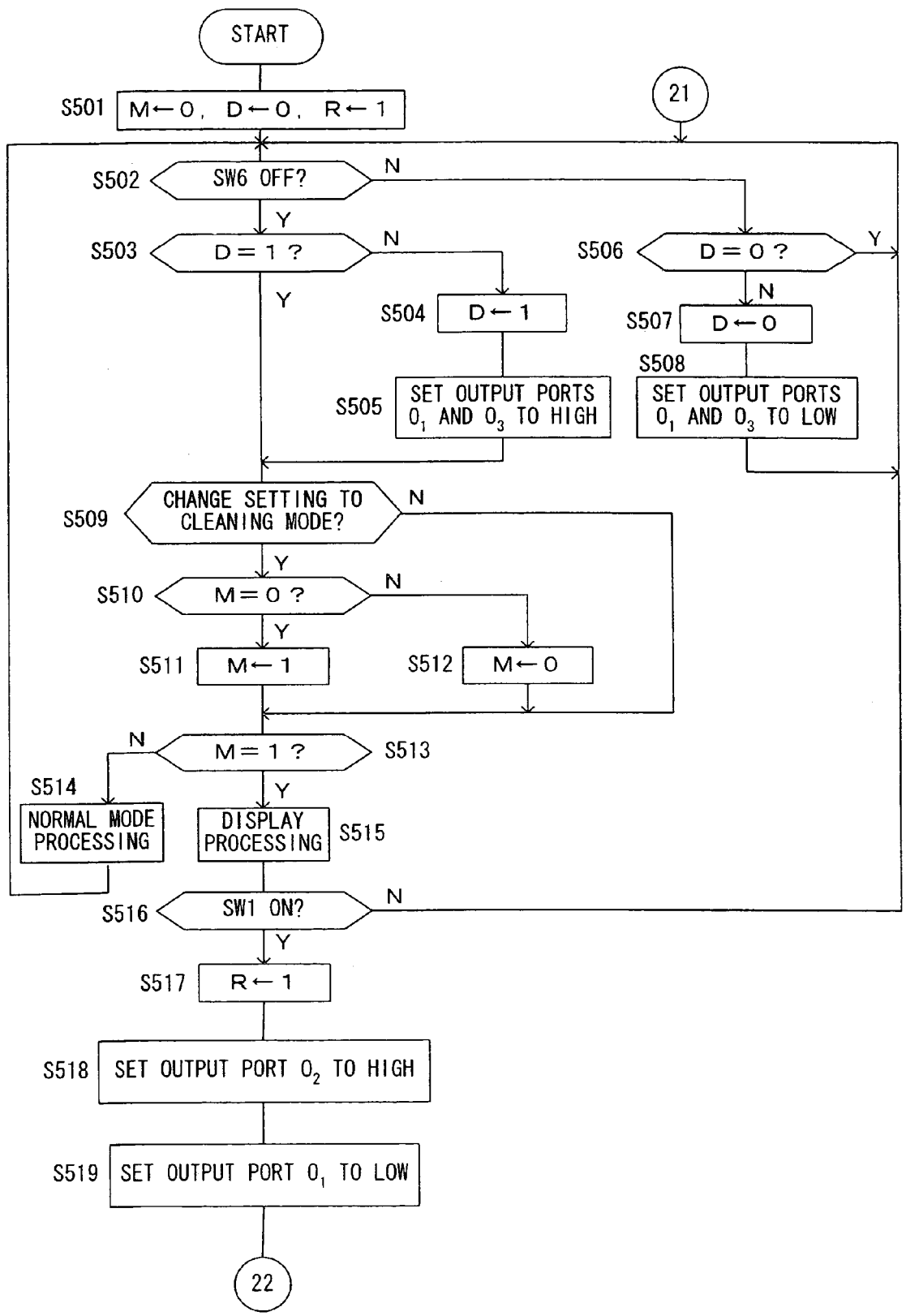
FIG. 25 presents a flowchart of the sequence control processing executed at the arithmetic operation circuit in the cleaning mode.

Since the present invention is characterized by the operation of the electronic camera 52 in the cleaning mode, the flow of the sequence control processing executed by the arithmetic operation circuit 101 in the cleaning mode is now explained in reference to the flowcharts presented in FIGS. 25 through 29. The program in conformance to which the processing is executed as shown in the flowcharts in FIG. 25 is started as the battery 131 becomes loaded into the electronic camera 52.

In step S501 in FIG. 25, the arithmetic operation circuit 101 sets a flag M, a flag D and a flag R all to 0 before the operation proceeds to step S502. The flag M, which is a cleaning mode flag, is set to 1 when the cleaning mode is selected and is set to 0 when the cleaning mode is cleared. The flag D is a power flag, which is set to 1 when the power dial has been turned on (when the switch SW6 is in an off state) and is set to 0 when the power dial has been turned off (when the switch SW6 is in an on state). The flag R is a cleaning mode operation flag, which is set to 1 both during a mirror up operation and a mirror down operation in the cleaning mode.

In step S502, the arithmetic operation circuit 101 makes a decision as to whether or not the switch SW6 is in an off state. The arithmetic operation circuit 101 makes an affirmative decision in step S502 if the switch SW6 is in an off state (i.e., if the power dial is set at the on position) to proceed to step S503, whereas it makes a negative decision in step S502 if the switch SW6 is in an on state (i.e., if the power dial is set to the off position) to proceed to step S506.

In step S503, the arithmetic operation circuit 101 makes a decision as to whether or not the flag D is currently set to 1. The arithmetic operation circuit 101 makes an affirmative decision in step S503 if D=1 to proceed to step S509, whereas it makes a negative decision in step S503 if D=0 to proceed to step S504.

In step S504, the arithmetic operation circuit 101 sets the flag D to 1 and the operation proceeds to step S505. In step S505, the arithmetic operation circuit 101 sets the outputs of the output ports O1 and O3 both to high level before the operation proceeds to step S509. In response, power is supplied to the power lines with the voltage V1 and the voltage V3, thereby enabling operations of the individual blocks to which the voltages V1 and V3 are supplied.

In step S506, the arithmetic operation circuit 101 makes a decision as to whether or not the flag D is currently set to 0. The arithmetic operation circuit 101 makes an affirmative decision in step S506 if D=0 to return to step S502. It makes a negative decision in step S506 if D=1 to proceed to step S507. In step S507, the arithmetic operation circuit 101 sets the flag D to 0 and then the operation proceeds to step S508. In step S508, the arithmetic operation circuit 101 sets the outputs of the output ports O1 and O3 both to low level before returning to step S502. In response, the power through the power lines with the voltage V1 and the voltage V3 becomes cut off, thereby stopping the operations of the various blocks to which the voltages V1 and V3 are supplied.

In step S509, the arithmetic operation circuit 101 makes a decision as to whether or not an operation for changing over to the cleaning mode setting has been performed. The arithmetic operation circuit 101 makes an affirmative decision in step S509 if an operation signal indicating a setting changeover has been input through the setting operation member 102 to proceed to step S510, whereas it makes a negative decision in step S509 if no changeover operation signal has been input to proceed to step S513.

In step S510, the arithmetic operation circuit 101 makes a decision as to whether or not the flag M is currently set to 0. The arithmetic operation circuit 101 makes an affirmative decision in step S510 if M=0 to proceed to step S511, whereas it makes a negative decision in step S510 if M=1 to proceed to step S512.

In step S511, the arithmetic operation circuit 101 sets the flag M to 1 and then the operation proceeds to step S513. In step S512, the arithmetic operation circuit 101 sets the flag M to 0 and then the operation proceeds to step S513.

In step S513, the arithmetic operation circuit 101 makes a decision as to whether or not the flag M is currently set to 1. The arithmetic operation circuit 101 makes an affirmative decision in step S513 if M=1 to proceed to step S515, whereas it makes a negative decision in step S513 if M=0 to proceed to step S514. The operation proceeds to step S515 if the camera is currently set in the cleaning mode, whereas the operation proceeds to step S514 if the electronic camera is currently set in the normal photographing mode.

In step S514, the arithmetic operation circuit 101 executes specific normal mode processing before returning to step S502. In the normal mode, processing may be executed to control the timing of the photographing operations as shown in FIG. 5 in reference to which the first embodiment has been explained. It is to be noted that a detailed explanation of the normal mode is not provided.

In step S515, the arithmetic operation circuit 101 outputs a command for the display device 103 to bring up a display indicating that the cleaning mode is currently set before the operation proceeds to step S516. The display may be achieved by adopting a display mode in which "------" is lit by individually lighting "-" in an "8" segment display element disposed over six places.

In step S516, the arithmetic operation circuit 101 makes a decision as to whether or not the shutter release switch SW1 has been turned on. The arithmetic operation circuit 101 makes an affirmative decision in step S516 if an operation signal has been input from the shutter release switch SW1 to proceed to step S517. The arithmetic operation circuit 101 makes a negative decision in step S516 if no operation signal has been input from the shutter release switch SW1 to return to step S502. A shutter release operation performed in the cleaning mode is used as a trigger constituting an instruction for starting a mirror up operation and an instruction for the blade set 3 to start opening the aperture 2*a*.

In step S517, the arithmetic operation circuit 101 sets the flag R to 1 and the operation proceeds to step S518. In step S518, the arithmetic operation circuit 101 sets the output of the output port O2 to high level before the operation proceeds to step S519. In response, power is supplied to the power line with the voltage V2, thereby enabling operations of the individual blocks to which the voltage V2 is supplied.

Figure 26:
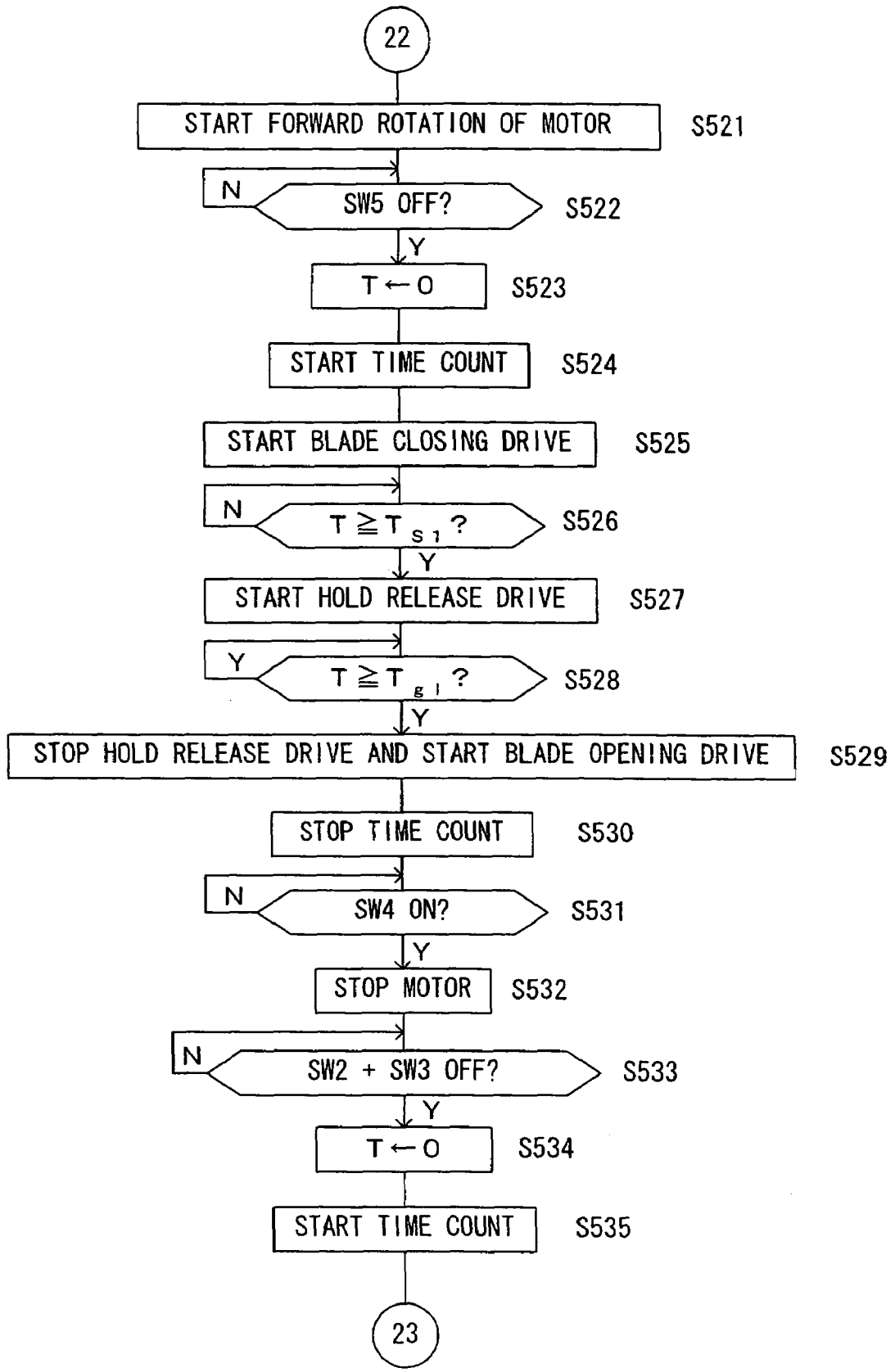
FIG. 26 presents a flowchart of the sequence control processing executed at the arithmetic operation circuit in the cleaning mode.

In step S519, the arithmetic operation circuit 101 sets the output of the output port O1 to low level and then the operation proceeds to step S521 in FIG. 26. In response, the power through the power line with the voltage V1 becomes cut off, thereby stopping the operations of the various blocks to which the voltage V1 is supplied.

In step S521 in FIG. 26, the arithmetic operation circuit 101 outputs a command for the motor drive circuit 110 to start rotating the sequence motor 111 forward, and then the operation proceeds to step S522. In response, a mirror up operation starts. In step S522, the arithmetic operation circuit 101 makes a decision as to whether or not the sequence switch SW5 is in an off state. The arithmetic operation circuit 101 makes an affirmative decision in step S522 if the signal from the sequence switch SW5 is at high level to proceed to step S523, whereas it makes a negative decision in step S522 if the signal from the sequence switch SW5 is at low level to repeatedly executed this decision-making processing. The operation proceeds to step S523 on the assumption that the main motor 12 for the shutter 1 should now rotate in the reverse direction, whereas the decision-making processing is repeatedly executed on the assumption that the main motor 12 should not yet start rotating in the reverse direction.

In step S523, the arithmetic operation circuit 101 sets a time count T to 20 before the operation proceeds to step S524. In step S524, the arithmetic operation circuit 101 starts a time count by the timer circuit 101*t* before proceeding to step S525.

In step S525, the arithmetic operation circuit 101 starts closing drive of the blade set 3 at the shutter 1 before the operation proceeds to step S526. In more specific terms, it outputs a command for the shutter drive circuit 108 to start rotating the main motor 12 in the reverse direction. In step S526, the arithmetic operation circuit 101 makes a decision as to whether or not T≧Ts1 is true with regard to the time count T having been started in step S524. The arithmetic operation circuit 101 makes an affirmative decision in step S526 if T≧Ts1 is true to proceed to step S527, whereas it makes a negative decision in step S526 if T≧Ts1 is not true to repeatedly executed this decision-making processing. The operation proceeds to step S527 on the assumption that the wait time Ts1 has elapsed.

In step S527, the arithmetic operation circuit 101 starts hold release drive and then the operation proceeds to step S528. More specifically, it outputs a command for the shutter drive circuit 108 to start rotating the sub-motor 15 forward. In step S528, the arithmetic operation circuit 101 makes a decision as to whether or not T≧Tg1 is true with regard to the time count T. The arithmetic operation circuit 101 makes an affirmative decision in step S528 if T≧Tg1 is true to proceed to step S529, whereas it makes a negative decision in step S528 if T≧Tg1 is not true to repeatedly executed this decision-making processing. The operation proceeds to step S529 on the assumption that the reverse power supply period Tg1 has elapsed.

In step S529, the arithmetic operation circuit 101 stops the hold release drive and also starts opening drive of the blade set 3 before the operation proceeds to step S530. The opening drive is started by issuing an instruction for the shutter drive circuit 108 to rotate the main motor 12 forward.

In step S530, the arithmetic operation circuit stops the measurement of the time count T and then the operation proceeds to step S531. In step S531, the arithmetic operation circuit 101 makes a decision as to whether or not the sequence switch SW4 is in an on state. The arithmetic operation circuit 101 makes an affirmative decision in step S531 if the signal from the sequence switch SW4 is at low level, to proceed to step S532, whereas it makes a negative decision in step S531 if the signal from the sequence switch SW4 is at high level to repeatedly execute this decision-making processing. The operation proceeds to step S532 when the mirror up operation has been completed. The decision-making processing is repeatedly executed if the mirror up operation is still in progress.

In step S530, the arithmetic operation circuit outputs a command for the motor drive circuit 110 to stop the forward rotation of the sequence motor 111. It is to be noted that the sequence motor 111 is stopped instantaneously through brake processing executed by applying a reverse power supply brake, a short brake or the like. Thus, the extent of overrun can be disregarded.

In step S533, the arithmetic operation circuit 101 makes a decision as to whether or not the output from the serial connection achieved with the shutter switches SW2 and SW3 is in an off state. The arithmetic operation circuit 101 makes an affirmative decision in step S533 if the signal input to the input port for the shutter switches SW2 and SW3 is at high level to proceed to step S534. In this instance, the arithmetic operation circuit judges that the aperture 2*a* is opened to a full open state with the blade set 3 of the shutter 1. If, on the other hand, the signal input to the input port for the shutter switches SW2 and SW3 is at low level, the arithmetic operation circuit 101 makes a negative decision in step S533 to repeatedly execute this decision-making processing. In this case, the arithmetic operation circuit judges that the blade set 3 at the shutter 1 is currently engaged in the process of opening the aperture 2*a*.

In step S534, the arithmetic operation circuit 101 sets the time count T by the timer circuit 101*t* to 0 before the operation proceeds to step S535. In step S535, the arithmetic operation circuit 101 starts a time count by the timer circuit 101*t* before proceeding to step S541 in FIG. 27.

Figure 27:
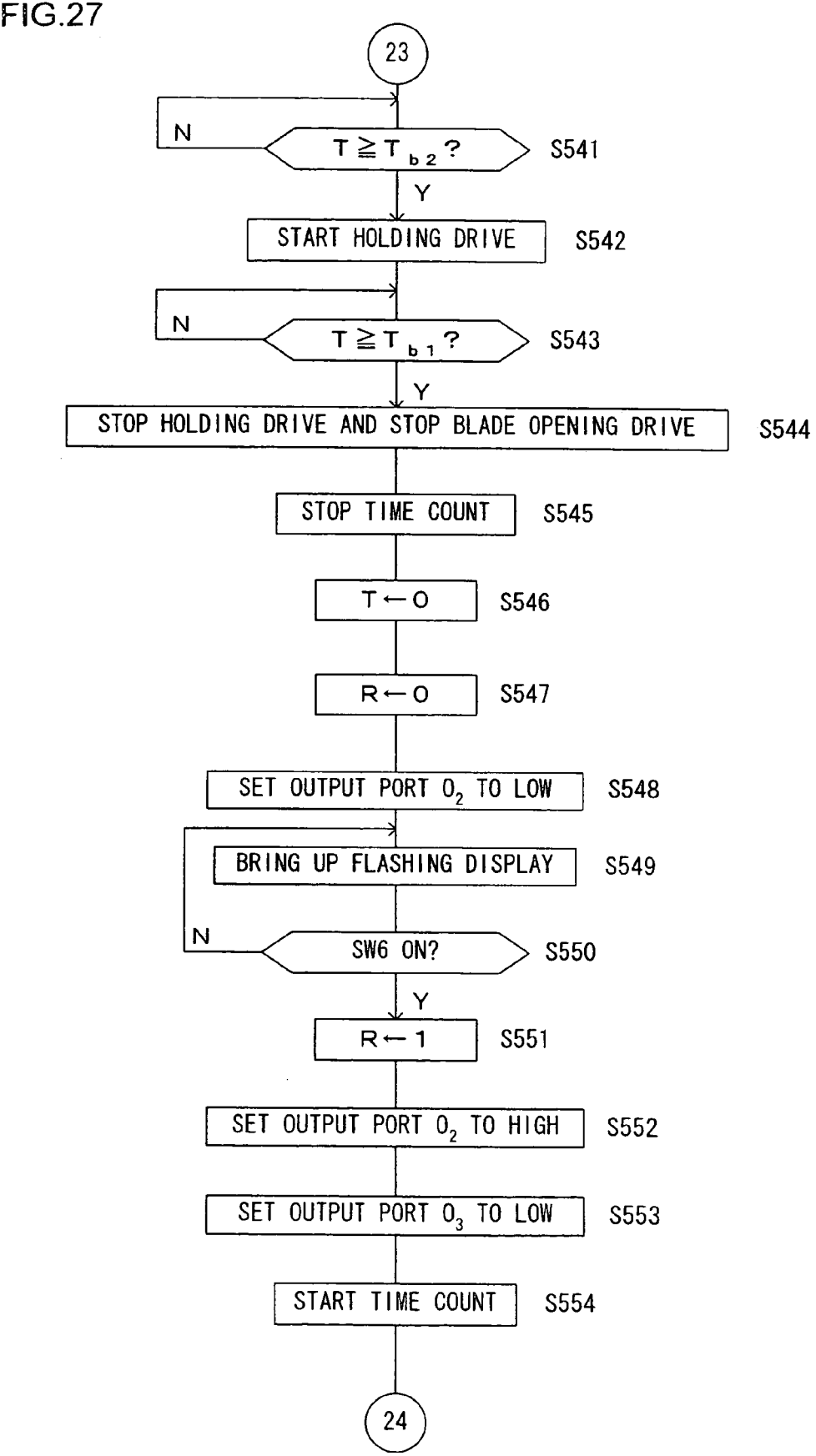
FIG. 27 presents a flowchart of the sequence control processing executed at the arithmetic operation circuit in the cleaning mode.

In step S541 in FIG. 27, the arithmetic operation circuit 101 makes a decision as to whether or not T≧Tb2 is true. The arithmetic operation circuit 101 makes an affirmative decision in step S541 if T≧Tb2 is true to proceed to step S542, whereas it makes a negative decision in step S541 if T≧Tb2 is not true to repeatedly execute this decision-making processing. The operation proceeds to step S542 on the assumption that the holding lever 14 should now be driven to the holding position.

In step S542, the arithmetic operation circuit 101 starts holding drive before the operation proceeds to step S543. More specifically, it outputs a command for the shutter drive circuit 108 to rotate the sub-motor 15 in the reverse direction.

In step S543, the arithmetic operation circuit 101 makes a decision as to whether or not T≧Tb1 is true. The arithmetic operation circuit 101 makes an affirmative decision in step S543 if T≧Tb1 is true to proceed to step S544, whereas it makes a negative decision in step S543 if T≧Tb1 is not true to repeatedly execute this decision-making processing. The operation proceeds to step S544 on the assumption that the holding time Tb1 has elapsed after the output from the serial connection between the shutter switches SW2 and SW3 shifted into an off state.

In step S544, the arithmetic operation circuit 101 stops the holding drive and also stops the opening drive of the blade set 3 before the operation proceeds to step S545. The holding drive is stopped by issuing an instruction for the shutter drive circuit 108 to stop the reverse rotation of the sub-motor 15 and the opening drive is stopped by issuing an instruction for the shutter drive circuit 108 to stop the forward rotation of the main motor 12.

In step S545, the arithmetic operation circuit 101 stops the time count by the timer circuit 101*t* before proceeding to step S546. In step S546, the arithmetic operation circuit 101 sets the time count T to 0 and then the operation proceeds to step S547. In step S547, the arithmetic operation circuit 101 sets the flag R to 0 before proceeding to step S548.

In step S548, the arithmetic operation circuit 101 sets the output of the output port O2 to low level and then the operation proceeds to step S549. In response, the power through the power line with the voltage V2 becomes cut off, thereby stopping the operations of the individual blocks to which the voltage V2 is supplied.

In step S549, the arithmetic operation circuit 101 outputs a command for the display device 103 to bring up a display indicating a cleaning-enabled state before the operation proceeds to step S550. The display may assume a mode in which "------" flashes by individually flashing "-" segments at the display element corresponding to six places. At this point, only the display device 103 is supplied with power and is thus in an operating state, apart from the arithmetic operation circuit 101. As explained earlier, the switch SW 6 is in an off state when the power dial is at the on position and thus, no current flows to the switch SW6 in the cleaning-enabled state either. As a result, very little battery power is used during maintenance work.

In step S550, the arithmetic operation circuit 101 makes a decision as to whether or not the switch SW6 is in an on state. The arithmetic operation circuit 101 makes an affirmative decision in step S550 if the switch SW6 is in an on state (i.e., if the power dial is set at the off position) to proceed to step S551, whereas it makes a negative decision in step S550 if the switch SW6 is in an off state (i.e., if the power dial is set to the on position) to return to step S549. The operation proceeds to step S551 to start a mirror down operation and to start closing the aperture 2a with the blade set 3.

In step S551, the arithmetic operation circuit 101 sets the flag R to 1 and then the operation proceeds to step S552. In step S552, the output of the output port O2 is set to high level before the operation proceeds to step S553. In response, power is supplied to the power line with the voltage V2, enabling the operations of the individual blocks to which the voltage V2 is supplied.

In step S553, the arithmetic operation circuit 101 switches the output of the output port O3 to low level and then the operation proceeds to step S554. In response, the power through the power line with the voltage V3 becomes cut off, thereby stopping the operation of the display device 103 to which the voltage V3 is supplied.

Figure 28:
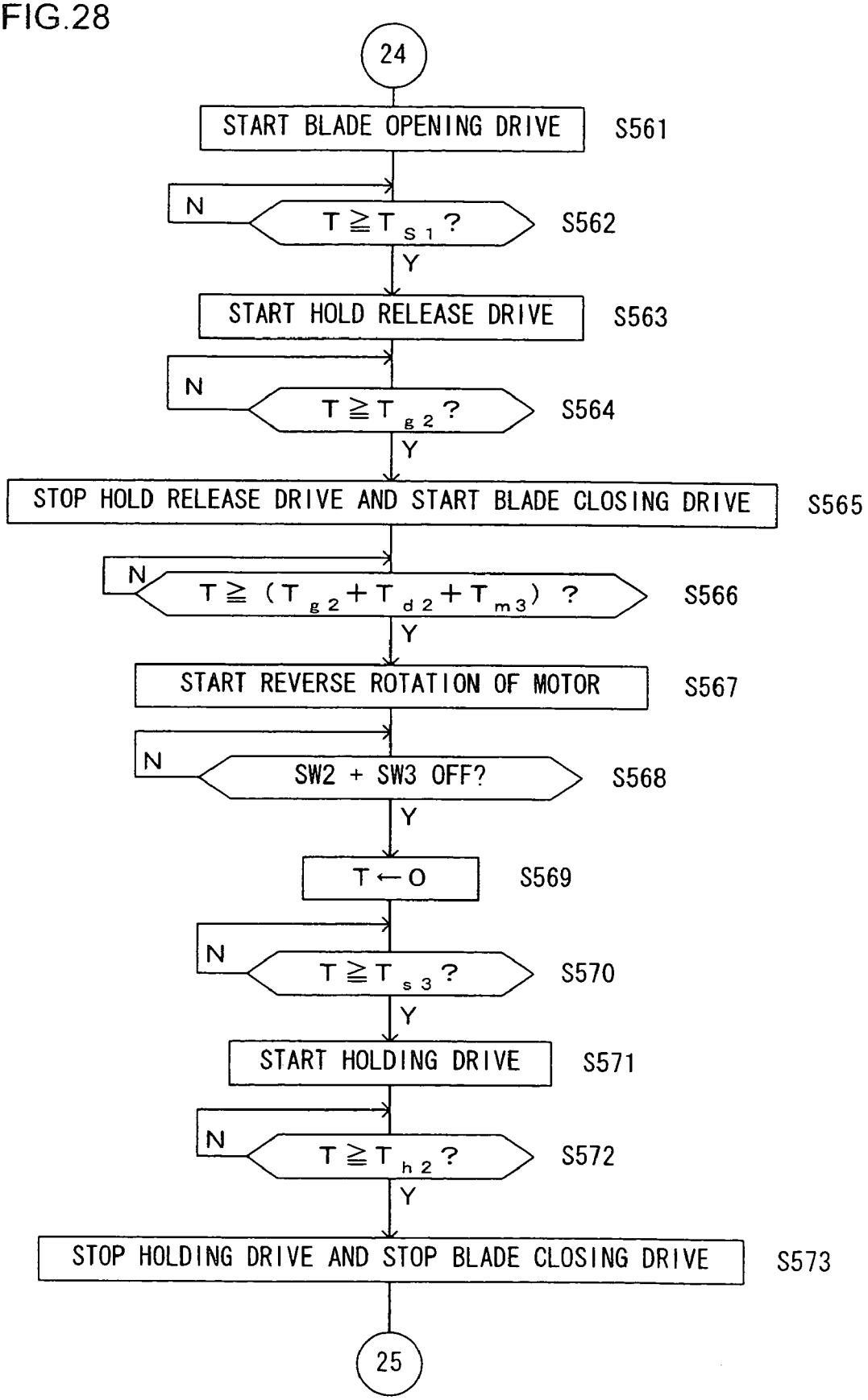
FIG. 28 presents a flowchart of the sequence control processing executed at the arithmetic operation circuit in the cleaning mode.

In step S554, the arithmetic operation circuit 101 starts a time count by the timer circuit 101t before proceeding to step S561 in FIG. 28. In step S561 in FIG. 28, the arithmetic operation circuit 101 starts opening drive of the blade set 3, and then the operation proceeds to step S562. In step S562, the arithmetic operation circuit 101 makes a decision as to whether or not T≧Ts1 is true. The arithmetic operation circuit 101 makes an affirmative decision in step S562 if T≧Ts1 is true to proceed to step S563, whereas it makes a negative decision in step S562 if T≧Ts1 is not true to repeatedly execute this decision-making processing. The operation proceeds to step S563 on the assumption that hold release drive should start at this time.

In step S563, the arithmetic operation circuit 101 starts the hold release drive and then the operation proceeds to step S564. In step S564, the arithmetic operation circuit 101 makes a decision as to whether or not T≧Tg2 is true. The arithmetic operation circuit 101 makes an affirmative decision in step S564 if T≧Tg2 is true to proceed to step S565, whereas it makes a negative decision in step S564 if T≧Tg2 is not true to repeatedly executed this decision-making processing. The operation proceeds to step S565 on the assumption that the hold release drive should be stopped and closing drive of the blade set 3 should start at this time.

In step S565, the arithmetic operation circuit 101 stops the hold release drive and also starts the closing drive of the blade set 3, before the operation proceeds to step S566. The hold release drive is stopped by issuing an instruction for the shutter drive circuit 108 to stop the forward rotation of the sub-motor 15 and the closing drive is started by issuing an instruction for the shutter drive circuit 108 to start rotating the main motor 12 in the reverse direction.

In step S566, the arithmetic operation circuit 101 makes a decision as to whether or not T≧(Tg2+Td2+Tm3) is true. The arithmetic operation circuit 101 makes an affirmative decision in step S566 if T≧(Tg2+Td2+Tm3) is true to proceed to step S567, whereas it makes a negative decision in step S566 if T≧(Tg2+Td2+Tm3) is not true to repeatedly executed this decision-making processing. The operation proceeds to step S567 on the assumption that a mirror down operation should start at this time (time point t14 in FIG. 24).

In step S567, the arithmetic operation circuit 101 outputs a command for the motor drive circuit 110 to start rotating the sequence motor 111 in the reverse direction, and then the operation proceeds to step S568.

In step S568, the arithmetic operation circuit 101 makes a decision as to whether or not the output from the serial connection achieved with the shutter switches SW2 and SW3 is in an off state. The arithmetic operation circuit 101 makes an affirmative decision in step S568 if the signal input to the input port for the shutter switches SW2 and SW3 is at high level to proceed to step S569. In this instance, the arithmetic operation circuit judges that the aperture 2a is completely closed by the blade set 3 of the shutter 1. If, on the other hand, the signal input to the input port for the shutter switches SW2 and SW3 is at low level, the arithmetic operation circuit 101 makes a negative decision in step S568 to repeatedly execute this decision-making processing. In this case, the arithmetic operation circuit judges that the blade set 3 at the shutter 1 is currently engaged in the process of closing the aperture 2a.

In step S569, the arithmetic operation circuit 101 sets the time count T by the timer circuit 101t to 0 before proceeding to step S570. Thus, the time count T is reset to 0 at time point t17 in FIG. 24. The time is continuously counted after the reset.

In step S570, the arithmetic operation circuit 101 makes a decision as to whether or not T≧Ts3 is true. The arithmetic operation circuit 101 makes an affirmative decision in step S570 if T≧Ts3 is true to proceed to step S571, whereas it makes a negative decision in step S570 if T≧Ts3 is not true to repeatedly execute this decision-making processing. The operation proceeds to step S571 on the assumption that the holding lever 14 should now be driven toward the holding position.

In step S571, the arithmetic operation circuit 101 starts the holding drive before the operation proceeds to step S572. More specifically, the arithmetic operation circuit 101 outputs a command for the shutter drive circuit 108 to rotate the sub-motor 15 in the reverse direction.

In step S572, the arithmetic operation circuit 101 makes a decision as to whether or not T≧Th2 is true. The arithmetic operation circuit 101 makes an affirmative decision in step S572 if T≧Th2 is true to proceed to step S573, whereas it makes a negative decision in step S572 if T≧Th2 is not true to repeatedly execute this decision-making processing. The operation proceeds to step S573 on the assumption that the holding time Th2 has elapsed after the output of the serial connection between the shutter switches SW2 and SW3 shifted into an off state.

Figure 29:
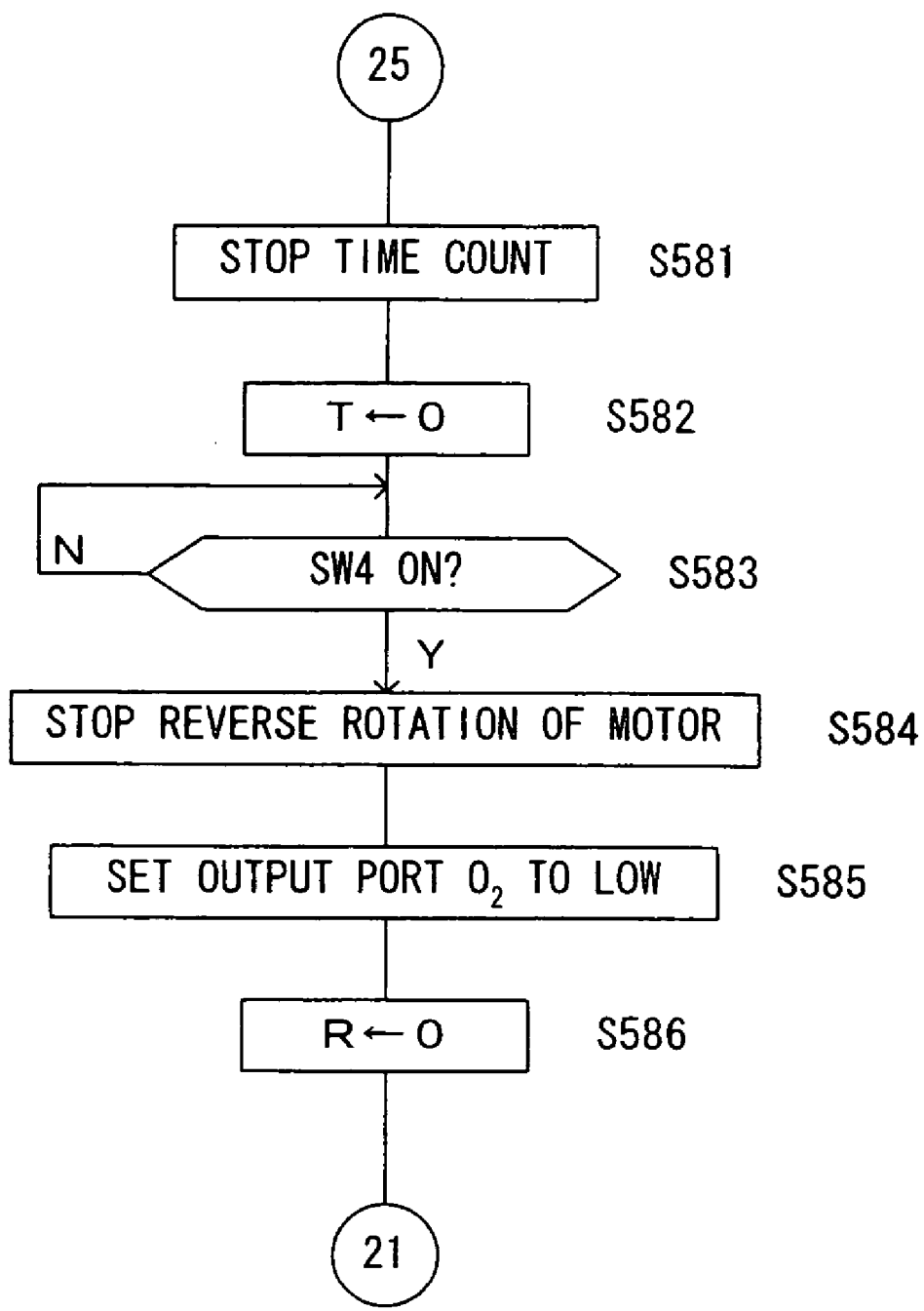
FIG. 29 presents a flowchart of the sequence control processing executed at the arithmetic operation circuit in the cleaning mode.

In step S573, the arithmetic operation circuit 101 stops the holding drive and also stops the closing drive of the blade set 3 before the operation proceeds to step S581 in FIG. 29. The holding drive is stopped by issuing an instruction for the shutter drive circuit 108 to stop the reverse rotation of the sub-motor 15 and the closing drive is stopped by issuing an instruction for the shutter drive circuit 108 to stop the reverse rotation of the main motor 12.

In step S581 in FIG. 29, the arithmetic operation circuit 101 stops the time count by the timer circuit 101t before proceeding to step S582. In step S582, the arithmetic operation circuit 101 sets the time count T to 0 and then the operation proceeds to step S583.

In step S583, the arithmetic operation circuit 101 makes a decision as to whether or not the sequence switch SW4 is in an on state. The arithmetic operation circuit 101 makes an affirmative decision in step S583 if the signal from the sequence switch SW4 is at low level, to proceed to step S584, whereas it makes a negative decision in step S583 if the signal from the sequence switch SW4 is at high level to repeatedly execute this decision-making processing. The operation proceeds to step S584 if the mirror down operation has been completed.

In step S584, the arithmetic operation circuit 101 outputs a command for the motor drive circuit 110 to stop the reverse rotation of the sequence motor 111. It is to be noted that the sequence motor 111 is stopped instantaneously through brake processing executed by applying a reverse power supply brake, a short brake or the like. For this reason, the extent of overrun can be disregarded In step S585, the arithmetic operation circuit 101 switches the output of the output port O2 to low level and then the operation proceeds to step S586. In response, the power through the power line with the voltage V2 becomes cut off. In step S586, the arithmetic operation circuit 101 sets the flag R to 0 and then the operation returns to step S502 in FIG. 25. The cleaning mode operation thus ends.

The processing executed in the embodiment when the electronic camera is set in the cleaning mode is now summarized.
(1) After the blade set 3 at the shutter becomes fully open (at time point t7), the holding time Tb1 elapses and then the forward power supply to the main motor 12 is stopped while holding the blade set 3 in the open state (at time point t7B). The blade set 3 is held in the open state by holding the drive lever 8 with the holding lever 14 when the drive lever 8 maintains contact with the open position regulating projection 2c of the shutter baseplate 2 (see FIG. 3). Thus, the blade set 3 is not allowed to close even if the remaining power in the battery 131 becomes low. In addition, the electronic camera can be set in the cleaning mode and is enabled to operate in the cleaning mode without using an external power source. Even when the image-capturing element 121 or the like needs to be cleaned thoroughly over a considerable length of time, the main motor 12 and the sub-motor 15 do not consume any power since no power is supplied to the motors 12 and 15 during the cleaning operation. Moreover, power is not supplied to the main motor 12 over an extended period of time, and therefore, an increase in the temperature due to heat generation at the main motor does not occur.
(2) In addition to the advantage described above in (1), the battery power in the battery 131 can be saved as the power supply to the circuit blocks and the like other than the arithmetic operation circuit 101 and the display device 103 is stopped after the blade set 3 withdraws from the aperture 2a to set it in an open state and achieve a power saving operation.
(3) The rotating direction of the main motor 12, which is an electromagnetic actuator, is switched and the rotation of the motor 12 is stopped respectively after the holding time Tb1 and the holding time Th2, and thus, the length of time Td2 elapsing between the start of the reverse power supply to the main motor 12 (time point t9B) and the time point (t13) at which the blade set 3 actually starts to close the aperture 2a, and the length of time Td1 elapsing between the start of the forward power supply to the main motor (time point t1) and the time point (t4) at which the blade set 3 actually starts to open the aperture can both be stabilized at approximately 9 msec. Consequently, the accuracy of the image-capturing sequence is improved and the individual time margins Tm1 through Tm4 can be kept to minimum lengths so as to further reduce the length of time required for the image-capturing sequence.

Before releasing the blade set 3 held in an open state or a closed state, power is first supplied to the main motor 12 in the direction opposite from the direction in which power is supplied to the main motor 12 after the release. Thus, the drive lever 8 maintains contact with the close position regulating projection 2b or the open position regulating projection 2c without fail while the holding lever 14 moves between the holding position and the hold release position so as to ensure that the drive lever 8 is never allowed to obstruct the movement of the holding lever 14.

The numerical values as of Ts1, Ts2, Tm1 through Tm4, Td1, Td2 and the like are not limited to those used in the example explained above. A time margin may be set to, for instance, 0.5 msec.

Figure 30:
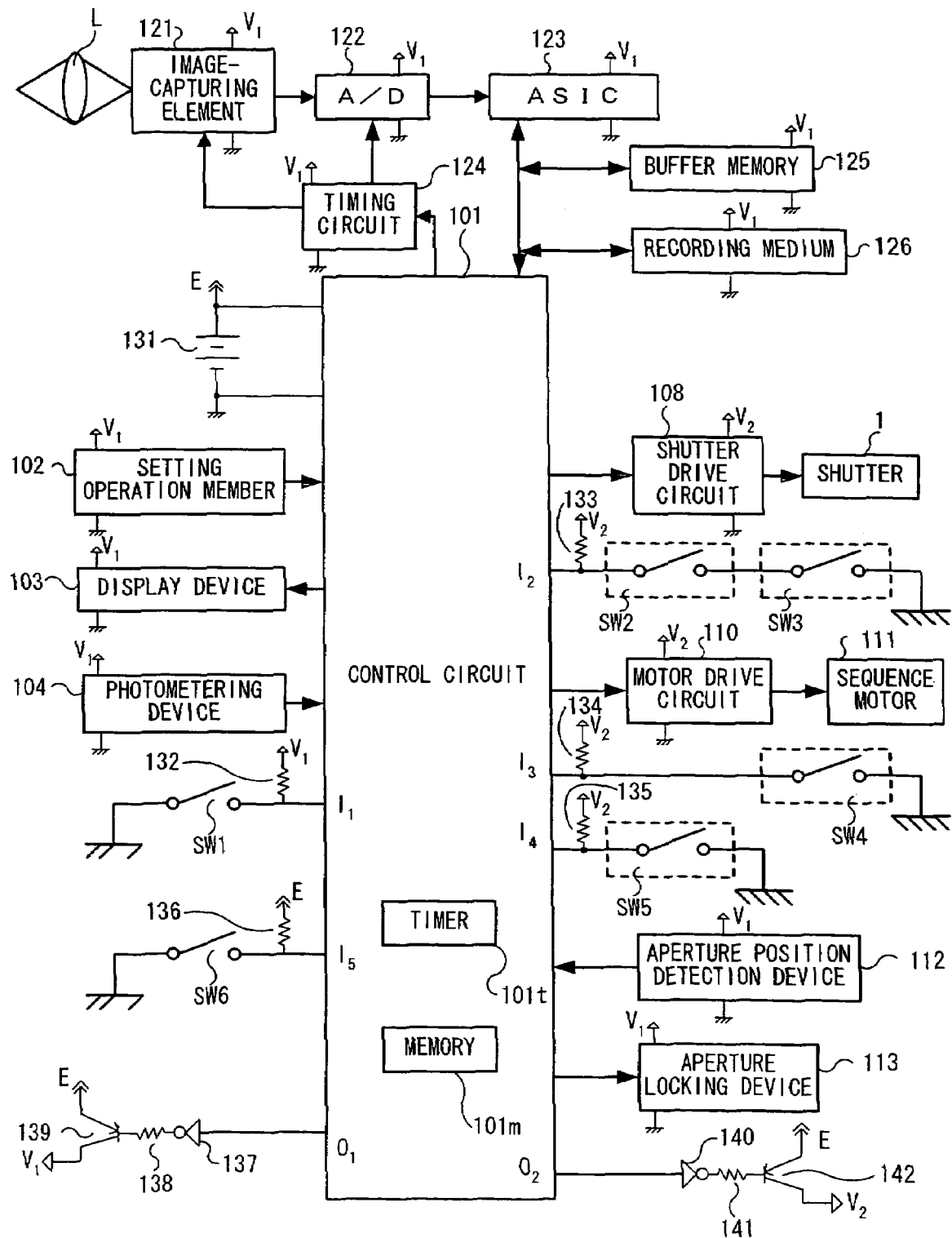
FIG. 30 is a block diagram of an example of a variation of the electronic camera.

Power with the voltage V1 may be supplied to the display device 103 via the transistor 139. FIG. 30 is a block diagram of an example of a variation of the electronic camera. It differs from the electronic camera in FIG. 23 in that the power achieving the voltage V1 is supplied to the display device 103 and that it does not include the PNP transistor 145, the resistor 144 and the inverter 143 which would be required to supply the power with the voltage V3.

Figure 31:
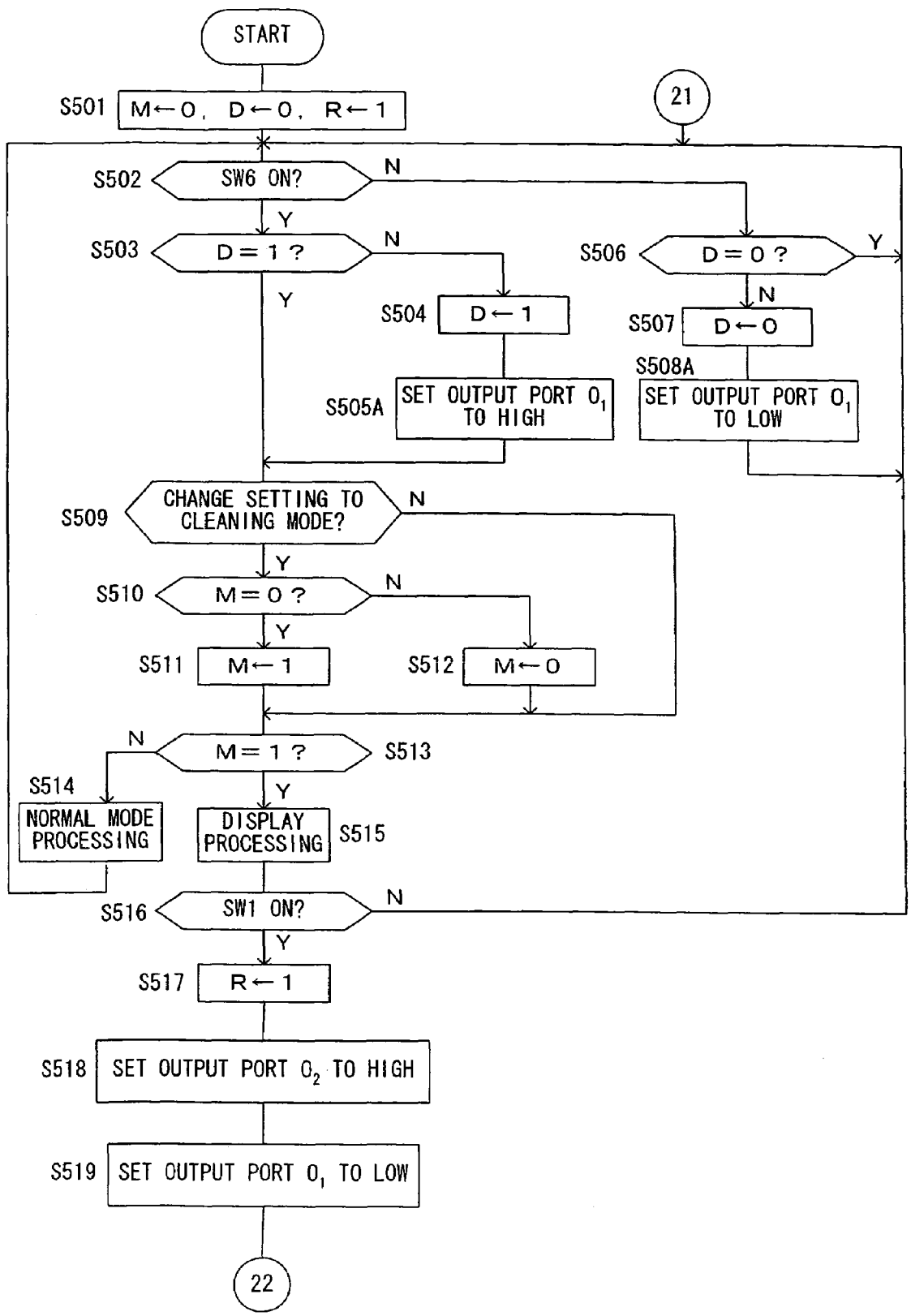
FIG. 31 presents a flowchart of the sequence control processing executed at the arithmetic operation circuit in the cleaning mode.

Since the power circuit for supplying the voltage V3 is not included in the electronic camera, the arithmetic operation circuit 101' does not need to control the output port O3 as indicated in step S505A and step S508A in the flowchart presented in FIG. 31. It is to be noted that the processing executed in steps other than steps S505A and step S508A in FIG. 31 is identical to the processing executed in steps assigned with matching step numbers in FIG. 25.

Figure 32:
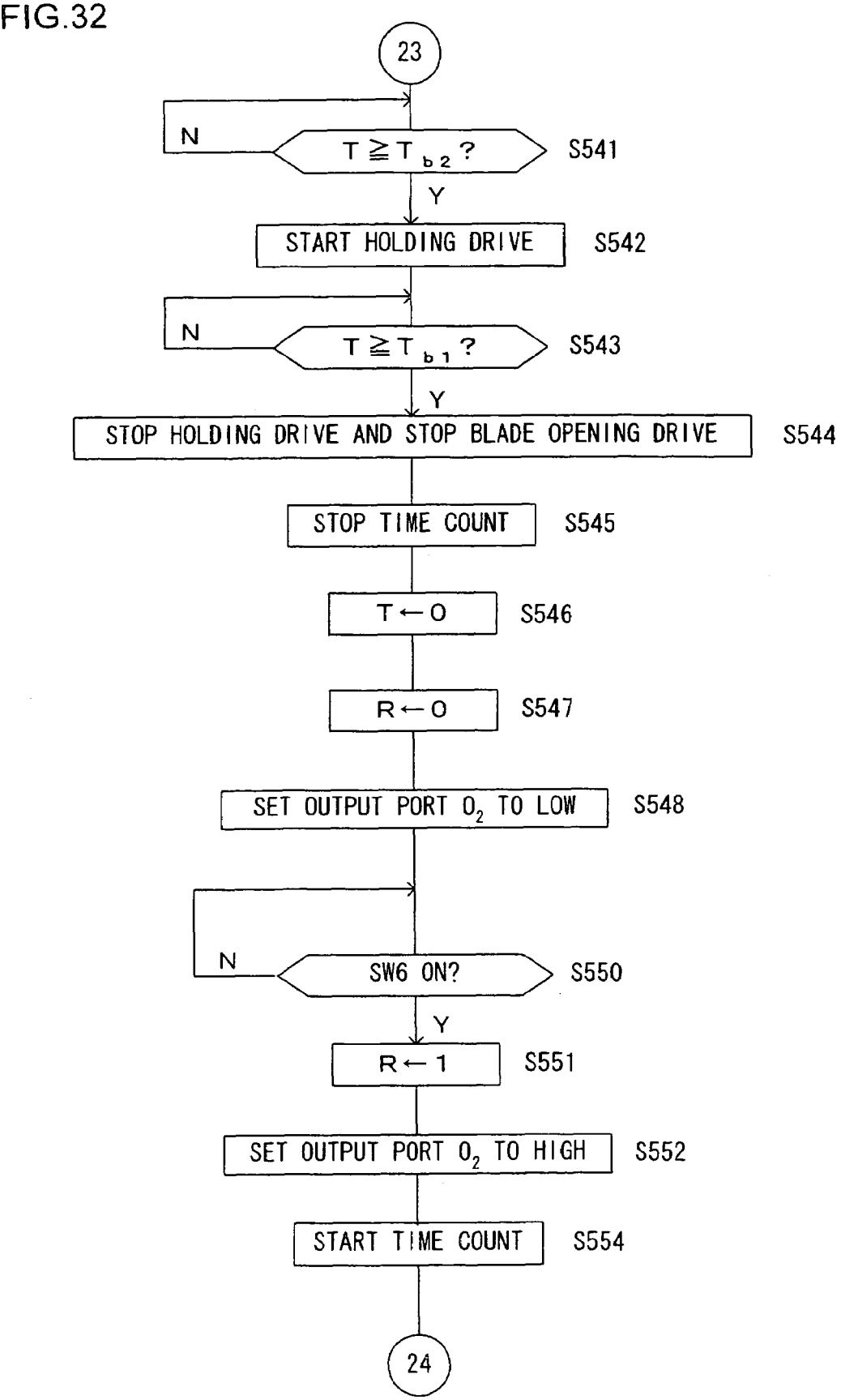
FIG. 32 presents a flowchart of the sequence control processing executed at the arithmetic operation circuit in the cleaning mode.

FIG. 32 presents a flowchart of the sequence control processing executed by the arithmetic operation circuit 101' when the electronic camera in which the power with the voltage V1 is supplied to the display device 103 and the power circuit corresponding to the voltage V3 is not provided is set in the cleaning mode. The processing differs from that shown in FIG. 27 in that steps S549 and S553 are omitted. Otherwise the processing in the flowchart in FIG. 32 is identical to the processing executed in steps assigned with matching step numbers in FIG. 27.

In this example of a variation, as the shutter release switch SW1 is operated (an affirmative decision is made in step S516) in the cleaning mode, the processing in steps S519 is executed to cut off the power with the voltage V1, thereby stopping the operation of the display device 103, as shown in FIG. 31. As a result, the power supply to the circuit blocks and the like other than the arithmetic operation circuit 101' becomes cut off while the mirror is in the raised state and the aperture 2a is in the open state, to further save the remaining battery power in the battery 131.

In the explanation given above, the signal constituting an instruction for a mirror up operation start is generated at the shutter release switch SW1 and the signal constituting an instruction for a mirror down operation start is generated at the power switch SW6 in the cleaning mode. These signals may instead be generated at other switches or these instructions may be issued through menu selections.

It is to be noted that the components used in the second embodiment described above may constitute the following elements. The shielding member may be constituted with, for instance, the blade set 3 (focal plane shutter 1). The first electromagnetic actuator may be constituted with, for instance, the main motor 12. The holding member may be constituted with, for instance, the holding lever 14. The second electromagnetic actuator may be constituted with, for instance, the sub-motor 15. The internal source may be constituted with, for instance, the battery 131. The means for power control and the means for operation control may be constituted with, for instance, the arithmetic operation circuit 101 (101'). The signal constituting an instruction for maintenance operation start may correspond with a signal output from the shutter release switch SW1. The signal constituting an instruction for maintenance operation end may correspond with the signal output from the power switch SW6.

The above described embodiments are examples, and various modifications can be made without departing from the spirit and scope of the invention.

What is claimed is:

1. An electronic camera comprising:
   an image-capturing element that captures an image formed with subject light;
   a shielding member that allows the subject light to pass through to the image-capturing element or blocks the subject light;
   a first electromagnetic actuator used for opening/closing drive of the shielding member;
   a holding member that holds the shielding member at least either an open state in which the shielding member allows the subject light to pass through or a closed state in which the shielding member blocks the subject light;
   a second electromagnetic actuator used for holding drive and hold release drive of the holding member; and
   a control device that controls driving of the first electromagnetic actuator and the second electromagnetic actuator.

2. An electronic camera according to claim 1, wherein:
   the control device (1) outputs an instruction for the first electromagnetic actuator to drive the shielding member in an opening direction after outputting an instruction for the hold release drive to the second electromagnetic actuator, (2) outputs an instruction for the holding drive to the second actuator after the open state has been detected and then outputs an instruction for the first electromagnetic actuator to stop driving in the opening direction, (3) outputs an instruction for the first electromagnetic actuator to drive the shielding member in a closing direction after outputting an instruction for the hold release drive to the second electromagnetic actuator, and (4) outputs an instruction for the holding drive to the second electromagnetic actuator after the closed state has been detected and then outputs an instruction for the first electromagnetic actuator to stop driving in the closing direction.

3. An electronic camera according to claim 1, wherein:
   if a preset exposure time is shorter than a first reference time length and is not either at a "valve" setting or at a "time" setting, the control device (1) outputs an instruction for the first electromagnetic actuator to drive the shielding member in an opening direction after outputting an instruction for the hold release drive to the second electromagnetic actuator, (2) outputs an instruction for the first electromagnetic actuator to drive the shielding member in a closing direction after the open state has been detected, and (3) outputs an instruction for the holding drive to the second electromagnetic actuator after the closed state has been detected and then outputs to the first electromagnetic actuator an instruction to stop driving in the closing direction.

4. An electronic camera according to claim 3, wherein:
   if the preset exposure time exceeds a second reference time length which is shorter than the first reference time length, the control device (1) outputs an instruction for the first electromagnetic actuator to drive the shielding member in the opening direction after outputting an instruction for the hold release drive to the second electromagnetic actuator, (2) reduces power supplied to the first electromagnetic actuator with specific timing after the open state has been detected, (3) restores the power having been reduced and outputs an instruction for the first electromagnetic actuator to drive the shielding member in the closing direction, and (4) outputs an instruction for the holding drive to the second electromagnetic actuator after the closed state has been detected and then outputs an instruction for the first electromagnetic actuator to stop driving in the closing direction.

5. An electronic camera according to claim 1, wherein:
   if the shielding member stops while being driven, the control device first outputs an instruction for the hold release drive of the holding member to the second electromagnetic actuator and then outputs an instruction for the first electromagnetic actuator to drive the shielding member in the closing direction.

6. An electronic camera according to claim 1, wherein:
   prior to the hold release drive, the control device outputs an instruction for the first electromagnetic actuator to drive the shielding member in a direction opposite from a direction in which the shielding member is driven for opening or closing, and then the control device outputs an instruction for the hold release drive to the second electromagnetic actuator.

7. An electronic camera according to claim 1, wherein:
   the holding member sustains the open state and the closed state by coming into contact with a drive member that drives the shielding member and thus restricting movement of the drive member;
   drive operations of the holding member executed to sustain the open state and the closed state are identical; and
   different areas of the holding member come into contact with the drive member to sustain the open state and to sustain the closed state.

8. An electronic camera according to claim 1, wherein:
   the control device (1) supplies power from a source inside the electronic camera to the first electromagnetic actuator when executing the opening/closing drive of the shielding member, (2) supplies power from the source to the second electromagnetic actuator when executing the hold drive and the hold release drive of the holding member, and (3) stops supplying the power to the first electromagnetic actuator and the second electromagnetic actuator while the open state or the closed state is sustained by the holding member.

9. An electronic camera according to claim 1, wherein:
   in response to a signal constituting an instruction for a maintenance operation start, the control device (1) outputs an instruction for the first electromagnetic actuator to drive the shielding member in an opening direction after outputting an instruction for the hold release drive to the second electromagnetic actuator and (2) outputs an instruction for the holding drive to the second electromagnetic actuator after the open state has been detected and then outputs an instruction for the first electromagnetic actuator to stop the drive in the opening direction, and
   in response to a signal constituting an instruction for a maintenance operation end, the control device (3) outputs an instruction for the first electromagnetic actuator to drive the shielding member in a closing direction after outputting an instruction for the hold release drive to the second electromagnetic actuator and (4) outputs an instruction for the holding drive to the second electromagnetic actuator after the closed state has been detected and then outputs an instruction for the first electromagnetic actuator to stop the drive in the closing direction.

10. An electronic camera according to claim 9, wherein:
power is supplied to the first electronic actuator and the second electronic actuator from a source within the electronic camera.

11. An electronic camera according to claim 1, wherein:
the control device drives the first electromagnetic actuator so as to set the shielding member in the open state or in the closed state and drives the second electromagnetic actuator so that after the shielding member enters either the open state or the closed state, the open state or the closed state of the shielding member is sustained by the holding member.

12. An electronic camera according to claim 11, wherein:
after the open state or the closed state becomes sustained by the holding member, the control device stops driving of the first electromagnetic actuator.

13. An electronic camera according to claim 1, wherein:
in response to a signal constituting an instruction for a maintenance operation start, the control device drives the first electromagnetic actuator so as to set the shielding member in the open state and drives the second electromagnetic actuator so that once the shielding member enters the open state, the open state is sustained by the holding member.

14. An electronic camera according to claim 13, wherein:
power is supplied to the first electromagnetic actuator and the second electromagnetic actuator from a battery source loaded in the electronic camera.

* * * * *